INVENTORS
ALVIN P. MULLERY
RALPH F. SCHAUER

BY [signature]
ATTORNEY

Sept. 13, 1966 A. P. MULLERY ETAL 3,273,129

COMPUTER DATA STORAGE AND HANDLING SYSTEM HAVING MEANS FOR LINKING DISCONTINUOUS DATA

Filed July 5, 1963 32 Sheets-Sheet 5

Sept. 13, 1966 A. P. MULLERY ETAL 3,273,129

COMPUTER DATA STORAGE AND HANDLING SYSTEM HAVING MEANS FOR LINKING DISCONTINUOUS DATA

Filed July 5, 1963 32 Sheets-Sheet 8

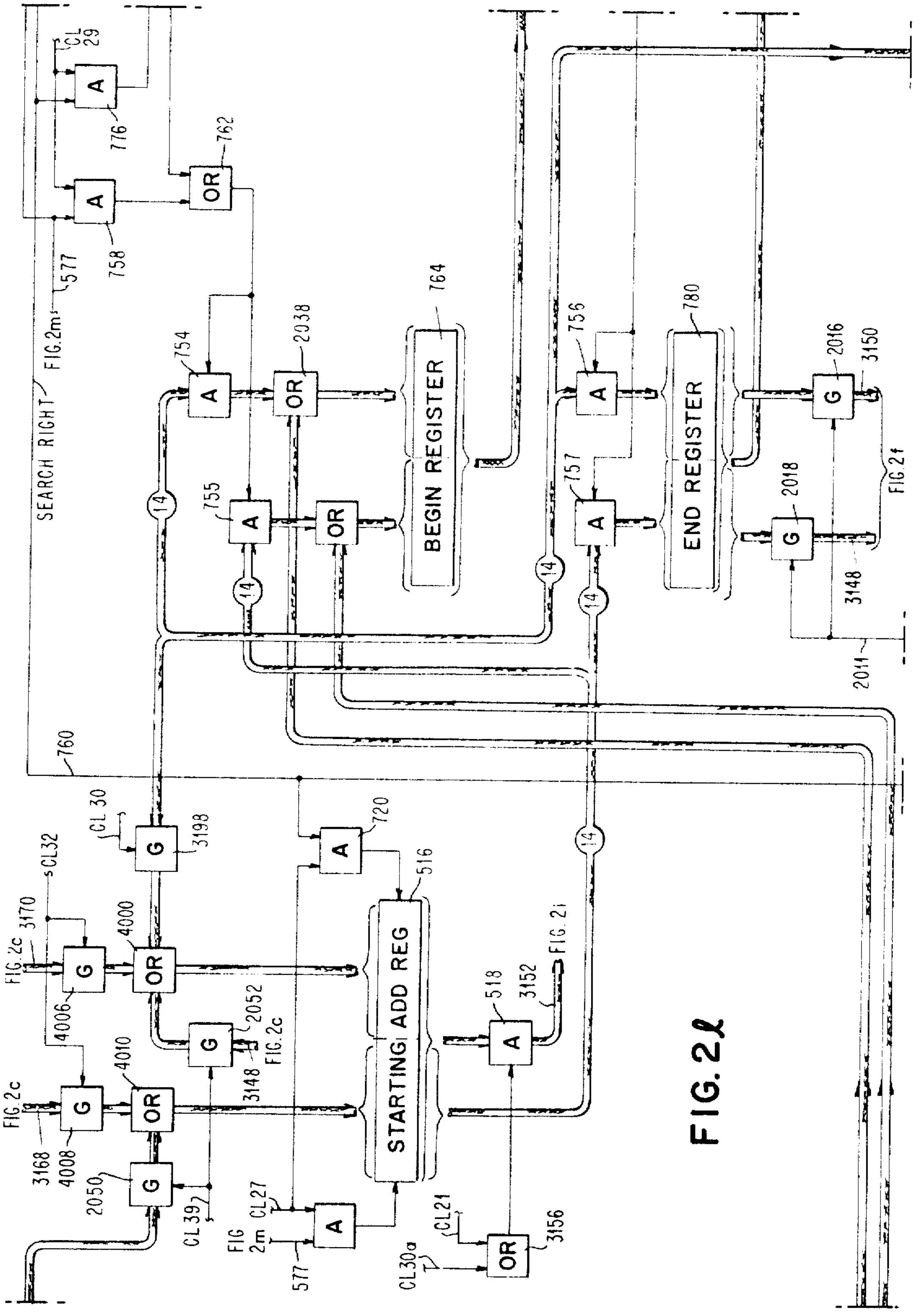
FIG. 2ℓ

Sept. 13, 1966 A. P. MULLERY ETAL 3,273,129

COMPUTER DATA STORAGE AND HANDLING SYSTEM HAVING MEANS FOR LINKING DISCONTINUOUS DATA

Filed July 5, 1963 32 Sheets-Sheet 18

Sept. 13, 1966 A. P. MULLERY ET AL 3,273,129

COMPUTER DATA STORAGE AND HANDLING SYSTEM HAVING MEANS FOR LINKING DISCONTINUOUS DATA

Filed July 5, 1963 32 Sheets-Sheet 28

TIMING CHART 3,273,129

COMPUTER DATA STORAGE AND HANDLING SYSTEM HAVING MEANS FOR LINKING DISCONTINUOUS DATA

Alvin P. Mullery, Chappaqua, and Ralph F. Schauer, Hawthorne, N.Y., assignors to International Business Machines Corporation, New York, N.Y., a corporation of New York Filed July 5, 1963, Ser. No. 292,862
41 Claims. (Cl. 340—172.5)

The present invention relates to an improved data handling and storage system and more particularly to such a system for linking discontinuous data which greatly expands storage flexibility of a large high speed memory for an electronic computer.

A more general aspect of the present invention comprises the provision of special linking addresses stored with the data itself whereby non-contiguous strings of data may be linked together for subsequent searching. The system to be disclosed comprises all of the control circuitry necessary to detect discontinuities, generate and store special data symbols both in the data string linked from and the data string linked to. By means of this system, data may be stored in discontinuous input locations during a standard inputing operation, data already stored in memory may be inserted into an existing data string, a portion of an existing data string may be deleted or a portion of an existing data string may be replaced by another data string either longer or shorter than the existing portion to be replaced.

A further important aspect of the present invention comprises the provision of search circuitry for automatically detecting any discontinuity in a data string being searched and having means for automatically recognizing the discontinuity and retrieving the address of the next portion of the data string located at a different position in memory.

The present system is designed especially to be used with the variable field length hierarchically organized data handling and storage system set forth and described in the copending application No. 282,807 of Rex Rice, filed May 23, 1963 and entitled "A Data Storage and Handling System." While adding great flexibility to the system disclosed and described in the copending application, the present application is not necessarily intended to be limited thereby. The presently disclosed system is adapted for the inputing of variable field length hierarchically organized data of the type set forth in said copending application and the particular data inputing circuitry is virtually the same as in said application. However, by the present invention, additional control circuitry has been provided to effect the storage of the input data in the proper available positions in memory and for the storage of special "link" characters and linking addresses directly within said data. Thus, it may be said that the copending application discloses and describes the actual breaking up of variable field length hierarchically organized data into the structure or hierarchy indicated in said data string, while the present invention is directed to a scheme for addressing a Main Memory in accordance with available storage locations therein and for generating the necessary links so that incoming data may be stored in discontinuous storage locations in said memory, which operation has not previously been known to exist in standard computer organizations.

The data hierarchy is denoted by special symbols included in the data and when the data is input into the system, the location of the special symbols is denoted in a separate auxiliary memory wherein the storage location in the auxiliary memory is directly relatable to the location of the associated data in the Main Storage Unit. The system provides for the more functional addressing of data in memory and reduces the requirements made of the programmer. It further provides for the storage of variable field length and variable format data without the imposition of any limitations other than that the structure of the data be indicated directly therein.

In general, a digital computer system may be thought of as an information or data processing system which accepts data in one form and delivers it in an unaltered form after performing some "operations" on it. In every case, it simply processes the input data according to rules specified by the operator. These rules, as well as the data, must be put into a form intelligible to the computer. However, many types of computers exist today, and each, seemingly, understands a different dialect of a character language. Consequently, if one is to use a computer as a processing system, he is faced with the problem of the translation of the problem description and solution from the language which he employs to that which the machine understands. The original function of the "programmer" was to perform such translation. However, because of the tedium of a job that is essentially mechanical though complex, programmers attempted to reduce the actual amount of actual translating required. This was accomplished by the development of automatic programming. In automatic programming the machine itself performs many of the tedious, trivial translation tasks. The problem is described in a problem oriented language such as FORTRAN, ALGOL, or COBOL. Compilation and assembly schemes are then used to enable machine translation of this input into a machine language description. The compiling and assembly programs themselves become very complex and large as the capabilities and flexability of the machine system are increased.

The investigation of such problem areas as pattern processing and recognition, list processing, game theory, operations research, learning and artificial intelligence, experimental programming, simulation and other advanced data processing research requires an extremely flexible and powerful data processing system able to manipulate data efficiently and to perform most record keeping tasks automatically. The types and structure of the data used in these areas are many and varied. The types of operation to be performed on these data are complex in comparison with the abilities of present computers. Consequently, new artifical languages are developed to describe these problem areas and their solutions, and the necessary compiler and assembly programs are written. This cycle continues to produce a steady flow of new software or programming packages for new and existing hardware systems. It becomes apparent that the combination of compilation and assembly is not necessarily the best bridge for the gap between problem oriented and machine languages. Of course, the elimination or at least reduction in these two steps in problem solving would also have economic advantages for the user.

One possible approach to producing a powerful machine language is by taking a machine of the present type, an IBM 7090 for example, and adding more hardware. However, a language, especially a powerful language, may impose requirements which are difficult to implement in the present type of machine system. Therefore, a computer which has a high level language as its machine language should have a machine organization which is determined only by the property of the language. Only in this way will the hardware remain reasonable.

As stated previously, the most obvious way of making a problem oriented language the machine language of a system is to implement one or a combination of the existing languages directly in hardware. However, all commonly used problem oriented languages have the same difficulty, they are written for some special purpose, i.e., solution of scientific problems, or of business problems, or of list processing problems, etc. None of these languages has the broad range of ability that a general purpose language should have. To allow the machine language to be the sum of all problem oriented languages commonly used is somewhat impractical. Rather than using such existing "problem oriented languages for computers," it appears more reasonable to look at the data being processed, to study a language in which to describe the processing of this data independent of computers and then to implement this language in hardware. If this implemented language also is to be machine independent, any limitations or restrictions on the language due to machine organization must be eliminated.

The type of data occurring in the above mentioned problem areas, as well as in the majority of the common data processing areas presently used, is not of the form directly acceptable by most present day computers, such form being a contiguous string of fixed length, fixed point data. Such data in the present computers must be tailored and interpreted to fit within the said fixed length, fixed point storage systems which are available in such present day computers. Data normally occurs as variable field length, variable format, structured and not necessarily contiguous. The English language, considered as data, is grouped as words in phrases, in sentences, in paragraphs, in chapters, in books and in libraries. No matter what one calls these groupings, the structure they indicate does exist in data. Clearly each symbol in a string of data can contain any number of characters.

The invention of the present system expands even further the advantages of such a hierarchically organized variable field length data handling system. The system enables not only the storage of variable field length data but allows its storage in non-contiguous locations by the provision of special linking characters and linking addresses which are inserted directly in an existing data string at an appropriate point during the Storage operation. The variable field length storage system is peculiarly well adapted to the present system since neither the memory nor any of the input or output controls care how long a particular data string is, so long as its extent is marked. Thus, special characters may be added at will anywhere within such a data string provided, of course, that such special characters are readily identifiable and would not be inadvertently read out of memory as part of the data string.

In most existing computer systems in use today, the memory controls provide for the automatic storing of fixed field length data or expressed in another way, data not exceeding a certain maximum length of an assigned storage location for same. In such a system, the data is conventionally fed in a serial fashion through indexing registers which automatically increment for each new piece of data to be stored. The actual storage locations of a data word is, of course, determined from said register. Once the data is stored, its format and its content is substantially fixed. Once such a string of fixed field length data is read out of memory and deleted, there is no convenient way for the blank left by the deleted data to be again utilized for storage by incoming data except by streaming or rewriting an entire section of memory. Similarly, in such prior art systems, since the field length of the data is fixed and absolutely rigid, it is not possible to insert new data in said string unless the original string did not fill the allocated space and the new data is shorter in length than the space which was unfilled in the original inputing operation. The limitations of such prior art systems obviously impress severe limitations on the types of data modification that can be handled once long lists of individual strings of data have been stored in memory.

It has now been found that an improved data handling system can be effected by providing the mechanism for automatically providing links in data which must be stored discontinuously in memory. Further, means are provided for automatically detecting such links during a search procedure so that when the search routine is provided with a beginning address of a discontinuous data string, the search will continue through the entire string as though the discontinuity did not exist.

Specifically, the above mentioned links are formed by inserting a special "link" character and a linking address in the last member of a data string, said address leading directly to the address in memory of the next member of said string whereby the system is able to recognize the existence of said link and automatically access the new or additional portion of the data string.

It is accordingly a primary object of the present invention to provide a data handling system capable of linking discontinuous data strings stored in memory together for subsequent searching operations.

It is a further object to provide such a system which actually stores the linking address of a first member of a second data string in the last member of a first data string and for storing an indication capable of detection during a search of said first data string that said link exists therein.

It is a further object of the invention to provide such a system capable of automatically inputing data in discontinuous storage locations and automatically forming the necessary links therebetween.

It is yet another object to provide such a system whereby a data string stored in one portion of the memory may be inserted at a given point in a data string stored at a second non-contiguous portion of said memory.

It is a still further object to provide such a system for deleting a given portion of data from a data string and automatically linking around said deleted portion of the data string.

It is a further object to provide such a system capable of replacing a portion of an existing data string with another data string currently existing in the memory at another location.

It is a still further object of the present invention to provide the control circuitry and storage registers and special character generating circuits necessary to effect all of the above mentioned objects.

Other objects and advantages will be apparent from the accompanying description and drawings in which FIGURE 1 is a block diagram of the present system;

FIGURE 2 is a composite diagram of FIGURES 2*a*–2*u*, illustrating how the drawings are to be located to form the entire functional schematic diagram anticipated by this figure;

FIGURES 2*a*–2*u* comprise a logcial schematic diagram of the data storage and handling system shown in FIGURE 1;

Figures 11, 11A:
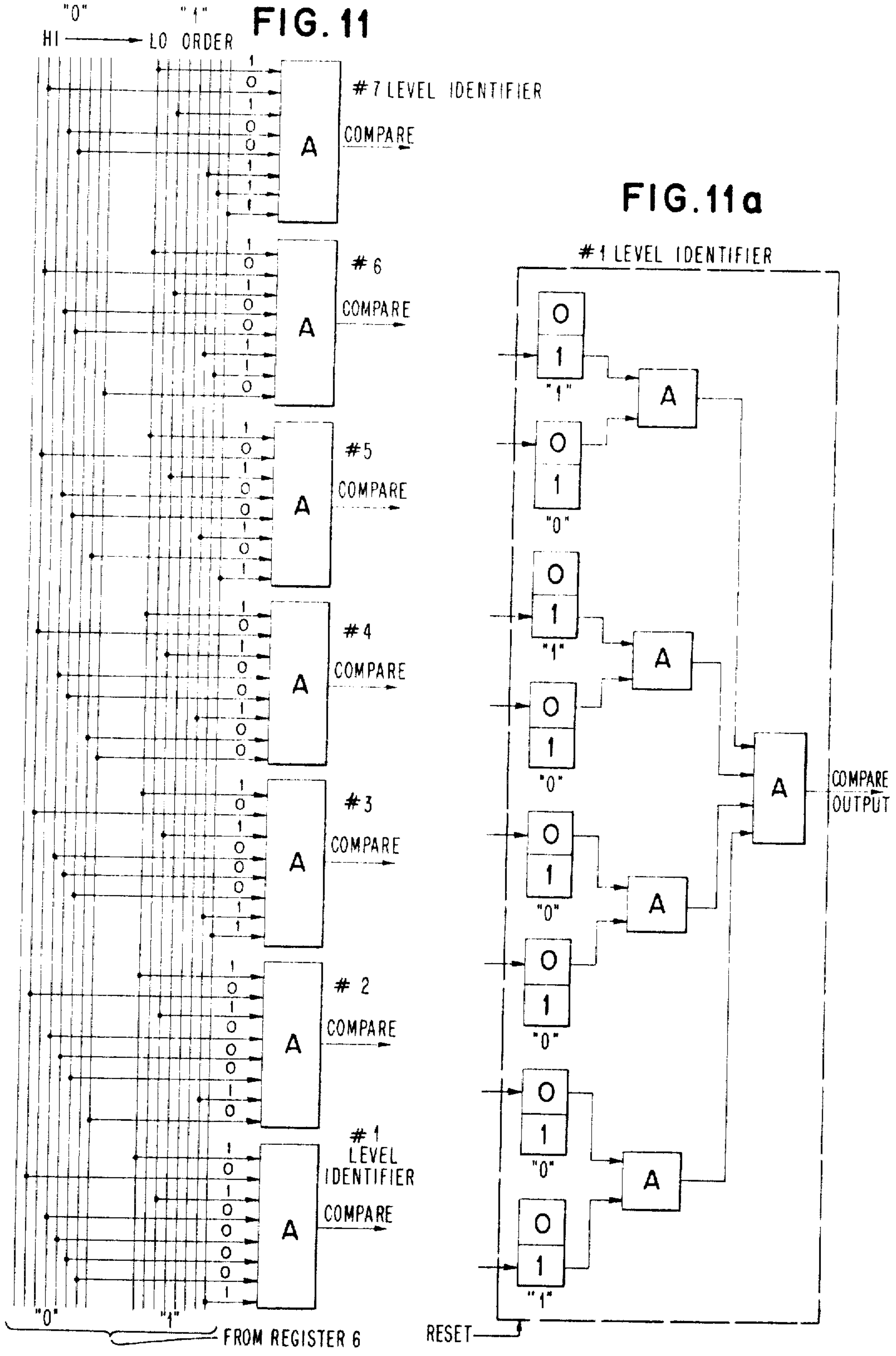
FIGURE 11 is a logical schematic diagram of one embodiment of a Compare circuit incorporated in the present system.
Figure 12:
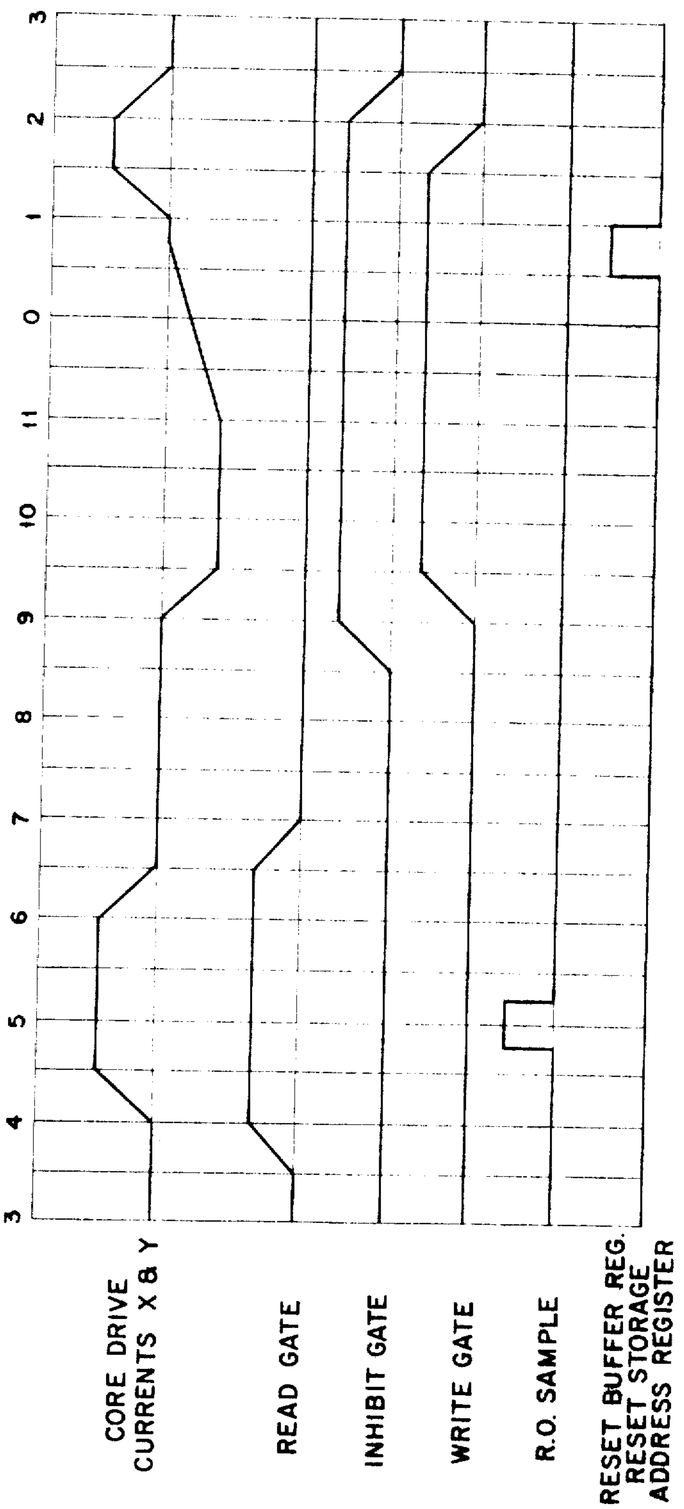

FIGURE 11*a* is a more detailed logical schematic diagram of an individual storage of the Compare circuit of FIGURE 11;

FIGURE 12 is a timing chart illustrating the sequence of event occurring during a read-write cycle of a typical 3–D word organized memory;

The objects of the present invention are accomplished in general by a data storage and handling system for non-contiguous data comprising means for detecting the address in memory where a discontinuity in a data string is to occur, means for creating a linking address in the data at the discontinuity address of the next related data stored in memory and further means for storing an occurrence mark in an auxiliary storage means, the address in said auxiliary storage means being directly relatable to said discontinuity address and means for concurrently searching the auxiliary storage means when said data string is being searched to indicate a discontinuity in the data and means to extract the linking address stored in said data string and means to continue the search at the linking address of the related data.

It will be apparent from the following discussion and description of the present system that the above discontinuity in data may occur as a result of a number of different conditions. The first of these is where a data string is being stored in memory and the extent of the current available storage location is insufficient for the storage of the entire data string, thus, necessitating the storing of a portion of said data string in an alternative non-contiguous position and forming a link thereto. Secondly, where data is being inserted into an existing data string and the discontinuity occurs at the point where the new data is to be inserted, the link will be formed to an available address to which the data to be inserted will be transferred upon execution of the Insertion operation. Thirdly, when a Delete operation is encountered, the discontinuity occurs at the end of the last machine word in the data string before the portion of data which is to be deleted and in this case, the data to which the previous data string will be linked is the continuation of the data string which is now no longer contiguous to the first portion of said string, thus necessitating a link across the portion of memory which will be erased in response to said deletion instruction. And lastly, the discontinuity indication will occur in a Substitute or Define operation when a new string of data being inserted to replace a portion of an old string is either longer than or shorter than the information being replaced. In the former case, when the storage positions formerly occupied by the data to be replaced have been filed by the new data and there is still more data to be inserted, the system indicates that a discontinuity or link must be formed since there is no more storage space available and a link will be, in fact, created to an available storage location in memory where the remainder of said data will be stored at the end of which an additional link will be inserted in said new portion of memory linking back to the old data string. In the latter case, the new data will be stored in the old data location and a link will be found across the gap due to the shorter length of the insert.

It should perhaps be stated at the present time, that the present system as well as that of the copending application of Rex Rice, Serial No. 282,807 is adapted for use with a conventional three dimensional word organized fixed field length magnetic core memory. The particular size of the memory discussed is a standard 128 x 128 x 64 Core memory providing 16,384 machine words, each machine word comprising 8, eight bit characters. The method by which the memory is addressed to achieve the variable field length hierarchically organized storage will be set forth in detail as will the significance of the data format itself. However, it is to be understood that the memory and all of its control circuitry is completely conventional in nature insofar as all driving circuits, address registers, buffer registers, core drivers, inhibit drivers, sense amplifiers and the like are concerned.

Additionally utilized in the present system is a section of memory directly related to the three dimensional memory referred to and described in the specification as a two dimensional memory. This memory comprises a plurality of core planes whose specific functions will be described subsequently, each plane comprising 128 x 128 cores or the same number of cores in each plane as there are machine words in the main 3–D memory. Thus, the same address may be used in the 2–D memory as in the 3–D memory to write into a particular core in one of the 2–D memory planes. As will be described more fully subsequently, a plurality of such core planes are provided, a number of which are utilized to mark occurrence marks of the hierarchical level identifier symbols which are stored in the Main Memory in associated machine words and two of these special core planes are utilized to designate the address in Main Memory where a discontinuity or linking address is stored. These are the planes indicated in the drawings as the Forward and Reverse Discontinuity Plane. Marks are stored in the Reverse Discontinuity Plane indicative of an address to which the forward discontinuity mark linked, in other words, the Reverse Discontinuity Plane contains a mark at each address stored in Main Memory as a linking address. The specific manner in which these marks are utilized will, as stated, be set forth subsequently.

For convenience of reference, the symbols 3–D and 2–D will be used in the remainder of the specification to refer to the three dimensional and two dimensional memories respectively.

To better aid in the understanding of the present invention, the hierarchically organized language or data format used with the present preferred embodiment of the invention will be described first. Secondly, a general description of the system organization will be presented with reference to the functional block diagram of FIGURE 1. Next, a description of the system concept with reference to the diagrams of FIGURES 5–10 which will clearly illustrate the general sequential steps the system must perform for the five major operating conditions. Thereafter, a general description of FIGURE 2 will be presented wherein it should be noted that during the remainder of the specification when referring to the logical schematic diagram of FIGURES 2*a*–2*u*, this diagram will simply be referred to as FIGURE 2 unless it is desired to specifically locate a particular member of the system wherein the specific drawing designation will be stated, and finally, there will be presented a specific detailed description of the operation of the logical schematic diagram of FIGURE 2 with reference to specific examples of Input, Insert, and Search operations which it is believed will clearly and specifically explain the operation of the present system.

In general, any group of data consists of strings of symbols. A 3 x 3 matrix, for example, is a string of nine symbols. In this case, the symbols are usually numbers. But, more than just a string of symbols, a hierarch or grouping, is usually imposed on the string. In this matrix example, the grouping consists of symbols which are contained in rows which are contained in the matrix. This is a simple grouping. As stated previously, English language considered as hierarchical data, is grouped as follows: symbols (or words) are in phrases, are in sentences, are in paragraphs, are in chapters, are in books, are in libraries. The symbol is the lowest meaningful grouping—e.g., the character "b" has no meaning, but the characters "ball" do represent something and, therefore, make up a symbol. The four characters b–a–l–l are a symbol for the actual ball. Another grouping is as follows:

| | |
|---|---|
| Fields | Tapes |
| Records | Files |
| Groups | Libraries |
| Blocks | |

The data groupings or levels are often used terminology in the computer art where "fields" would be the lowest or least significant member of the hierarchy. The subsequent names or levels ascend in order to "libraries" which is the highest or most encompassing member of the group. However, no matter what these groupings may be called, they exist within the data and in the data organization anticipated by the present invention are indicated by special identifier marks. These identifiers appear as special symbols in a data string which indicate the end of one group and the start of a new group. Many different such marks may be used, depending upon the names which have been given to the grouping. In order to avoid unncessary confusion, the following groups of hierarchical levels will be used throughout the remainder of the specification, it being understood that these names have no other significance per se than to give convenient names to the various hierarchical levels.

| Identification mark: | Group name Character |
|---|---|
| ① | Symbol. |
| ② | Phrase. |
| ③ | Sentence. |
| ④ | Paragraph. |
| ⑤ | Chapter. |
| ⑥ | Book. |
| ⑦ | Library |

As stated previously when the structure of a string of data or instructions is to be identified, these identifiers are used and incoporated directly in the later string. The ① identifier will indicate the end of a symbol and the start of a new symbol. These identifiers form a hierarchy in that a ② also implies a ①, a ③ implies a ②, and a ①, etc. If more than one identifier ever appears together with no other characters separating them, all but the highest identifier will be neglected and dropped.

With this type of data format using the apparatus to be set forth more fully subsequently, the occurrence of the various level or identifier marks, i.e., ①, ②, ③, etc. in a string of data to be stored in the memory are marked in special "identifier" planes in the memory. Each available machine word in the Main Memory has a storage cell available in each of these planes wherein the occurrence of that particular level of data in the machine word may be marked by a binary "1," as is well known.

Each string of data symbols can be given a name which, for the purposes of this invention, might be considered the highest level word in the data string. This name may be comprised of any combination of any number of characters, such as the words, alpha, beta or gamma indicated as being of a certain level and subsequent levels of the string are purely numeric. The only restriction on such a name is that a particular combination of characters have no more than one meaning. These names are stored in a name table together with their addresses in one system utilizing the present data storage system and the use of the name by the programmer will automatically provide the beginning address for the later string. It is, of course, obvious to one skilled in the art that other systems could equally well be used to determine the beginning address of a string including the absolute address per se.

An example of a typical machine instruction as anticipated by the hierarchically organized variable field length data system described herein is as follows:

A①↑7+(B③↑5②↑2①↑6xC①↑1)→D①↑4 wherein the arrows simply means the number following describes the level identifier preceding the arrow thus ①↑7 means the seventh ① in the data string whose name and address is A. A, B, C and D are names of data strings and as stated above may be easily related to an address. Thus, the above instruction is all that is required of the programmer to perform the indicated mathematical computation using the data storage and search system of the present invention.

In order to illustrate instructional programming, the following comparison with typical devices is made.

This instruction will replace at the minimum the following IBM 704 machine instruction:

| | |
|---|---|
| 05600004736 | (B→MQ) |
| 02000004737 | (MQxC→Acc, MQ) |
| 04000004735 | (Acc+A→Acc) |
| 06010004740 | (Acc→$D_1$) |
| −06000004741 | (MQ→$D_2$) |

where 4735 is the location of A
4736 is the location of B
4737 is the location of C
4740 is the location of first 36 bits of D and 4741 is the location of last 36 bits of D.

It will be readily apparent that if A, B or C were data strings of more than the allowed number of bits in one 704 machine word, a much more extensive series of instructions would be required.

The significance of the above comparison on a typical IBM 704 computer instruction program with that of the instant system is that the absolute addresses of A, B, C and D are completely machine generated in that the data is automatically searched and located by merely naming same in the instruction. The machine obviously must do more work but the simplification of the programming is very obvious. Thus, the above system is a departure from prior art systems where the function of the hardware depends on very rigid rules for data format, length and even content.

Figure 1:
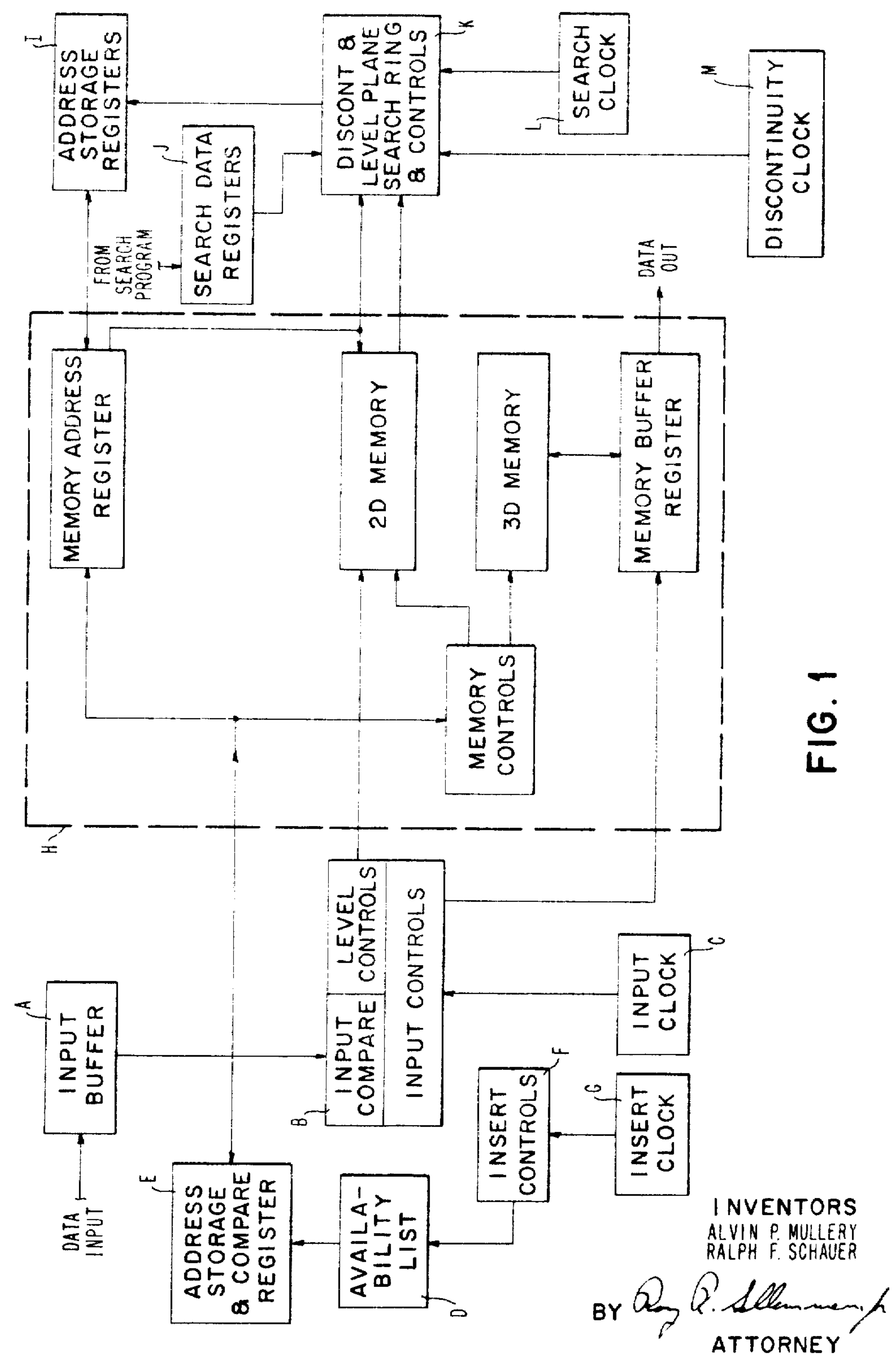

Any machine memory or data storage system utilizing the data format outlined above in accordance with the invention must obviously have means for storing the data in accordance with said format, have means for accessing said data and be able to use the data structure to facilitate searching and/or any other instruction which may prove necessary or desirable. FIGURE 1, which is a functional block diagram of the data storage system envisioned by the present invention, provides a broad basis for understanding the operation of said system.

It is, of course, to be understood that for a data handling system to be able to break up and store incoming data into the hierarchically organized memory system as described above, said data must have been broken up or grouped in accordance with the desires of a particular operator previously. That is, the particular level identifier marks which are to be used, namely the ①-⑦ set forth above with the symbol through book type of a designation must have been previously accomplished in acmumulating or assembling the data whether it be on punched cards, paper or magnetic tape. When such data is placed on the permanent storage element such as the cards or tapes, it may be entered manually; for example, it may be punched in binary form by a key punch operator or the like. In such a manual system the identifier marks are merely inserted in the data string between words as indicated previously with a conventional eight bit binary designation. The following list of eight bit characters is merely intended to be exemplary of a code used in an embodiment of the present invention, it being understood that any convenient code which is compatible with the overall data handling system being used could likewise be utilized in the machine. The Compare circuit which would, of course, have to be revised to produce a signal upon recognition of the particular level identifiers being used.

| | |
|---|---|
| ① | 10100001 |
| ② | 10100010 |
| ③ | 10100011 |
| ④ | 10100100 |
| ⑤ | 10100101 |
| ⑥ | 10100110 |
| ⑦ | 10100111 |

Thus, in an incoming string of data these particular level identifier bits will be placed at appropriate locations in the string of eight bit characters being put into machine storage.

It should perhaps be noted that the reason an eight bit code is used that the level identifiers will be mixed in with all data being input and in a flexible over-all system in excess of 200 recognizable characters including the alpha-numeric characters, special symbols and the level identifiers symbols will be used. Accordingly an eight binary bit code is necessary.

In describing the present data handling system several limitations will be placed upon the format of the data placed in storage; however, the limitations are not absolutely necessary. Referring to Table 1 which follows, a typical data string consisting of a personnel record of an employee is to be placed in the Main Memory. The data string is as follows:

be placed in a binary code. As may be seen from this lower portion of the figure, each vertical column represents a machine word of eight characters. Thus, a machine word having sixty-four bit storage positions would be necessary for eight, 8 bit per character machine words. It will be noted that the identifier marks ①–⑦ always occur at first position or first character position in any machine word and never are located down through the word. It will further be noted that where one portion of the data string between two identifier marks was less than eight characters, a "Null" character indicated by ₦ has been inserted in that position of memory to indicate a null and that the search procedure or read out is to proceed automatically through to the next position having information other than a null stored therein. It will further be noted that when more than eight characters appear between two level identifier marks the first position of a machine word may not necessarily be an identifier mark, as in the case of the third column where P, which is a continuation of the employee's last name from the previous column, has been carried over into the first position of this machine word. As in the previous case where the end of the employee's name does not completely fill a machine word before the next word level identifier occurs, two null characters are automatically inserted to fill out the remainder of this machine word.

Referring again to the upper portion of Table 1, in the 2–D Memory it will be noted that the asterisk indicates that a binary "1" or an occurrence mark has been placed in the special core planes at an address location corresponding to a machine word in Main Memory which contains such special level or identifier mark. It will further be noted that where a ④ or ② occurs, all of the subse- ④ 080964 ② JOE ; GLOPMEYER ① 1956 WEST 4th STREET
① POUGHKEEPSIE, N.Y. ④

The manner in which this data string would be stored in Main Memory according to the herein disclosed system is illustrated in Table 1.

TABLE 1

| | | | | | | | | | | | |
|---|---|---|---|---|---|---|---|---|---|---|---|
| ⑦ | | | | | | | | | | | Special Core Planes — 2-D Memory |
| ⑥ | | | | | | | | | | | |
| ⑤ | | | | | | | | | | | |
| ④ | * | | | | | | | | | | |
| ③ | * | | | | | | | | | | |
| ② | * | * | | | | | | | | | |
| ① | * | * | | * | | | * | | | * | |
| | ④ | ② | P | ① | T | E | ① | E | Y | ③ | Main Memory — 3-D Memory |
| | O | J | M | 1 | 4 | T | P | P | • | — | |
| | 8 | 0 | E | 9 | T | ₦ | O | S | ₦ | — | |
| | 0 | E | Y | 5 | H | ₦ | U | I | ₦ | — | |
| | 9 | sp | E | 6 | S | ₦ | G | E | ₦ | — | |
| | 6 | G | R | W | T | ₦ | H | • | ₦ | — | |
| | 4 | L | ₦ | E | R | ₦ | K | ₦ | ₦ | — | |
| | ₦ | O | ₦ | S | E | ₦ | E | • | ₦ | — | |

The upper portion of the table indicated by the bracket and marked Special Core Planes 2–D Memory shows to the extreme right ①–⑦ wherein each of its circles indicate a special core plane. The lower section enclosed with the bracket and entitled Main Memory represents a data string stored in binary form through Main Memory actually, as will be well understood by a person skilled in the art, each of the alphabetical representation would quent level marks, i.e., ③ ② ① and ① respectively, are placed in the special core planes again corresponding to the particular machine word in which the upper or dominant level indicator occurred.

Having thus generally described the format of a variable field length hierarchically organized data handling system and having described how such data is broken up by the system and stored in memory specifically with reference to Table 1, it will be apparent that special data may be added in such a data handling system and other data moved around somewhat without materially effecting the data inputing or searching capabilities. It is this feature of such a system which allows the easy insertion of special linking characters and linking addresses to be inserted in a given memory word and data which might have been in that particular portion originally transferred to some other sequential spot without in any way effecting the availability or read out of the data.

The manner in which such data may be linked together in accordance with the teachings of the present invention is illustrated in Tables 2*a* and 2*b*. It will be noted that these tables indicates a memory organization very much like that of Table 1 with the exception that there are two additional special level planes indicated at the top of the 2–D memory which are entitled the Forward Discontinuity and the Reverse Discontinuity Planes. The occurrence marks are stored in the Forward and Reverse Discontinuity Planes of the present invention in exactly the same manner that they are stored in the Special Level Identifier Planes. The specific manner in which such addressing and storage is accomplished will be more fully described subsequently.

TABLE 2a

| | | aa | bb | | aa | bb | yy |
|---|---|---|---|---|---|---|---|
| | Memory Address | aa | bb | | aa | bb | yy |
| 2-D Memory | Forward Discontinuity Plane | | | | | * | |
| | Reverse Discontinuity Plane | | | | | | * |
| | Special ④ | * | | | * | | |
| | Level ③ | * | * | | * | * | |
| | Identifier ② | * | * | | * | * | * |
| | Planes ① | * | * | | * | * | * |
| 3-D Memory | | ④ | ③ | | ④ | ③ | ② |
| | | A | I | | A | I | M |
| | | B | J | | B | J | N |
| | | C | K | | C | K | O |
| | | D | L | | D | L | |
| | | E | ₦ | | E | Γ | |
| | | F | ₦ | ② M N O | F | y | |
| | | G | ₦ | Unstored Data | G | y | |

TABLE 2b

| | | aa | bb | | ae | bb | yy | zz |
|---|---|---|---|---|---|---|---|---|
| | Memory Address | aa | bb | | ae | bb | yy | zz |
| 2-D Memory | Forward Discontinuity Plane | | | | | * | * | |
| | Reverse Discontinuity Plane | | | | | | | |
| | Special ④ | * | | | * | | | |
| | Level ③ | * | * | | * | * | | |
| | Identifier ② | * | * | | * | * | | * |
| | Planes ① | * | * | | * | * | | * |
| 3-D Memory | | ④ A | ③ H | | ④ A | ③ H | L ₦ | ② M |
| | | B | I | ② M N O | B | I | ₦ | N |
| | | C | J | Unstored Data | C | J | ₦ | O |
| | | D | K | | D | K | ₦ | ₦ |
| | | E | L | | E | Γ | ₦ | ₦ |
| | | F | ₦ | | F | y | ₦ | ₦ |
| | | G | ₦ | | G | y | ₦ | ₦ |

Referring now specifically to Table 2*a*, assume that the data string comprising ④ A B C D E F G ③ I J K L has been stored in memory and it is found that there is no longer any storage room left in the memory in this particular sequence for storing the next member of the data string indicated as ② M N O. Assuming further that the next available storage locations begins at address "yy," it will be necessary to form a link in the data string after the ③ I J K L data string. This is done according to the present invention by first inserting the special link character (Γ) in the sixth character position of the machine word beginning with ③. After this, the address "yy" is inserted in the next two character positions of the word. This is illustrated in the right hand portion of Table 2*a*. It should perhaps be noted at this time that the two character address is indicated since as is well known, a complete Y–X address in a 128 x 128 memory requires fourteen bit positions, and such address would require two machine characters to store same, it being of course understood that two character positions would not be used. Now, the data string ② M N O is stored at the position "yy" in memory and a discontinuity mark is indicated in the Forward Discontinuity Plane at the machine word position where the actual linking address is stored and a mark is placed in the Reverse Discontinuity Plane at the location of the first member of the linked data. This reverse discontinuity occurrence mark is for the purpose of a reverse search through said data string and is used in a manner to be described subsequently. All of the other level occurrence marks are inserted in the Special Level Core Planes in the usual manner. The above example assumed that there were three blank character positions where the link was to be formed. However, it is obvious that this would not always be the case, therefore, the system is provided with means for examining the sixth character position of the machine word in which the links is to be placed to determine whether or not a null character (₦) is present in the sixth character position. If a null is found, a link will be inserted as in Table 2*a*. If on the other hand a data character is found in this position, the data will be handled as illustrated in Table 2*b*. Since there is no more space available where the last machine word of the preceding data string is stored, it is apparent that the letter L now appear in the sixth character position must be temporarily saved and stored in the new memory location together with the data string ② M N O. The manner in which is is done is shown in the right hand portion of Table 2*b* wherein the link character and the linking address are inserted as in Table 2*a* above; but, in the new memory location "yy," the letter L previously in the preceding storage location has been carried over to the first word position of the new or linked data string. Since the data string ② M N O begins with a level identifier, it cannot be stored in the machine word under the letter L, carried over from the preceding data string. Therefore, seven null characters are inserted under the letter L and the data string ② M N O begins a new machine word. It will be noted in Table 2*b* that the Forward and Reverse Discontinuity Plane occurrence marks are placed in exactly the same manner as in the Table 2*a* above.

This is essentially the basis for all of the machine operations such as Inputing, Insertion, Deletion and Substitution of data which will be described subsequently with reference to FIGURES 5–9. These additional operations comprise various combinations of the above linking operation. They differ only in that special means are provided for keeping track of the various addresses to which it is desired to link and also from which it is desired to obtain the data to be stored in new memory locations.

The system set forth in block diagram form in FIGURE 1 is capable of automatically examining an incoming data string of the hierarchically organized variable field length type set forth previously and automatically placing it in machine storage in accordance with the rules illustrated in Table 1. Further, all of the controls for generating and properly inserting the special link characters and linking addresses, means for storing the extent addresses of all data which is to be operated on by the system and the circuitry necessary to control these operations are shown in a general way in the block diagram of FIGURE 1.

Figures 2, 2A:
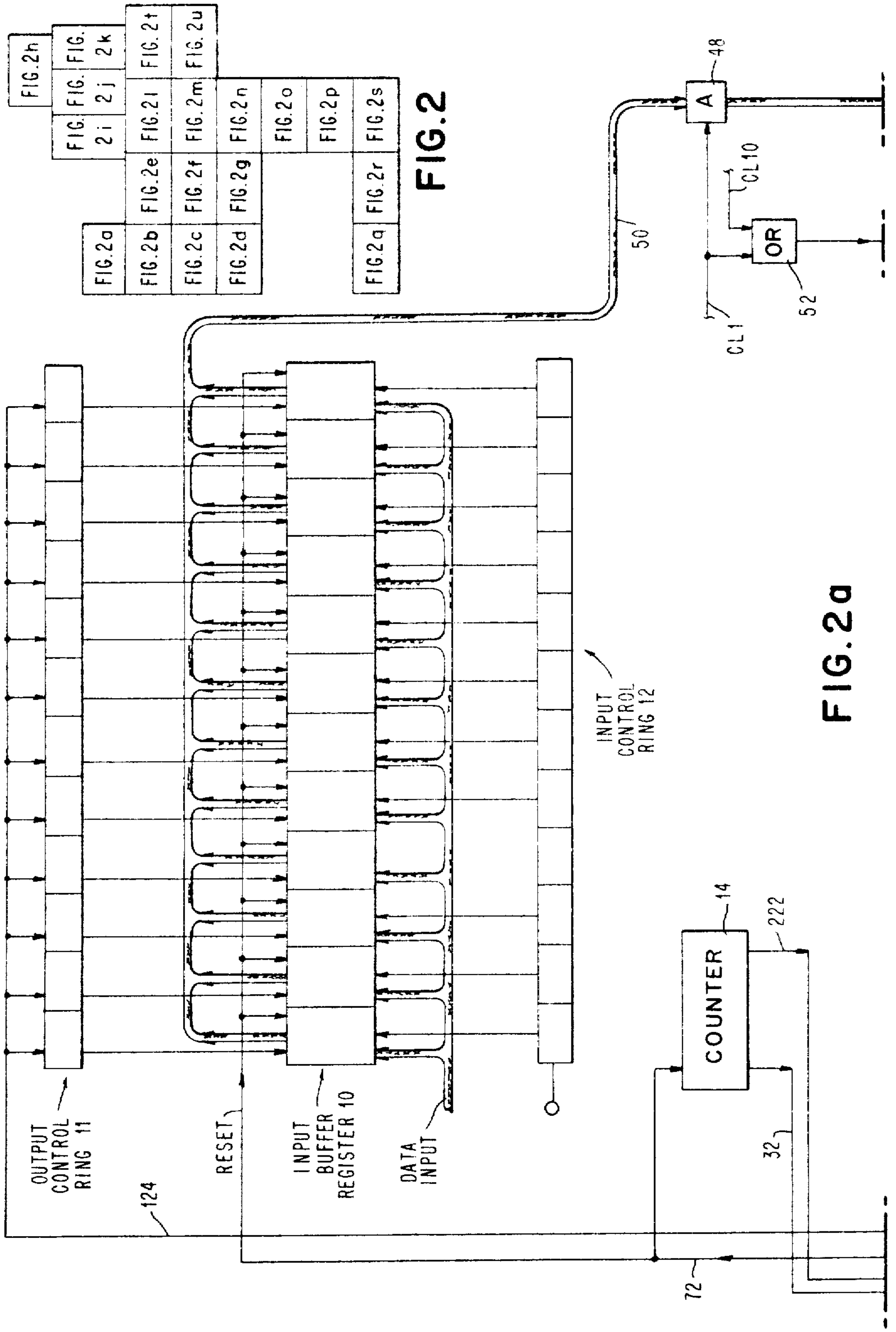
Figure 2B:
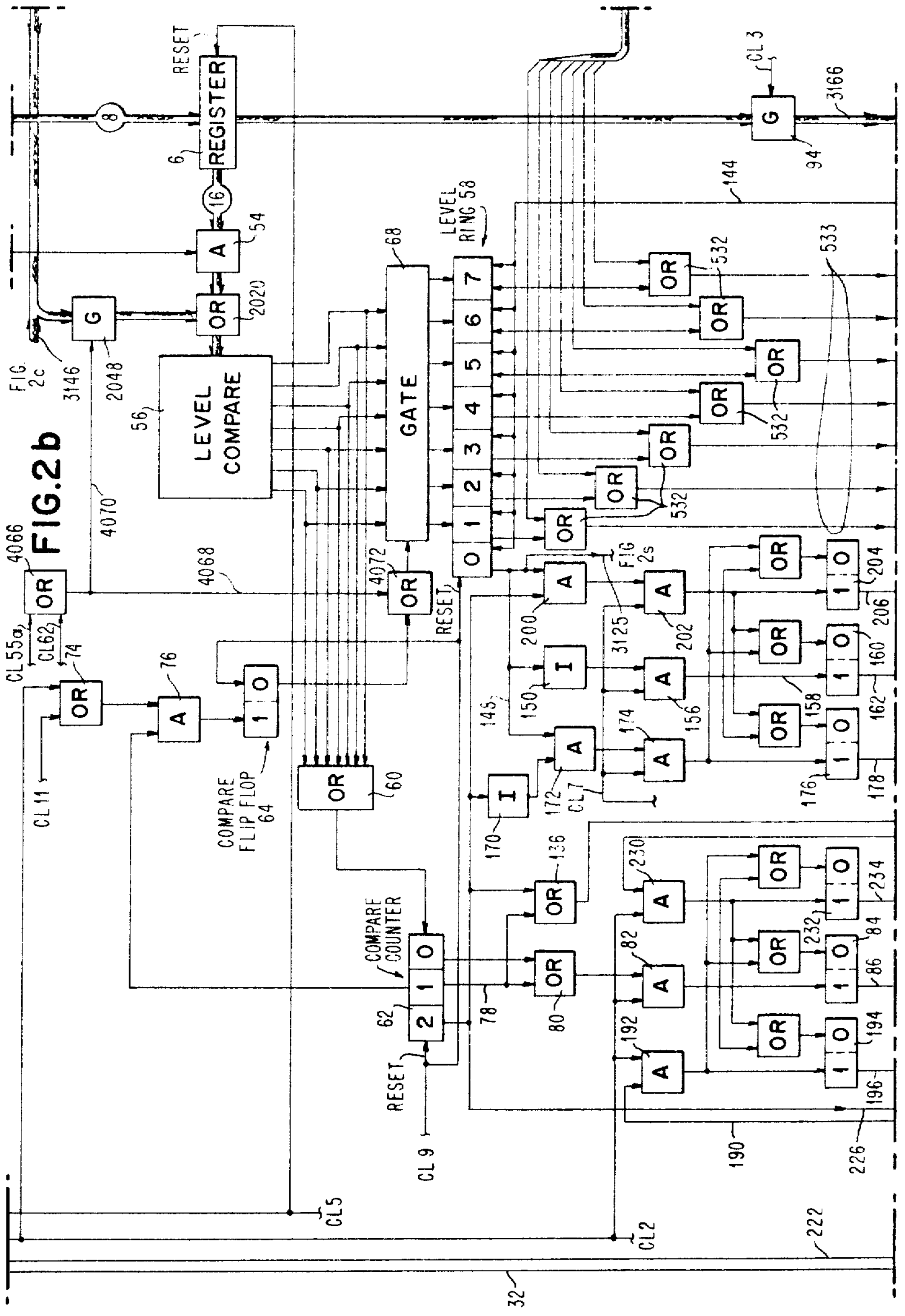
Figure 2C:
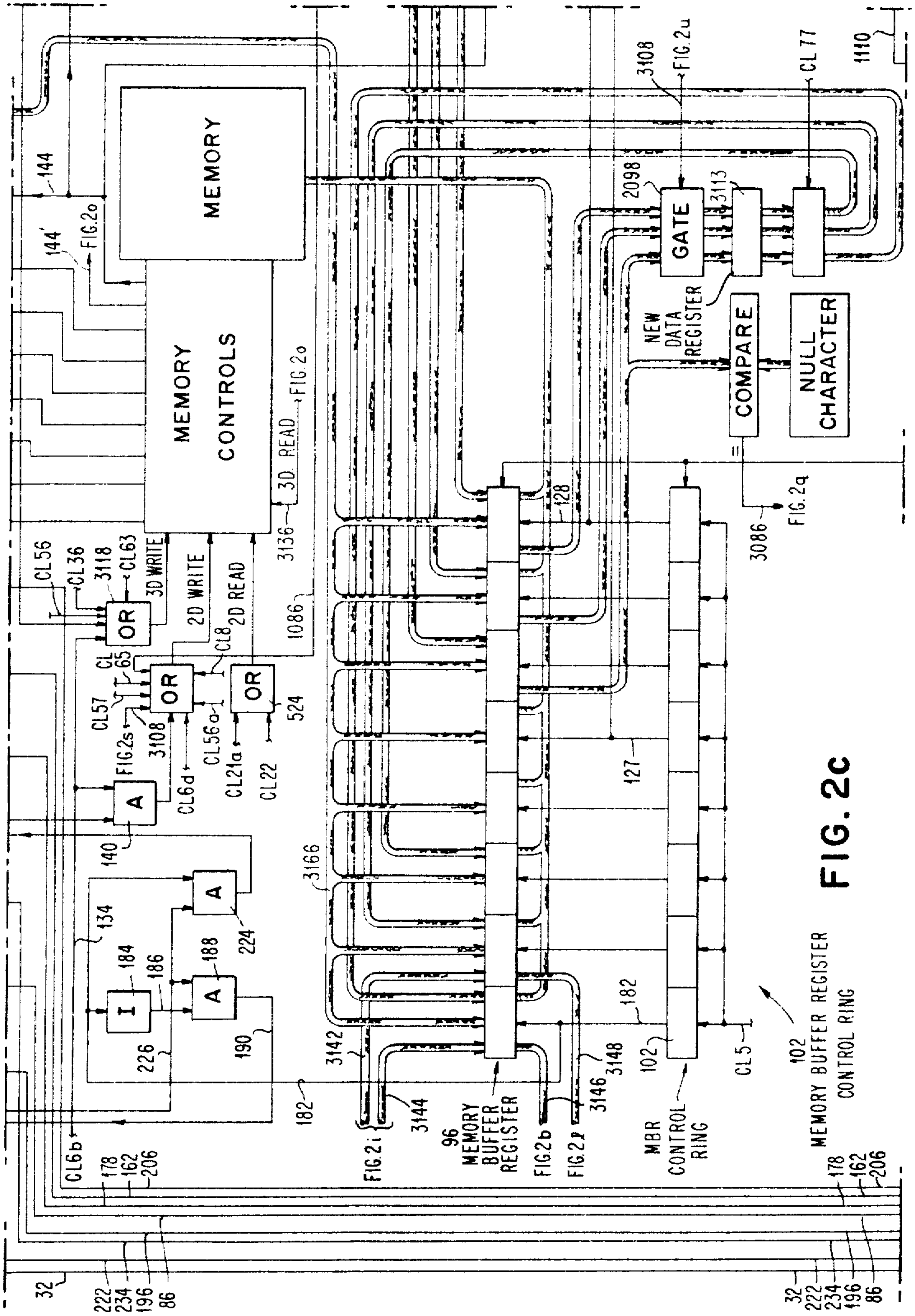
Figure 2D:
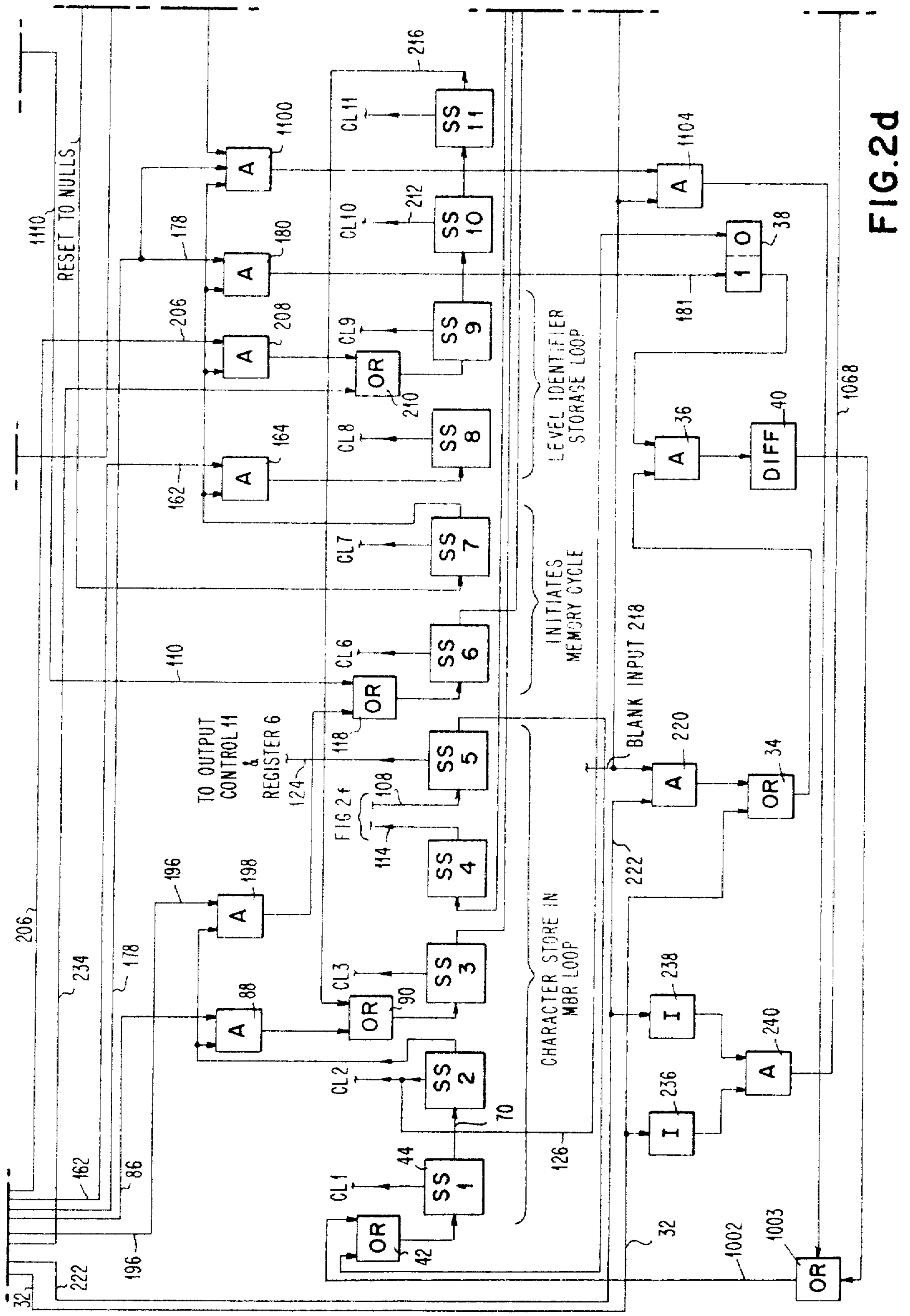

In discussing the remainder of the block diagram of FIGURE 1, the letter designations of the various blocks will be used for ease of reference. The Input Buffer, block A, is shown in FIGURE 2*a* and the contents of block B are shown primarily in FIGURES 2*b*, 2*c* and 2*f*. The Input Buffer serves the function of taking data from a relatively low speed input system, storing it temporarily and outputing it into the machine at a higher speed of which the machine is capable of operating. It functions merely as a temporary buffer storage and allows the actual machine circuitry to operate at optimum efficiency. The data flows from the Input Buffer a character at a time into block B labelled Input Compare, Level Controls and Input Controls.

Block B functions to examine each character and determine whether or not it is one of the chosen level identifier marks, i.e., ①–⑦, and if so, to break up the data string in accordance with the rules set forth above. Referring to Table 1 for example, it automatically places a level identifier mark in the number one position of a machine word, automatically provides for insertion of occurrence marks in the suitable special 2–D core planes, it automatically keeps count of the characters in a machine word so that the Memory Buffer Register will read each series of eight characters out as they occur into Main Memory and automatically will read a word out of the Memory Buffer Register into Main Memory when a second level identifier occurs before a total of eight characters are placed in the Memory Buffer Register and further operates in conjunction with the Memory Buffer Register resetting mechanism to automatically insert null characters in the proper positions of the Memory Buffer Register for subsequent read out and storage.

The Input Clock, section C, functions both to control the sequential operation of the Input Compare and Control Circuitry of section B and also, controls the generation and insertion of proper linking characters, addresses and discontinuity marks during an input operation when such hierarchically organized data is to be loaded into discontinuous storage locations in memory under control of the addresses of available storage locations obtained from the block D, entitled "Availability List." The subsequent specific description of an Input operation very briefly describes the operation of blocks A, B and C insofar as their operation in examining and breaking up an incoming data string in accordance with the indicated hierarchy therein, however, this particular facet of the input operation does not constitute a portion of the present invention and for a more detailed description of an inputing operation, reference is again made to the above identified copending application of Rex Rice.

The Availability List, block D, is a conventional element found in many memory systems and comprises a section of memory in which the extent, i.e., beginning and end, address of various portions of a memory which do not currently have any information stored therein are stored. Upon interrogation the Availability List block provides the next available blank section of memory to the Input section for the inputing of data into said memory. As stated previously, such an Availability List is well known in the computer art, reference being made to LISP in Programmer's Manual, Computation Center and Research Laboratory of Electronics, M.I.T., Cambridge, Massachusetts, March 1, 1960, section 6.3, "The Free Storage List and Garbage Collector." It should also be noted that as storage locations in memory are used up by Inputing operations, the Availability List including these used portions of memory is automatically updated.

Figure 2E:
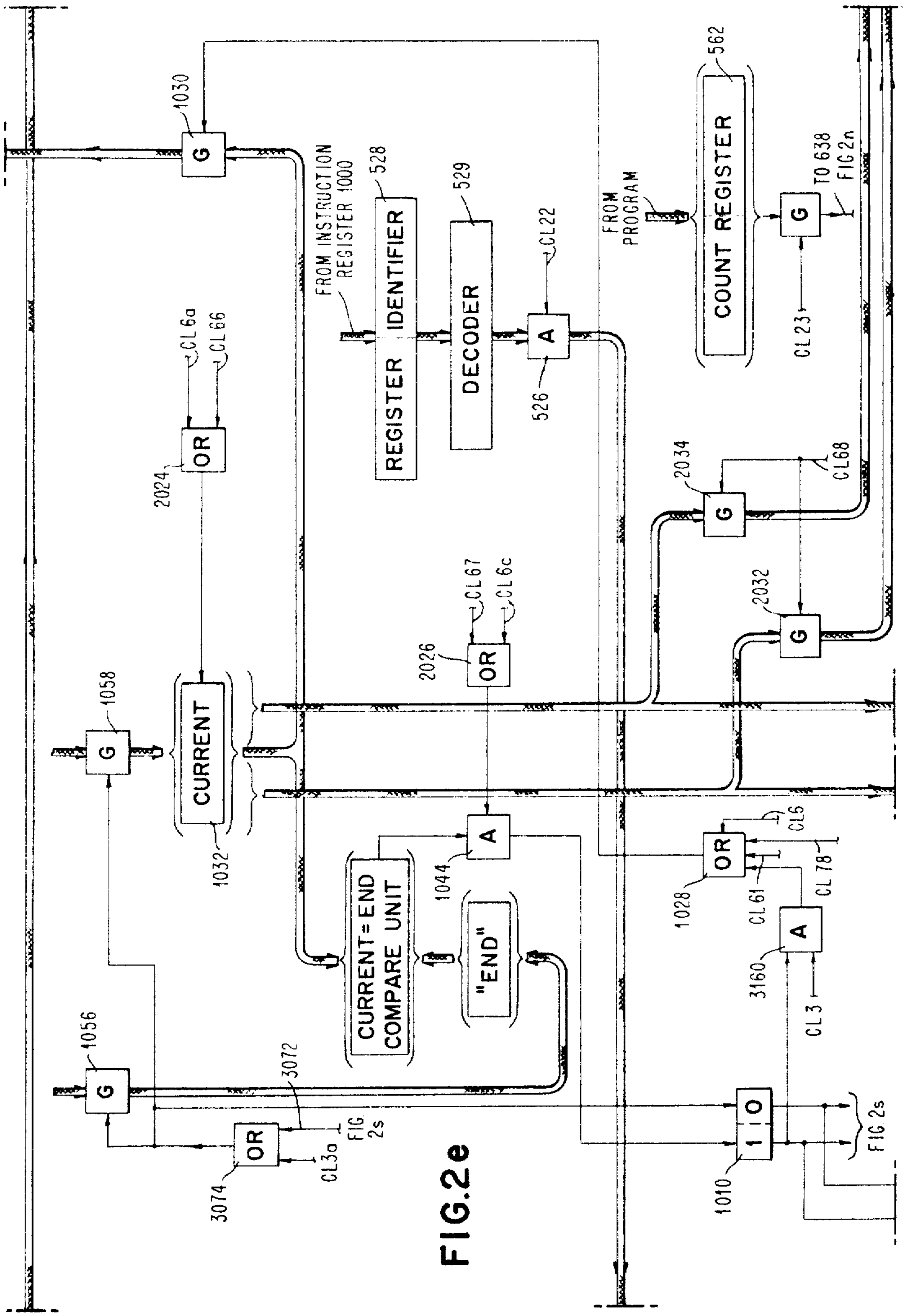
Figure 2F:
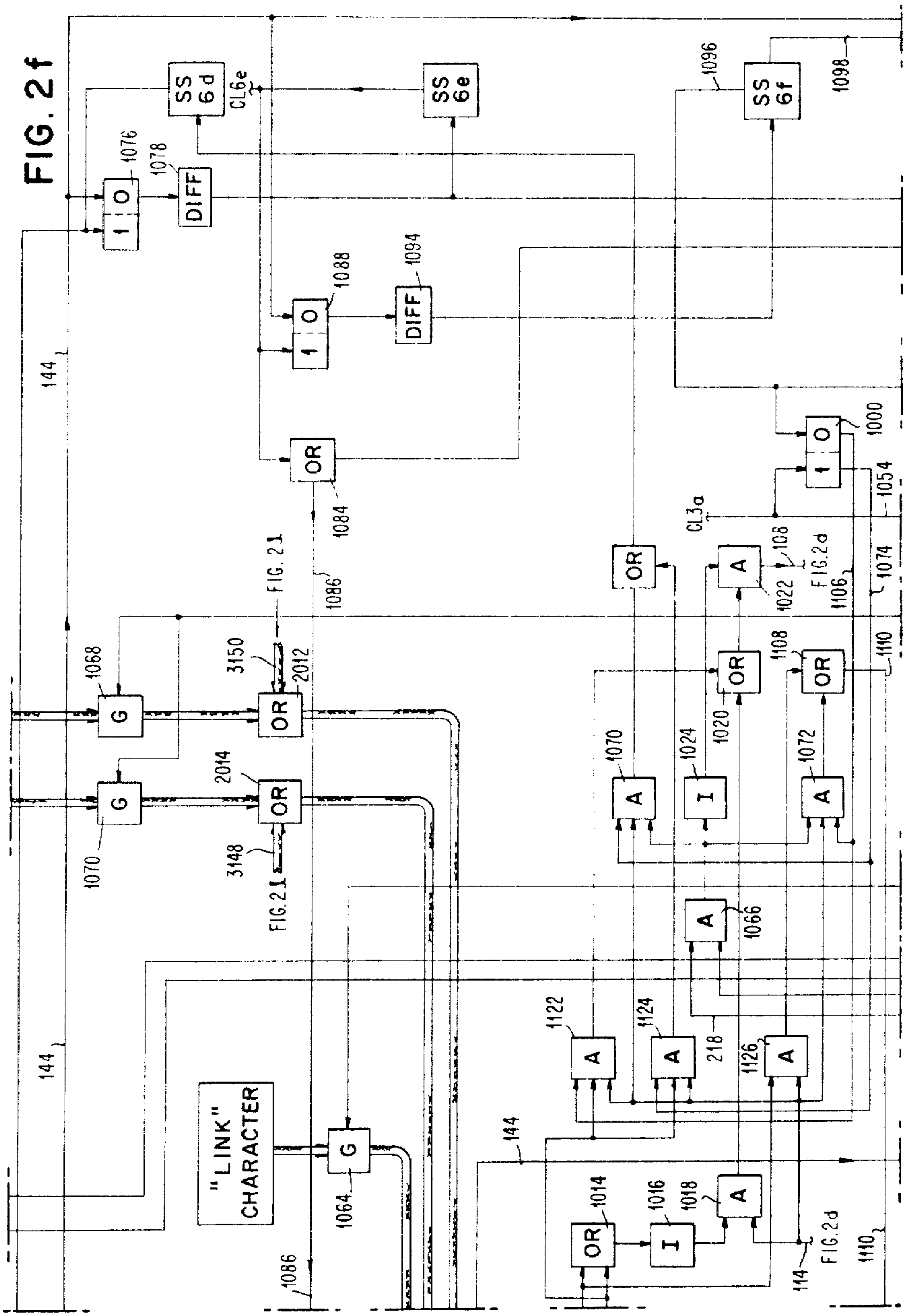
Figure 2G:
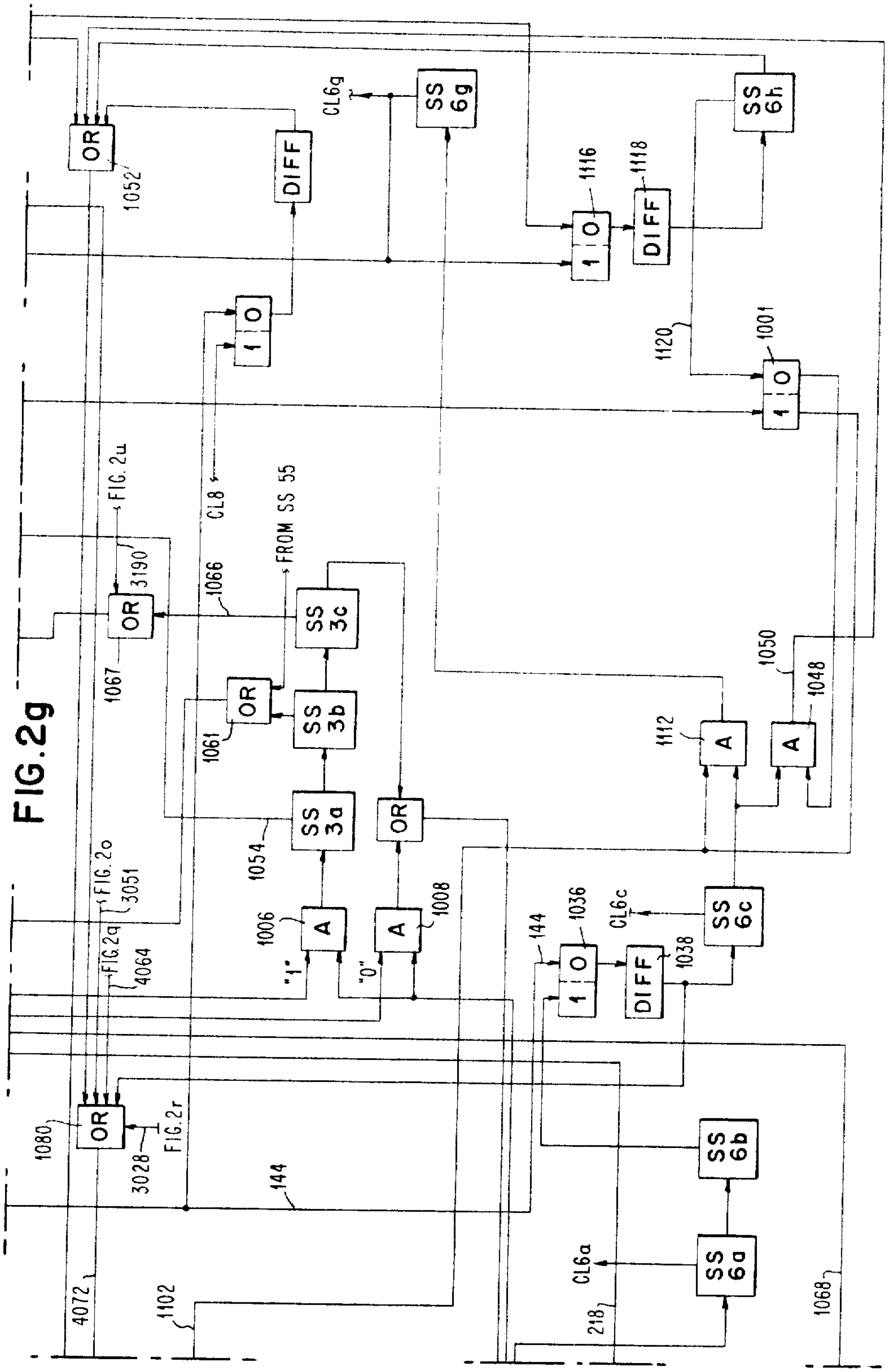
Figure 2H:
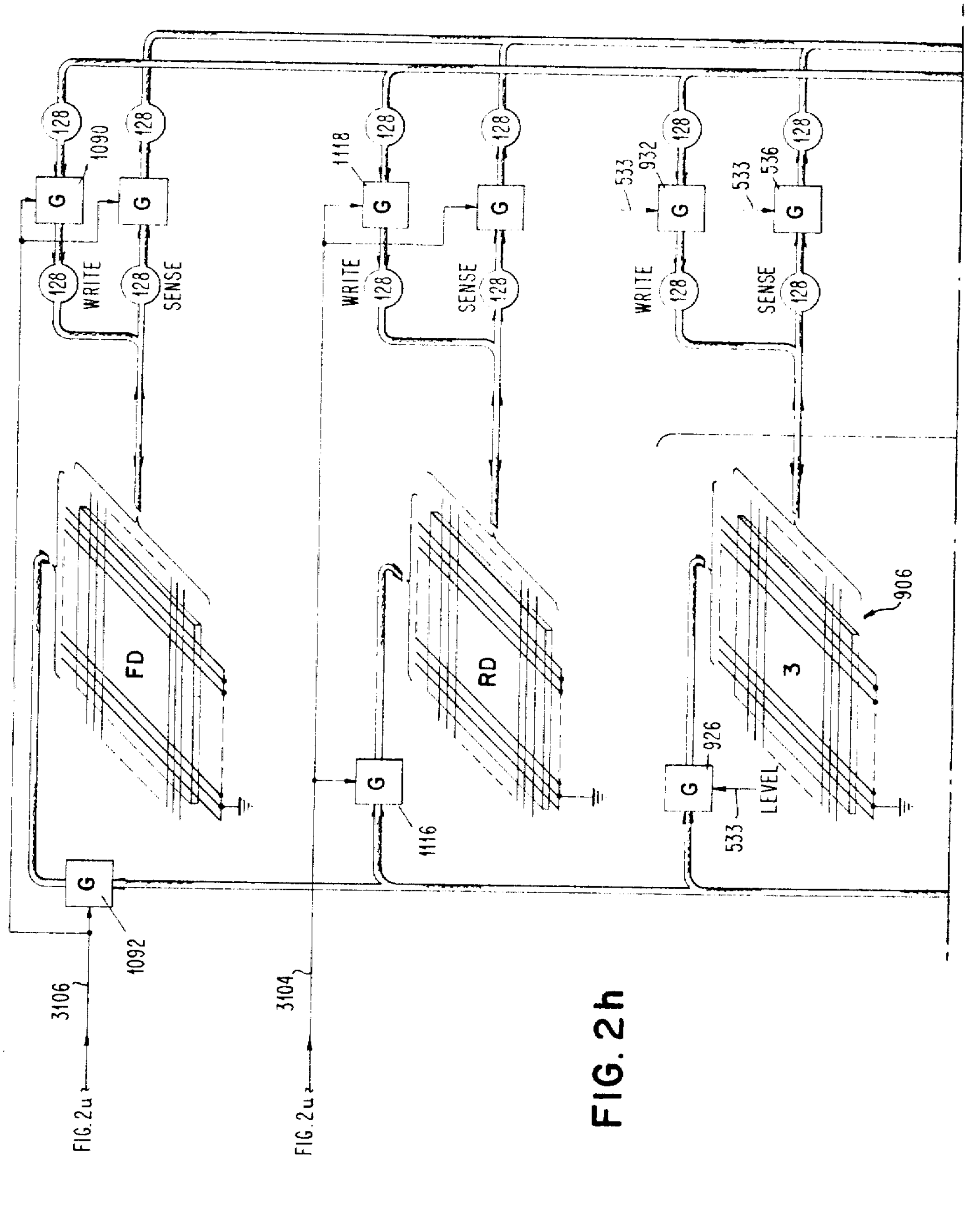
Figure 2I:
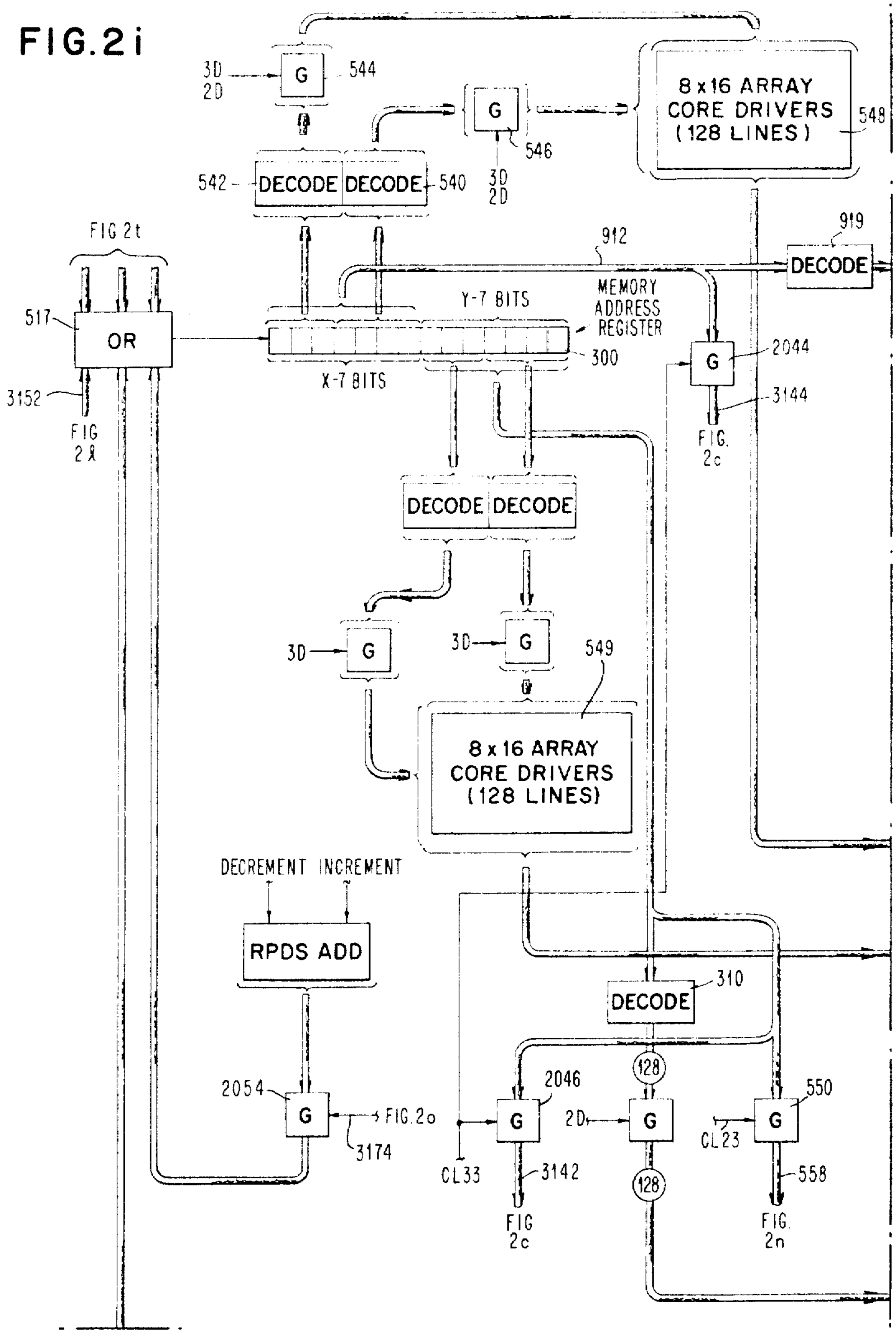
Figure 2J:
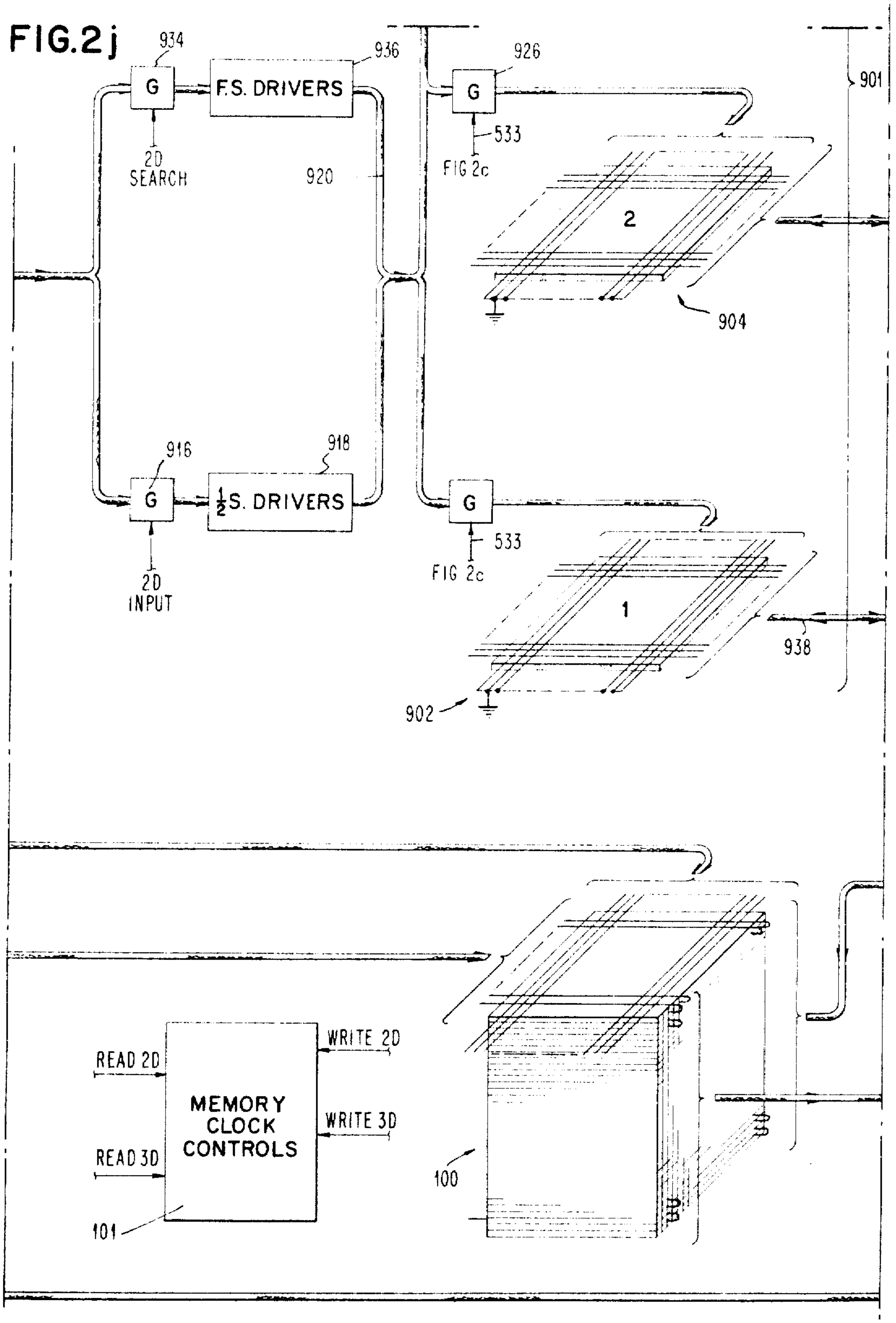
Figure 2K:
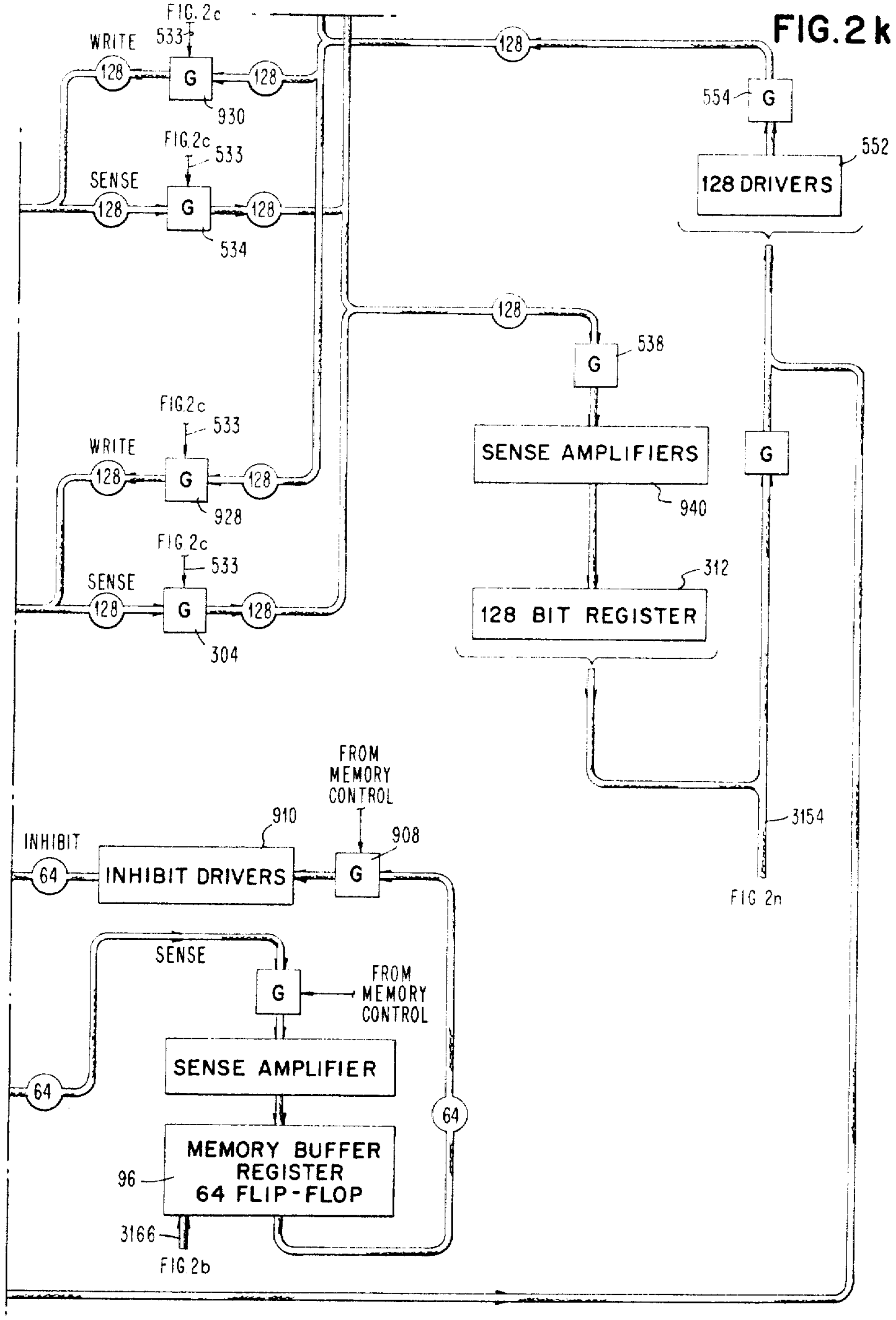
Figure 2M:
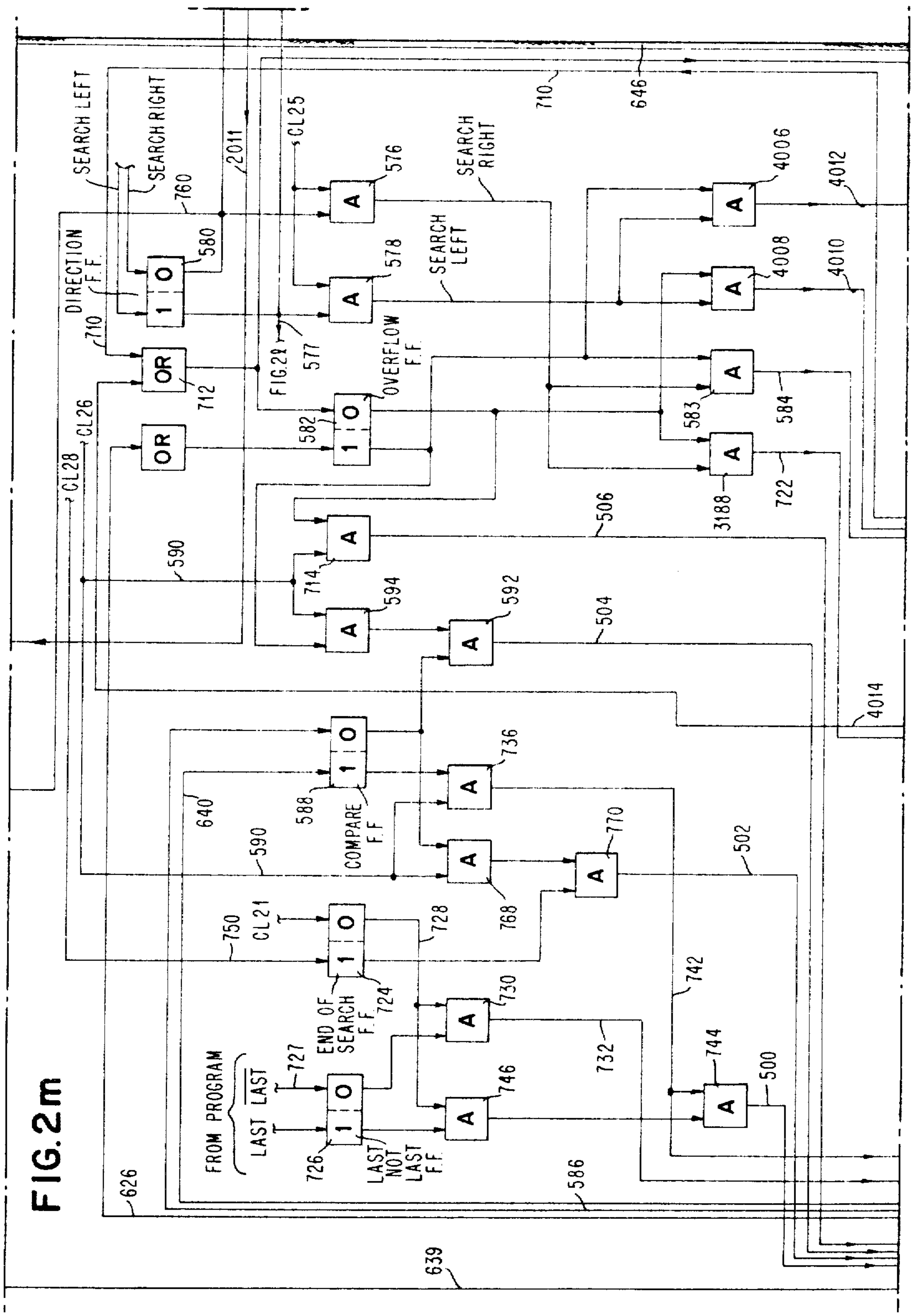
Figure 2N:
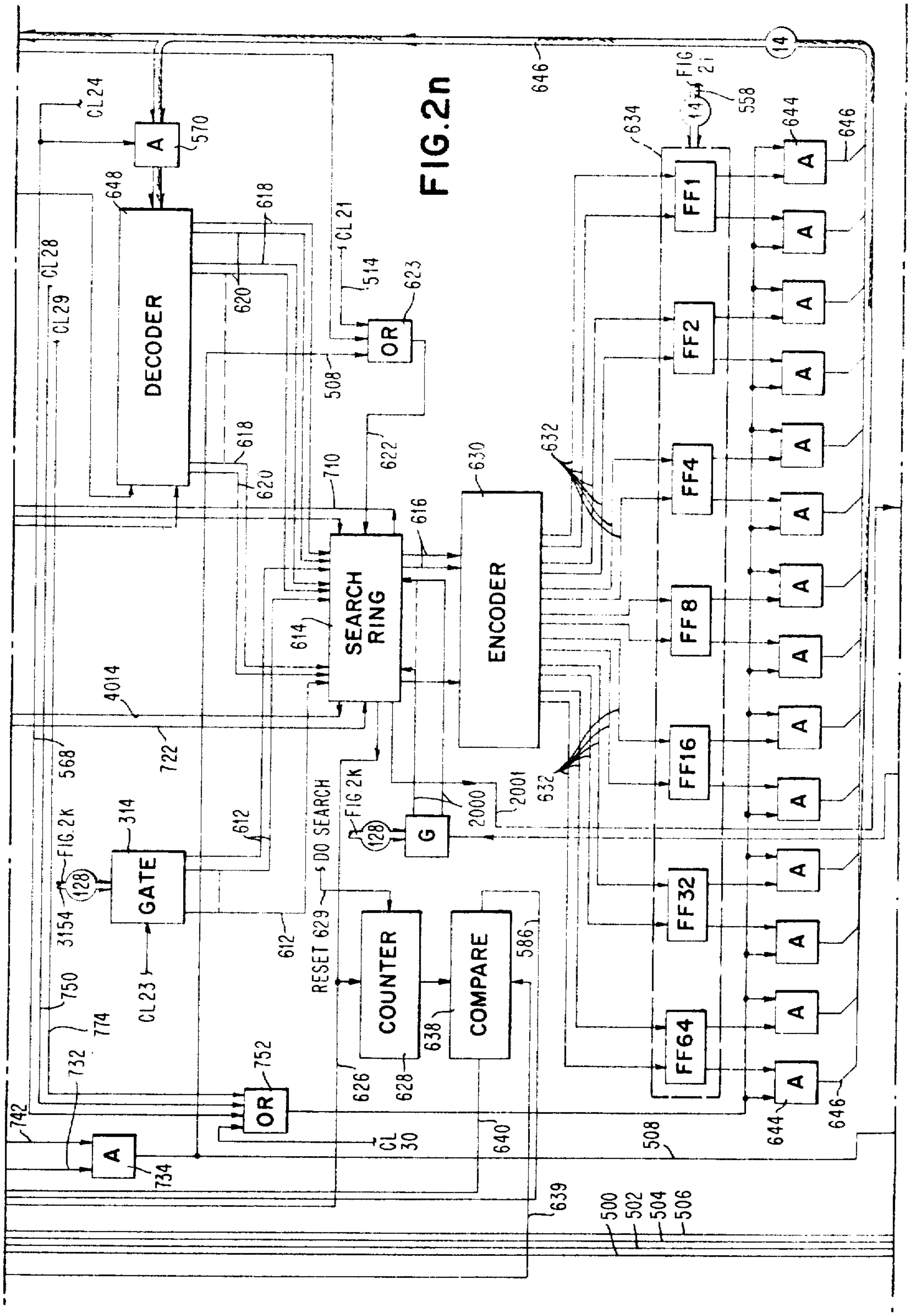
Figure 2O:
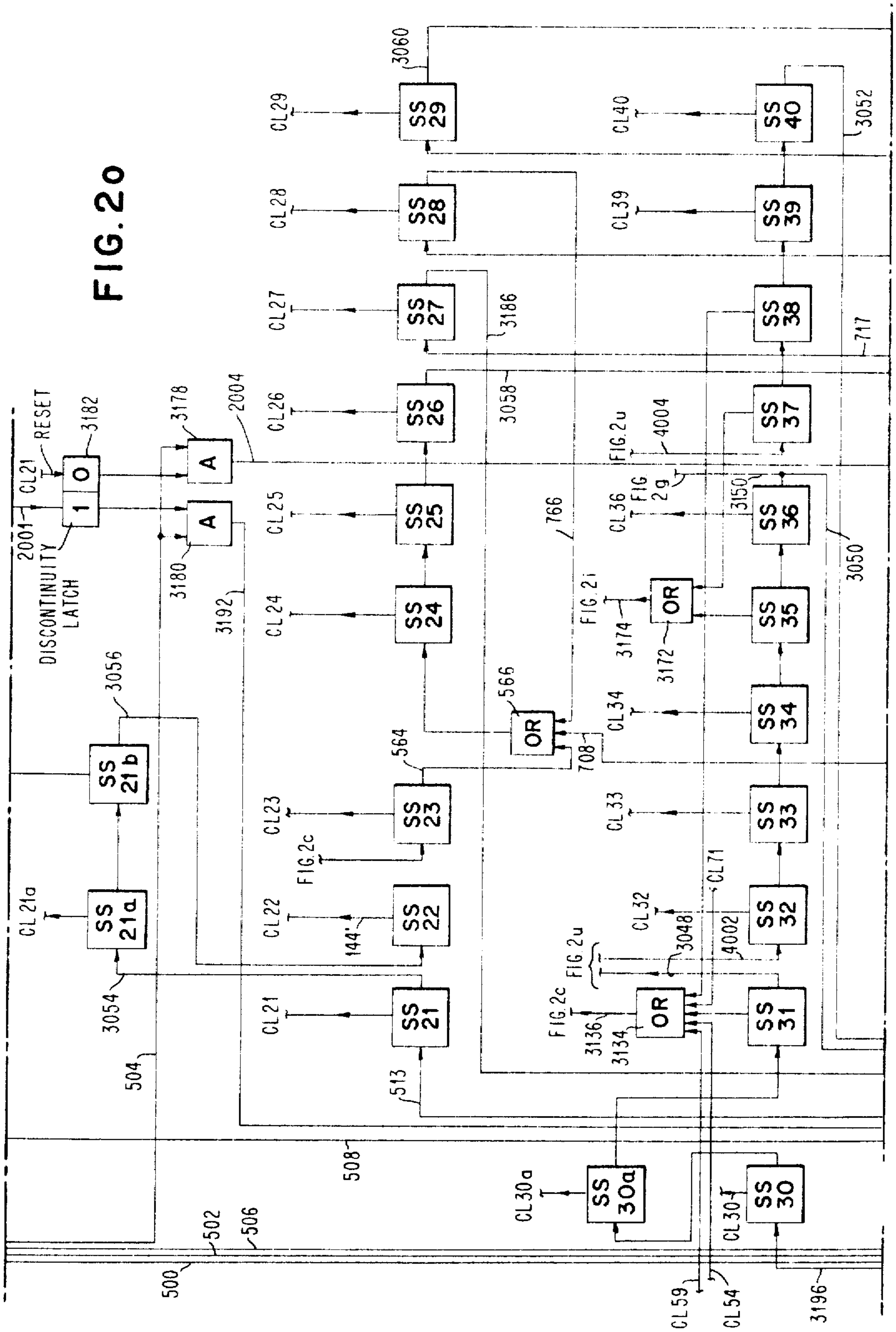
Figure 2P:
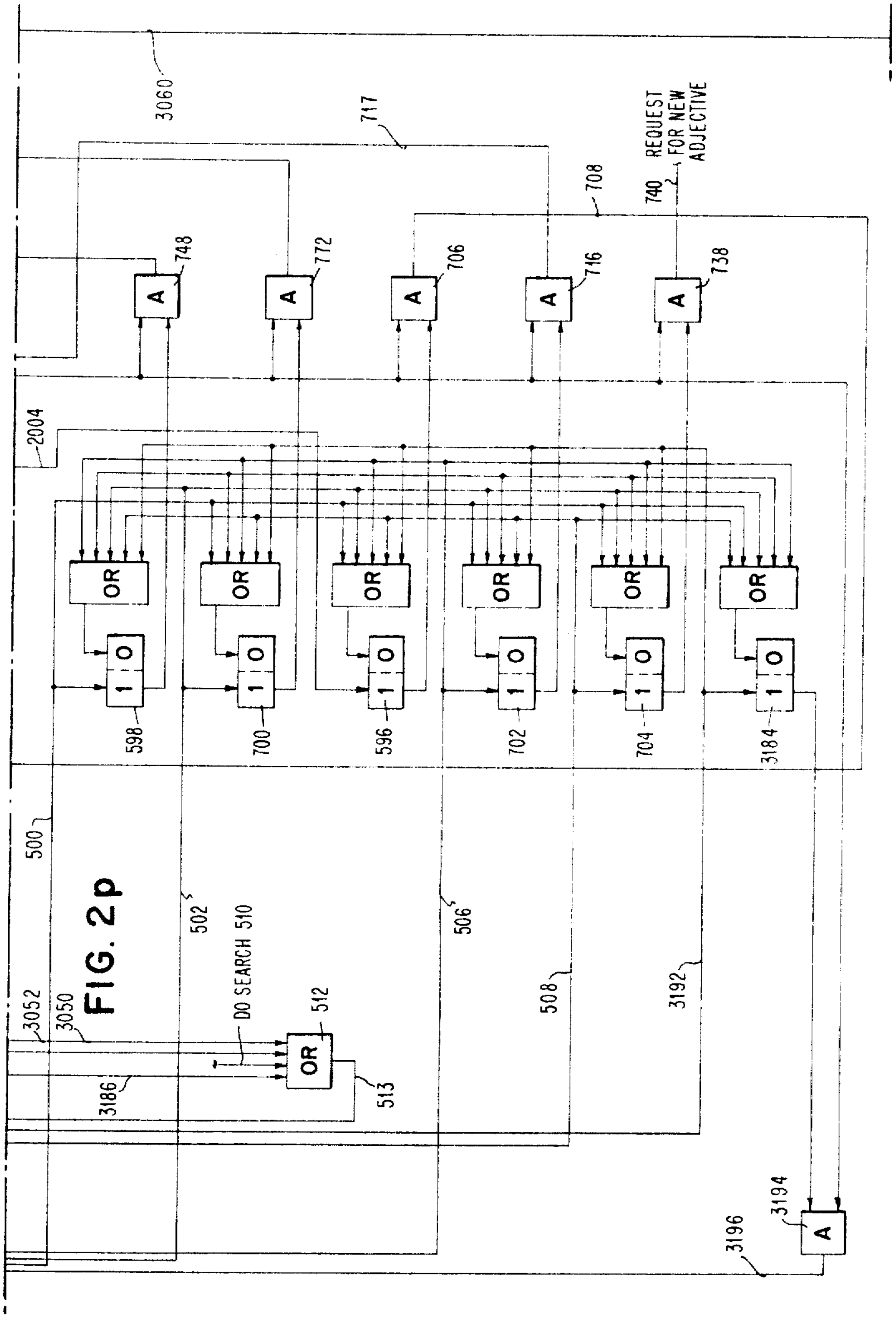
Figure 2Q:
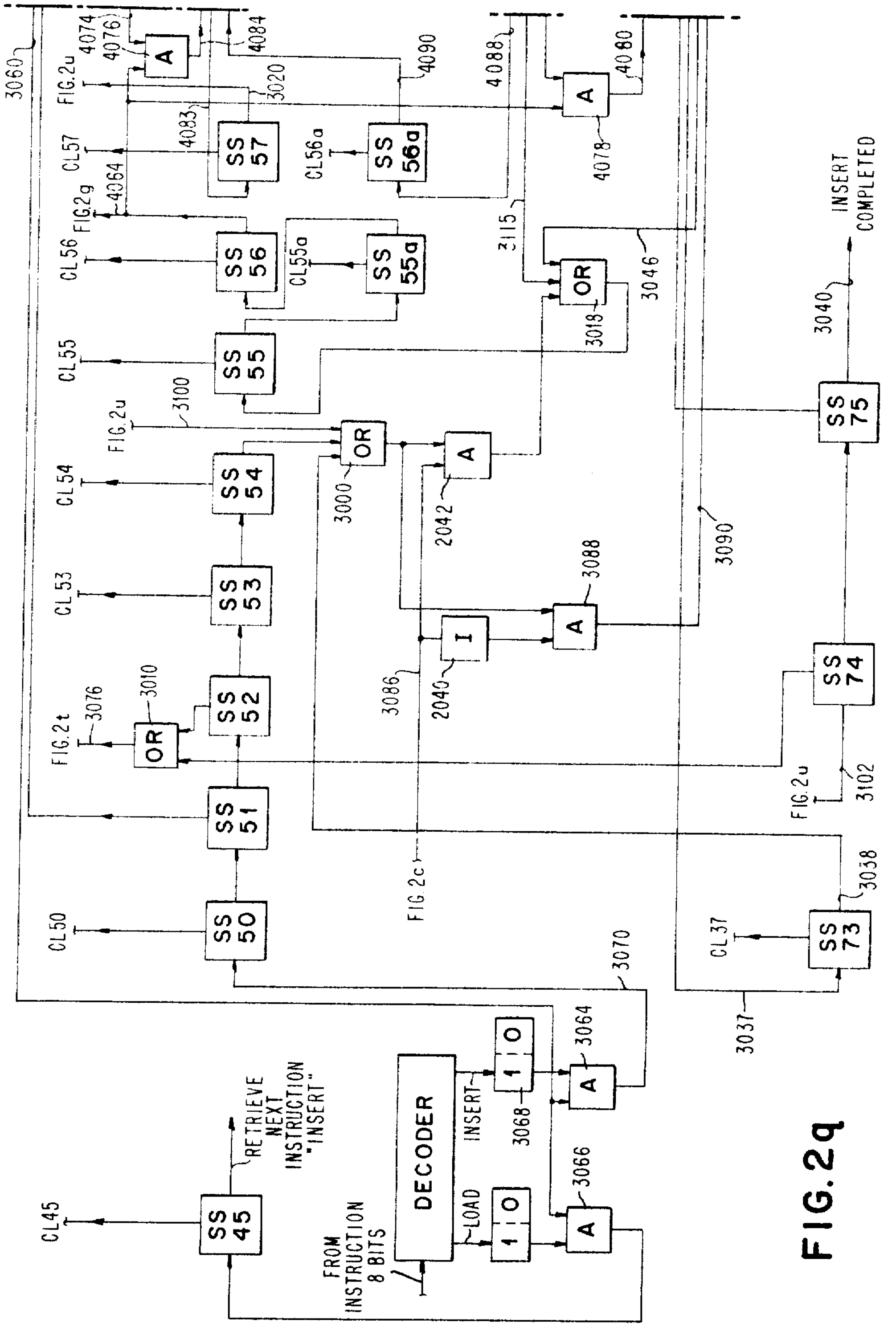
Figure 2R:
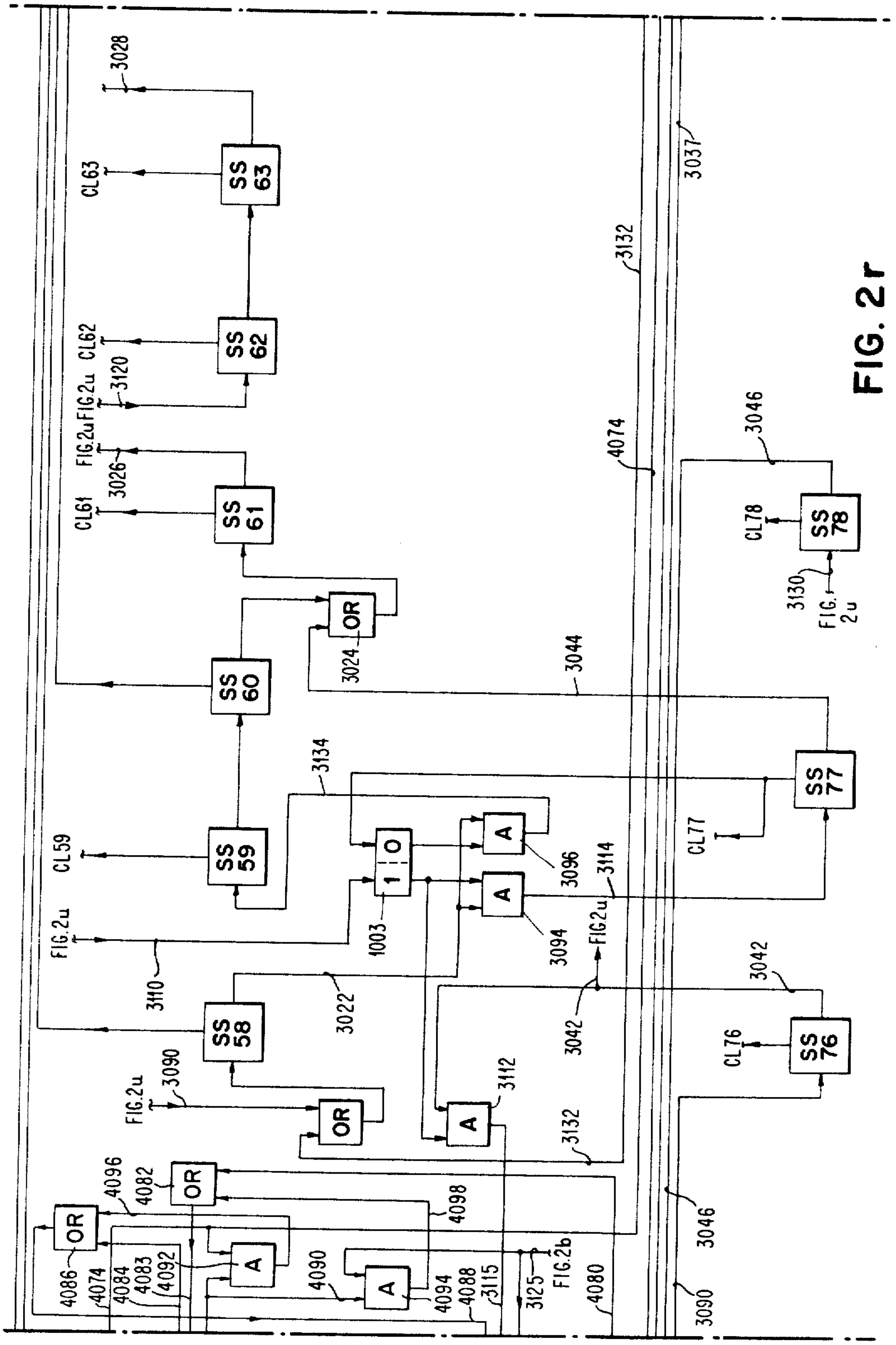
Figure 2S:
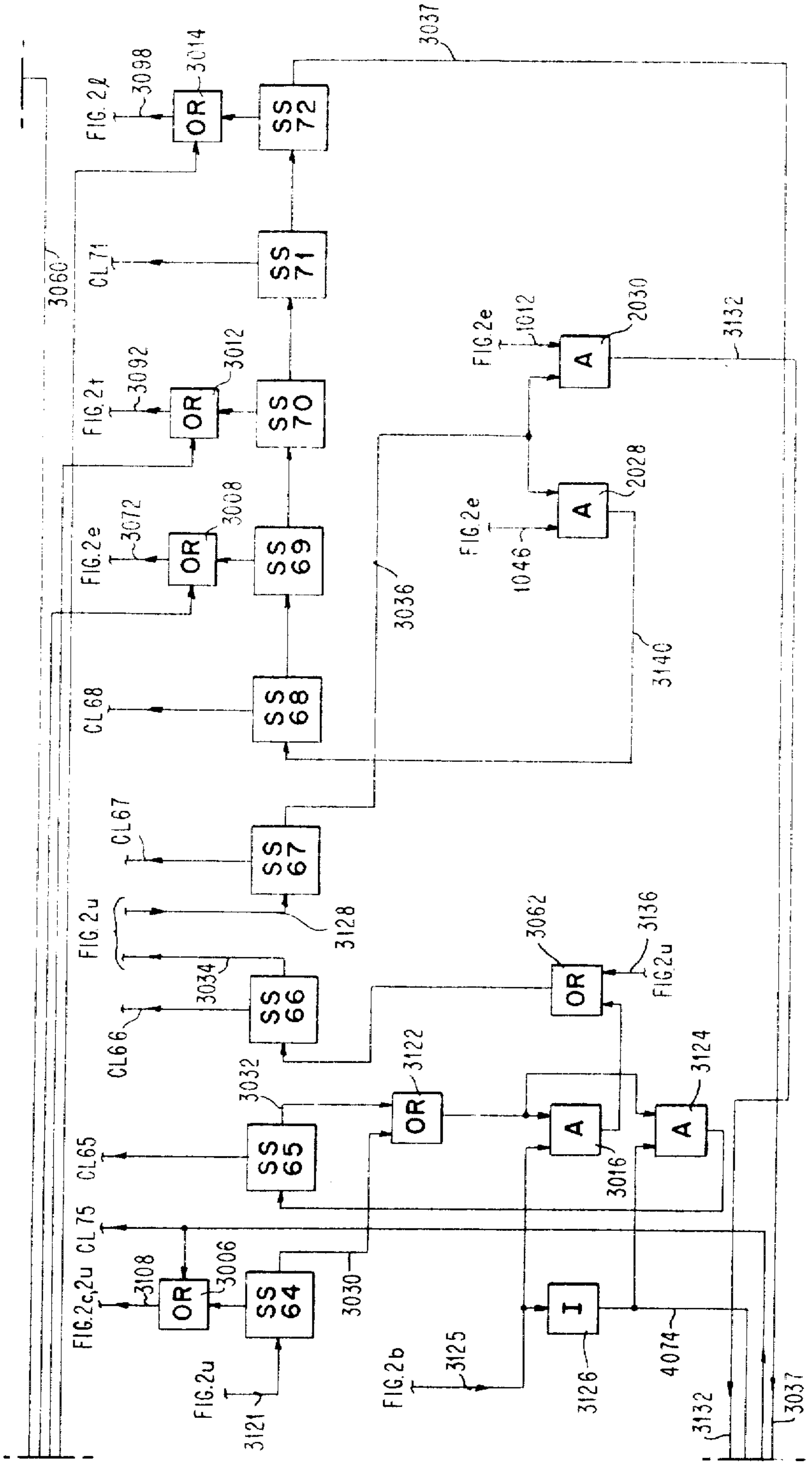
Figure 2T:
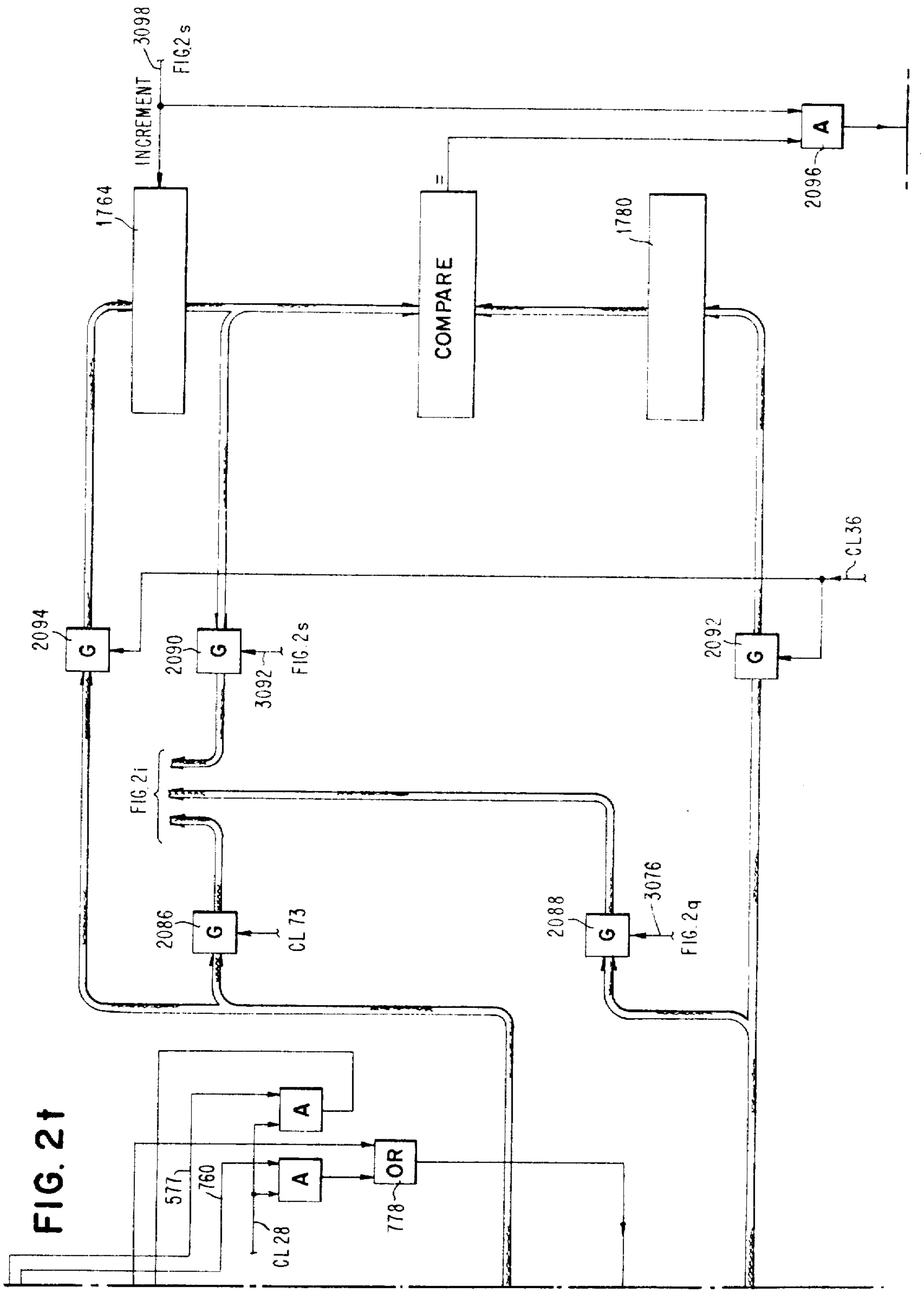

The Availability List is caused to transfer its extent addresses of an available section of memory into block E called, "Address Storage Registers and Address Compare" either under control of block B or block F, entitled "Insert Controls." Block E is located generally on FIGURES 2*e* and 2*t* while the insert controls of block F are shown primarily on FIGURE 2*e* and FIGURE 2*g*. An Insert operation is quite different from an Input operation and is accordingly provided with the separate set of controls indicated in block F whose sequence is determined by the Insert Clock, block G, which is shown on FIGURES 2*q*, 2*r* and 2*s*.

Data is fed from block B directly into the Memory Buffer Register during an Input operation which gates such information into Main Memory in accordance with the Input Clock C and at an address determined from the block E. The level marks are similarly placed in the proper positions in the 2–D memory from the Counting Register of the Input Compare circuitry which will be explained in more detail subsequently and proper link characters, linking addresses and discontinuity marks are caused to be placed in the Discontinuity Planes under the control of the Control circuitry indicated to be in block B.

Blocks D and E are alternately controlled by block B or block F depending on whether an "Input" or "Insert" operation is being carried out as will be explained more fully subsequently. However, block E actually operates in essentially the same manner in that it stores the beginning and end addresses of the Availability List and as each word is loaded into memory, the "begin" address in block E is accordingly incremented and a test made to determine if the available storage locations have been used up. When such tests is positive, a new Availability List is automatically transferred to block E and the proper links, link characters and discontinuity marks are caused to be inserted in both the 3–D and 2–D portions of memory. During an Insert operation, two other registers, i.e., Registers 1764 and 1780, and an associated Compare circuitry are actuated in which the "beginning" and "end" addresses of a data string stored in memory which is to be inserted in an existing data string are stored. This section of block E allows the system to keep track of whether or not all of the data to be inserted in a new section of memory has been so inserted. The operation of this facet of the system will be set forth more fully subsequently.

It should perhaps be stated at this time, that the essential difference between an "Input" and "Insert" operation is that with the Input operation, data is fed from external storage and merely stored in discontinuous storage locations in the Main Memory, thus, the system only is required to in effect perform linking in one direction. That is to say, the end of a linked data string does not have to contain an address linking it back into some other previous data string which was previously stored in memory. With an Insert operation, which is actually generic to the "delete" and "substitute" operations also, a portion of data must be inserted into an existing string at a given point in said string, such that the linking address to the new string must be formed at the proper point in the old data string and the end of the data string to be inserted must contain a proper linking address back into the old data string at the point just subsequent to where the original link was stored. Since it is quite apparent that a great many addresses must be remembered and checked, certain requirements must be met. For example, the data string to be inserted or substituted must already be stored in memory at some location and the beginning addresses of the data to be inserted must be either known or determinable and the point at which the insert is to occur must be specified. Thus, if the data to be inserted or substituted is already stored in memory at a determinable address, the beginning and end address of this data string may be stored in the Insert Data Begin and End Registers 1764 and 1780 as mentioned previously.

Since the insertion step is quite different from the relatively simple Input operation, a separate Clock section, block G, and Controls, block F, have been provided.

The Main Memory indicated in dotted lines, block H, in FIGURE 1 comprises both the 2–D memory and the 3–D memory together with the various registers, and automatic clocking mechanisms which are quite conventional in both organization and operation. The operation of such memories is very well known in the art and a detailed description of all facets of such operation will not be attempted. A specific description of the operation of the 3–D memory section keyed to the timing chart of FIGURE 12 is included herein only as a general background of such conventional memory operation. The description of FIGURES 2*h*, 2*i*, 2*j* and 2*k* will make it apparent how the addresses for both the 2–D and 3–D memories are derived in a general logical block form and it is believed that this description will adequately describe and define the operation of this portion of the system. It will be noted that the memory controls of the memory and the Memory Buffer Register are shown on FIGURE 2*c* as well as in FIGURES 2*h*, 2*i*, 2*j* and 2*k*. It should be stated that these units are actually the same and the memory controls and memory are shown in block diagram in FIGURE 2*c* for convenience and clarity in describing an Input operation whereas the Memory Buffer Register 96 and its associated Control Ring are shown in great detail insofar as various data cables and associated gating circuits are concerned while, it, i.e., the Memory Buffer Register, is shown as a simple block in FIGURE 2*k*. Thus, FIGURE 2*c* illustrates how the actual data is gated into and out of the Memory Buffer Register as well as showing how level marks are specified on the lines 253 from the Level Ring 58. FIGURES 2*h*, 2*i*, 2*j* and 2*k* comprise what is in essence a detailed functional block diagram of the various registers, drivers, decoders, etc., necessary for addressing the 2–D and 3–D portions of the memory. These figures also illustrate how the 2–D and 3–D portions of memory are wired and accessed. Thus, it may be seen that these FIGURES, i.e., 2*h*–2*k*, are for the purpose of describing the addressing of memory rather than for showing data flow actually read in or read out of the Memory Buffer Register 96 whereas the showing of FIGURE 2*c*, is concerned with the actual transfer of data into and out of the Memory Buffer Register in accordance with the system controls. It will be noted that these figures will all be described in greater detail subsequently, both with respect to the general description of FIGURE 2 and also in the specific Input, Insert and Search examples to follow.

The memory disclosed and described in this embodiment of the invention is a magnetic core storage type of memory; however, it is be understood that other types of two and three dimensional memories could equally well be used in practicing the present invention. For purposes of subsequent description, it will be assumed that the three dimensional portion of memory is 128 x 128 in the X and Y directions and is sixty-four bits deep, thus, as stated previously, allowing eight character words of eight bits each. The special core planes as set forth in the present embodiment are likewise 128 x 128 in the X and Y direction, thus, having a possible binary bit position for each of the 16,384 machine words in the associated Main Memory. In the embodiment of the invention disclosed in the drawing of FIGURES 2*h*–2*k* and in the specification, the special core planes are shown directly above the 3–D portion of memory and it is believed that this would be the most convenient type of an arrangement for making such a memory; however, it is to be understood that the special core planes could be located remotely from Main Memory, the only requirement being that addresses determined for one have a 1 to 1 correspondence for addresses determined for the other.

Blocks A, B, C, D, E, F and G comprise that portion of the system which is concerned primarily with inputing or altering data in memory. It should be noted, of course, that the Main Memory, section H, will be used both for inputing and searching and that block I indicated as "Address Storage Registers" comprises Registers 764 and 780 which are used both during Inputing and Searching operations as will be described subsequently. Blocks J, K, L and M together with dual purpose block I comprise that portion of the system concerned with searching such a linked hierarchically organized variable field length data storage system. As stated previously, much of the circuitry of the Main Memory including the 2–D and 3–D portions as well as all associated address registers, drive rings, decoders, counters, etc., will be common to both Input and Search operations. The following descriptions of FIGURES 2*h*–2*k* as well as the specific description of the Input, Insert and Search operations which are keyed into FIGURE 2 will clearly indicate which major functional components of section H are utilized for both Inputing and Search procedures.

As stated previously, block I functions during both Inserting and Searching operations. For the Insert operation, block I stores the extent address as of both data to be inserted and the extend address of the particular word in Main Memory into which said insert is to be placed. These addresses are utilized by the system in a manner that will be apparent from the specific description of the Insert example. During a Search operation these Registers 764 and 780 are utilized to store the beginning and end addresses of a desired data string as a result of a Search instruction. It is, of course, to be understood that these addresses are the final result of any Search procedure.

Block J includes the registers for storing the search information and includes Registers 516, 562 and 528 in which is stored the information derived from the Search operation indicative of the starting address of a data string to be searched the hierarchical level identifier which it is desired to find and the number or occurrence of said level identifier in the data string, all of which information is derived from the Search program.

Block K indicates the Level Search Ring for searching both the special core planes in which the level identifier occurrence marks are placed and the Forward or Reverse Discontinuity Plane depending upon the direction of a current Search operation. It is this section of the system which concurrently searches data for indicated hierarchical level marks and watches for indication of discontinuities in a data string and when found, determines at which point a search should continue and automatically retrieves linking addresses, gates new information from the discontinuity planes and level planes into the Search Ring and automatically proceeds with the search until another discontinuity is detected.

Block L is the Search Clock for block K which controls this section of the searching system as long as no discontinuity in the data string is detected. Block M, the Discontinuity Clock, includes the various timing controls necessary to gate the linking addresses out of Main Memory whenever a discontinuity is detected in a forward direction and control the setting of new Discontinuity Plane and Level Plane information in the Control Ring and continuing the search. A section of the clock is also provided in the event that a discontinuity is detected when going in the reverse direction and provides for accessing a Reverse Push-Down Store which contains the necessary linking addresses for performing such a reverse search. The details of the operation of this will be apparent from the specific description of the Search operation set forth subsequently and also from the general description of FIGURE 2.

It will be noted that the Insert Clock, block G, the Input Clock, block C, Search Clock, block L and the Discontinuity Clock, block M, all comprise a plurality of single shot multivibrators which are well known in the art. These single shots are arranged so that when an input pulse is supplied, a turn on pulse is produced and after a finite duration of time when the turn on pulse stops a short duration pulse will be produced which output pulse may be used to turn on, for example, the next sequence of the clock. All of these Clock sections comprise such single shots tied together through appropriate logical circuitry for controlling the sequencing of operations within their associated portions of the system.

Before proceeding with a description of the specific embodiment of the circuitry necessary to accomplish the present invention with reference to the logical schematic diagram of FIGURE 2, it is thought that the invention may best be set forth and described by means of a number of specific examples which clearly illustrate the operations anticipated by the present system. FIGURES 5 through 10 show in a diagrammatic way, the method in which the data is stored in both the 2–D and 3–D portions of the memory and also clearly illustrates the location of the special link character and the linking addresses which are generated by the present system and automatically placed in the appropriate locations in a data string to effect such data linking. While the figures are essentially clear and complete in their own right, occasional reference will be made to certain elements of the system as shown in the logical schematic diagram of FIGURE 2. For example, from time to time mention will be made of certain of the registers where various critical addresses are stored and subsequently compared in order to determine for example, whether or not any storage room remains in the memory in the particular storage location provided by the Availability List and whether all of a given data string to be inserted has in fact been inserted during the machine operation.

The format of all six figures is essentially the same. In the upper line it will be noted that there is a pair of lower case letters, i.e., "aa," "bb," "cc," etc. These are intended to represent the storage position or address within Main Memory where the associated column of data or data word is stored. The next line indicated by a very fine horizontal line represents the Forward Discontinuity Plane. The line below this represents the Reverse Discontinuity Plane. The space between the two Discontinuity Planes and the three special level planes is to indicate that although only three special level planes are illustrated in these drawings that there are actually more although for the sake of clarity, only three have been shown. It will thus be noted that all five of the special core planes shown in the figures are part of the 2–D memory. Under the 2–D memory, is the Main Memory portion in which the vertical columns of data represent an eight-character machine word. It will be noted that in all of these figures, also, that once the data is stored in memory, the standard rules for inputing the data have been observed, i.e., the hierarchical level identifier symbol must always be in the first word position and every time such hierarchical level identifier mark is present in a word the appropriate special core planes have occurrence marks set therein. It will of course be noted that the small "x's" located in the various core planes indicate an occurrence mark or a binary "1" stored in this position of the 2–D memory. It will be further noted in these figures that the following character is utilized to indicate a null (Ɏ). For the purpose of describing the system with respect to FIGURES 5 through 10, it will be assumed that the system automatically arranges the data within memory and sets the various special level identifier occurrence marks in accordance with the language rules set forth previously. This aspect of the operation will not be specifically described as it is not part of the present invention, but rather of the above mentioned copending application of Rex Rice. Therefore, the following description will concern itself primarily with the manner in which the system recognizes the need for the linking characters and linking addresses and the manner in which it handles the inputing of data insofar as supplying the various storage locations upon demand to the memory system.

Figure 5:
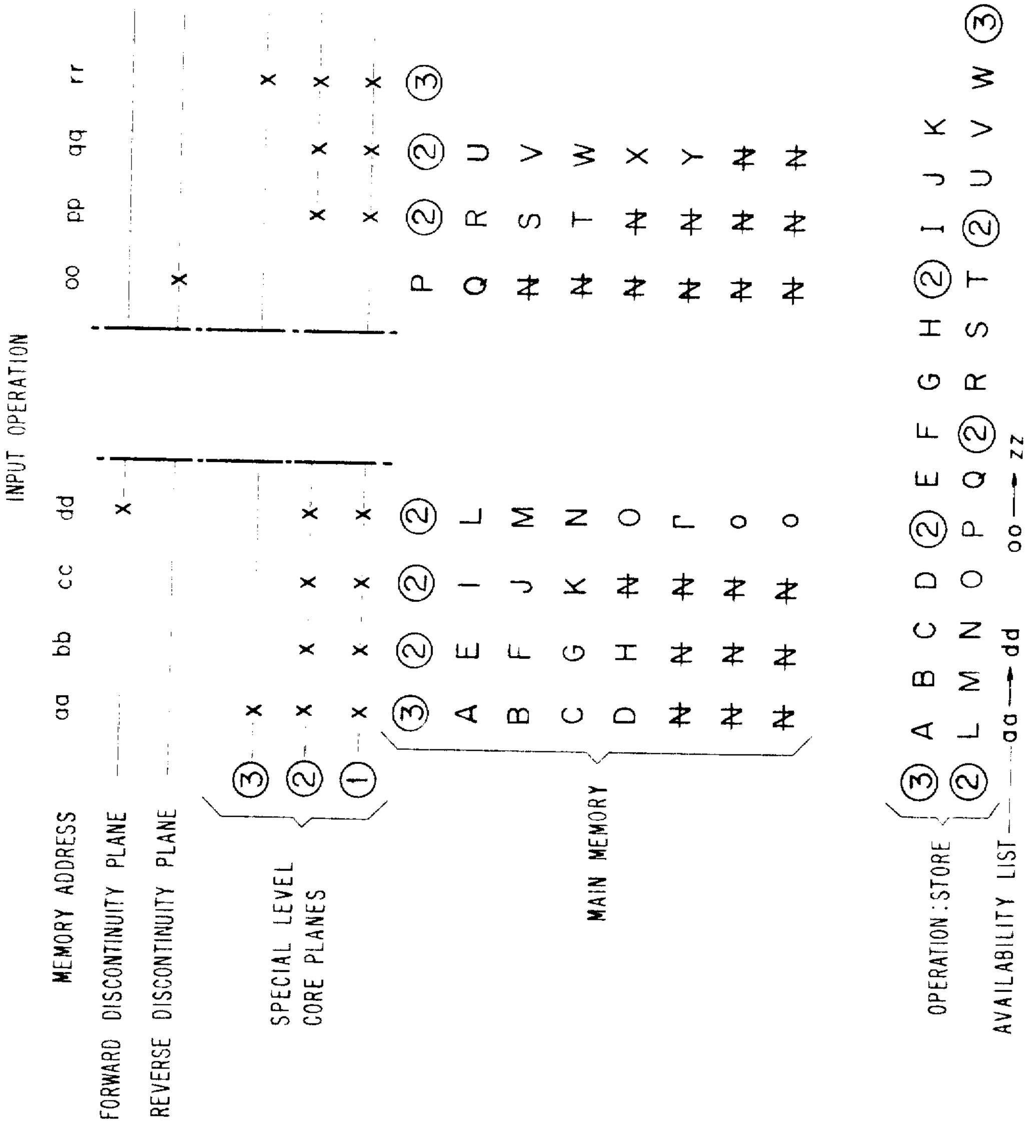
FIGURE 5 is a diagram illustrating how the present system effects an input of a long string of data into noncontiguous storage positions.

Referring first to FIGURE 5, a simple Input operation will be described wherein a relatively long string of data is to be stored in two non-contiguous storage locations, thus necessitating a link therebetween. For this particular operation, the conditions specified by an Input operation are listed at the bottom of the figure wherein the data string to be stored is shown. Also, the condition of the Availability List insofar as the next two available storage locations in sequence is illustrated. It will be noted that the first Availability List comprises a total of four machine words which is obviously insufficient for storing the entire data string. In inputing this data string, the system would proceed as follows. First, the extent of the Availability List would be stored in the Current and End Registers 1032 and 1040. Then the inputing of data would begin and a first machine word comprising the ③ A B C D would be stored in the Memory Buffer Register under control of the Input Buffer and Input controls in a manner shown in column 1 of FIGURE 5 and then the ② would be detected and the remainder of the first word would be filled with nulls (Ɏ) and a signal given that the system is ready to store said first word. At this point, the current address of the Availability List would be transferred to Memory Address Register 300 and a Storage operation would follow at this address i.e., "aa." After the Storage operation, the Current Address Register 1034 would be incremented by one count and a Compare made with the Register 1040 to determine whether the addresses were the same indicating that no more storage positions were left in the memory at this Availability List location. However, the current address is now setting on position "bb." Therefore the system proceeds to process and store the second word of the data string ② E F G H plus the nulls. Again, the storage step is repeated, and so on with the third word and the fourth word. However, now a Compare signal will be obtained when the current address "dd" is equal to the "end" address. The system will know that the fourth word is the last one that may be stored in this location. Therefore the ② L M N O word is stored in the first five character positions of the word and a special "link" character is inserted at the sixth character position since it is known by the system that a link must be formed to the new storage location for the rest of the data string. Also at this time the next Availability List is obtained and set in the Current End Registers 1032 and 1040. At this time, the system takes the address "oo" from the Current Register and stores it in the seventh and eighth character positions of the last word of the presently stored data string. Next the word from the Memory Buffer Register is stored in Memory Address position "dd" by the 3–D memory controls. At the same time a 2–D memory cycle causes an occurrence mark to be placed in the Forward Discontinuity Plane and at the same address i.e., "dd." Having completed the Storage operation, the system continues the inputing of data and loads the Memory Buffer Register first two positions with the letters "pq" and then detects another hierarchical level occurrence mark which causes the remainder of the Buffer to be filled with nulls (Ɏ). The system is now ready to initiate another 3–D memory cycle. However, at this time, the "current"

address in Register 1032 is transferred to the MAR 300 and a 3–D memory cycle is initiated and at the same time, a 2–D memory cycle is initiated at the same address in the Reverse Discontinuity Plane since this is the first word of the new storage location for the input data string. The remainder of the data string is broken up and stored in positions "pp," "qq" and "rr," respectively, in a manner fully set forth in the copending application of Rex Rice. It will thus be seen that the system recognized when the available storage location was used up and generated a special link character and obtained a linking address and set the various occurrence marks in the Forward and Reverse Discontinuity Planes at the addresses of the last machine word of the first data string and the first machine word of the second data string. Thus it will be seen that the present system, when performing an Input operation provides the storage addresses to the Input system, it automatically generates and stores the special link characters and the linking addresses directly in the data string itself and further sets the various occurrence marks in the Discontinuity Planes.

Figure 6:
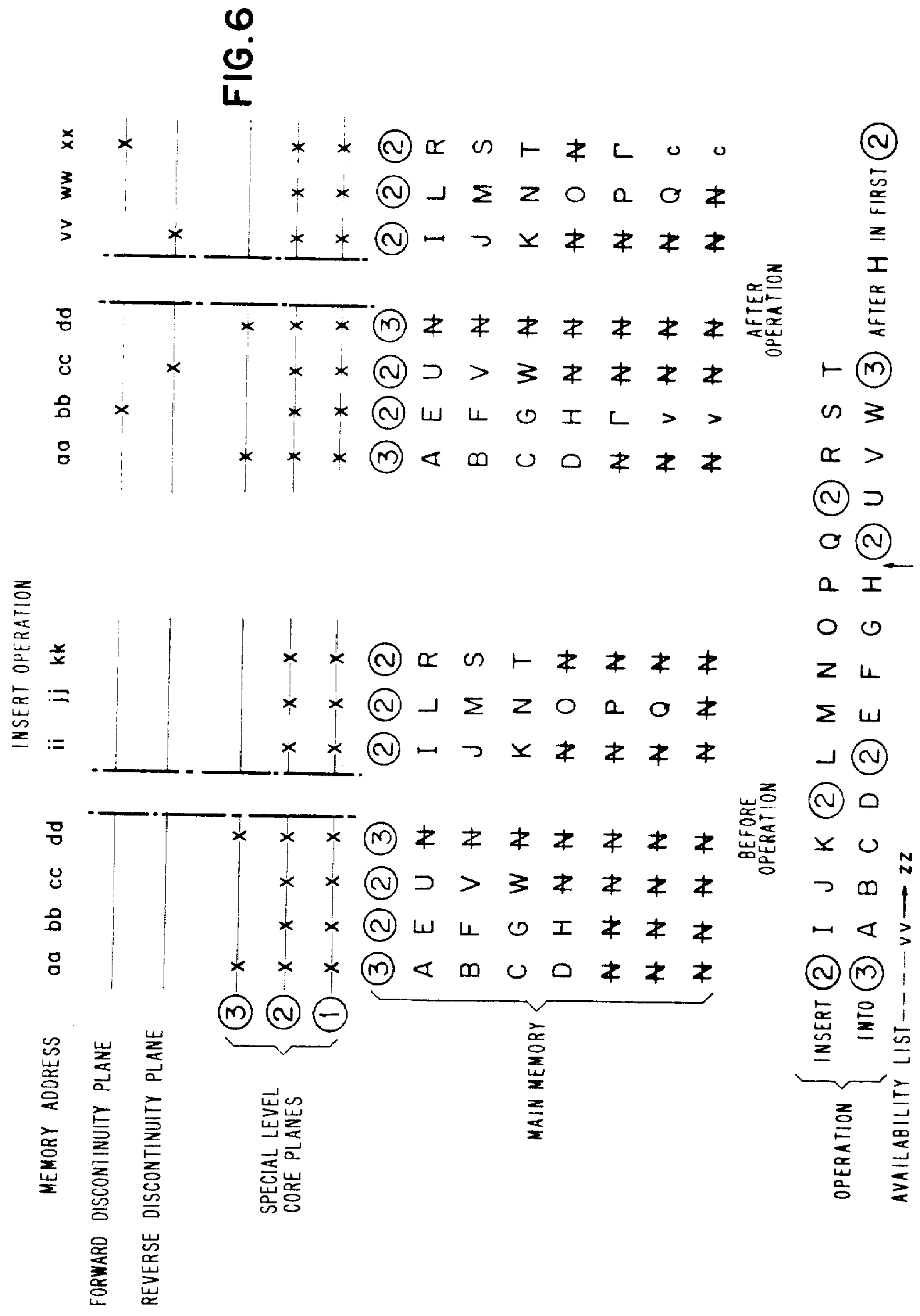
FIGURE 6 is a diagram similar to FIGURE 5 illustrating how the present system handles an Insert procedure.

FIGURE 6 diagrammatically represents and describes a relatively simple Insert operation. Before proceeding with the description of FIGURE 6, it would be well to note that in the Insert, Define and Delete operations, it is necessary to alter an existing data string wherein the data string will be changed at two different points within its body. In other words, in all of these operations, it is necessary to link from one point in the fixed data string to another location where some new data is to be stored and at the end of the storage operation a link must be provided back to the original data string at some desired point therein. Since a relatively large number of addresses must be kept track of, for these operations, it has been found most convenient to require of the system that the data to be inserted or substituted must be previously stored somewhere in the Main Memory and the extent addresses of this data be made available to the system. Obviously, on a straight Delete operation, the data to be deleted is already stored within the system. In the Insert and Define operations the data is transferred from its original storage position to a new storage position as dictated by the Availability List, said transfer being accomplished a machine word at a time. It is therefore necessary to have some convenient way of automatically showing when the data to be inserted or substituted has been completely stored in the new storage location. This is done with the present system in much the same way that the extent of the Availability List is kept track of, i.e., by placing the "beginning" and "end" addresses of the insert data in two Registers, i.e., 1764 and 1780 and as each word of the data string is transferred into the new storage location the Register 1764 is incremented and a Compare made with the Register 1780 until such "compare" is equal which indicates that the word is completely stored. Registers must also be provided to retain the addresses in the original data string where the link to an insert must be placed and the address to which the linked data must be returned or relinked to. Registers 764 and 768 are used for the purpose of retaining these addresses of the primary data string. The function of all of these registers will be set forth specifically in the Input, Insert and Search operation examples set forth in the latter portion of the present description. They are mentioned in a general way at the present time to illustrate the way in which the addresses and the data are handled so that the general operating scheme of the system will be apparent.

Referring again now to FIGURE 6, it will be noted that the primary data string is stored at address locations "aa," "bb," "cc" and "dd" and that the link is to be formed at the end of the machine word in location "bb." Further, the data to be inserted in this data string is stored at locations "ii," "jj" and "kk." This condition is shown in the left-hand portion of FIGURE 6. It will also be noted that the storage locations "vv" through "zz" are available from the Availability List for storage of the insert. The system is provided with the address "bb" in which the first link is to be placed. It examines the sixth character position and finding a null inserts the special link character and the first address from the Availability List or "vv." Having created this first link the transfer of the data at positions "ii," "jj" and "kk" proceeds. The Main Memory is read at address "ii" and the information brought out to the Memory Buffer Register then the address "vv" is supplied to the Main Memory Address Register 300 and a write cycle occurs which transfers not only the data from the Memory Buffer Register and the 3–D portion of the memory, but also a cycle occurs which transfers the level character marks as well. The data at Main Memory locations "jj" and "kk" are stored in an analogous manner at positions "ww" and "xx" except for the fact that when the data at position "kk" is read into the Memory Buffer Register, the Compare circuit which operates in conjunction with the Register 1764 and 1780 produces a signal which indicates that this is the last number of the data string to be inserted. The system now knows that a new link must be inserted in the data at this point linking back to the original data string at position "cc." The address "cc" had been previously stored in Register 780 and this address is stored directly in the data word at location "xx." It should also be noted that this last data word of the insert similarly contains nulls in the sixth, seventh and eighth character positions which indicates that the link character and linking address may be stored in this particular machine word. The system having formed the third insert word comprising ② R S T ₦ ⌈ cc of 3–D cycle is initiated as well as the necessary 2–D cycles for completely storing this word at position "xx" in memory. It will be noted that discontinuity marks were stored in the Forward Discontinuity Plane at the location in Main Memory of both data strings wherein a word containing a link character in the linking address i.e., at positions "bb" and "xx," is stored. Also it will be noted that occurrence marks were stored in the Reverse Discontinuity Plane at the address in memory to which the linking address referred, i.e., the addresses "vv," "cc." The condition of the memory after completion of the Insert operation of FIGURE 6 is shown in the right-hand portion of said figure.

Figure 7:
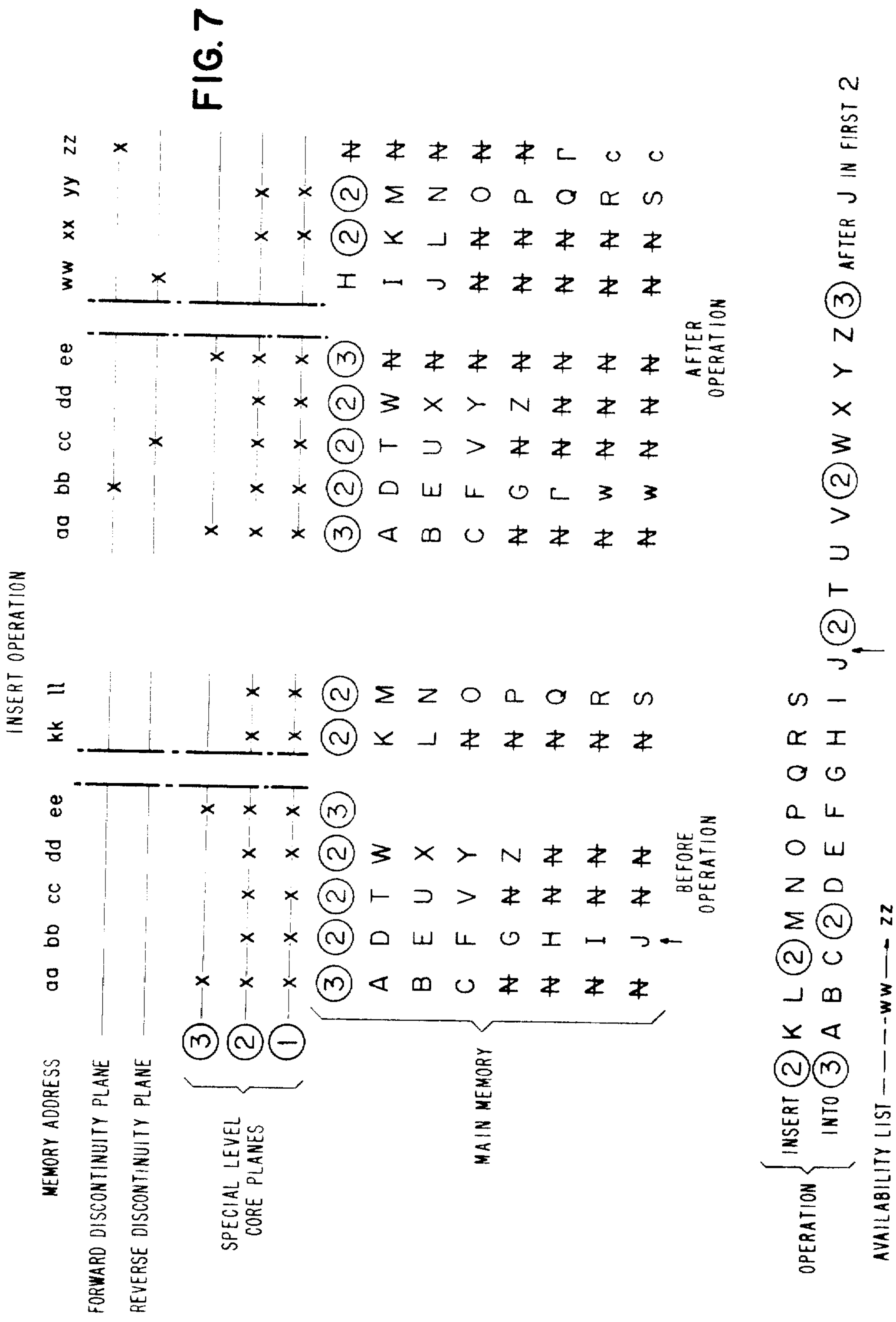
FIGURE 7 is a diagram similar to FIGURE 6 illustrating a slightly different data condition present in the data string and in the data to be inserted and illustrates an alternative control sequence utilized by the system.

FIGURE 7 illustrates an operation very much like that of FIGURE 6 with the exception of the fact that data exists in both of the machine words where the link character and linking addresses must be stored. With the exception of this fact, the Insert operation proceeds in the same manner for the operation of FIGURE 7 as for FIGURE 6. When the system desires to form the first link it examines the sixth, seventh and eighth character positions at the machine word address, i.e., "bb," where the link is to be inserted. Since it finds the characters H I J in this location, the characters must be saved and stored in the first location of the Availability List, i.e., position "ww." It is apparent that the link character and linking address must be stored at this location in the original data string which necessitates the moving of the characters H I J. As will be noted in the subsequent description, the new Data Storage Register 3113 is provided for the temporary transfer of three characters of data when something other than a null is found in the machine word where it is desired to store the link character and associated linking addresses. Thus, in the right-hand portion of the figure it can be seen that at address "ww" the data H I J has been stored together with null characters since the next machine word to be stored is the level identifier, i.e., ②. As in the previous operation, the insert data is transferred from the machine memory at positions "kk" and "ll" into positions "xx" and "yy" the position "bb" having been previously linked to position "ww" as described. After the data at location "ll" has been stored in "yy," the system knows that link back to the original data string must be accomplished at this point. However, by examining the data to be stored at "yy" it detects something other than a null in the last three character positions. Therefore, since this data cannot be moved, the next machine location "zz" is accessed and the link character and linking address are stored by themselves. It will be seen that the primary dicerence between FIGURE 6 and FIGURE 7 is that when data is located in the sixth, seventh and eighth character position of a machine word where a link is to be inserted another memory location must be used to properly enter the link and conserve the data.

Figure 8:
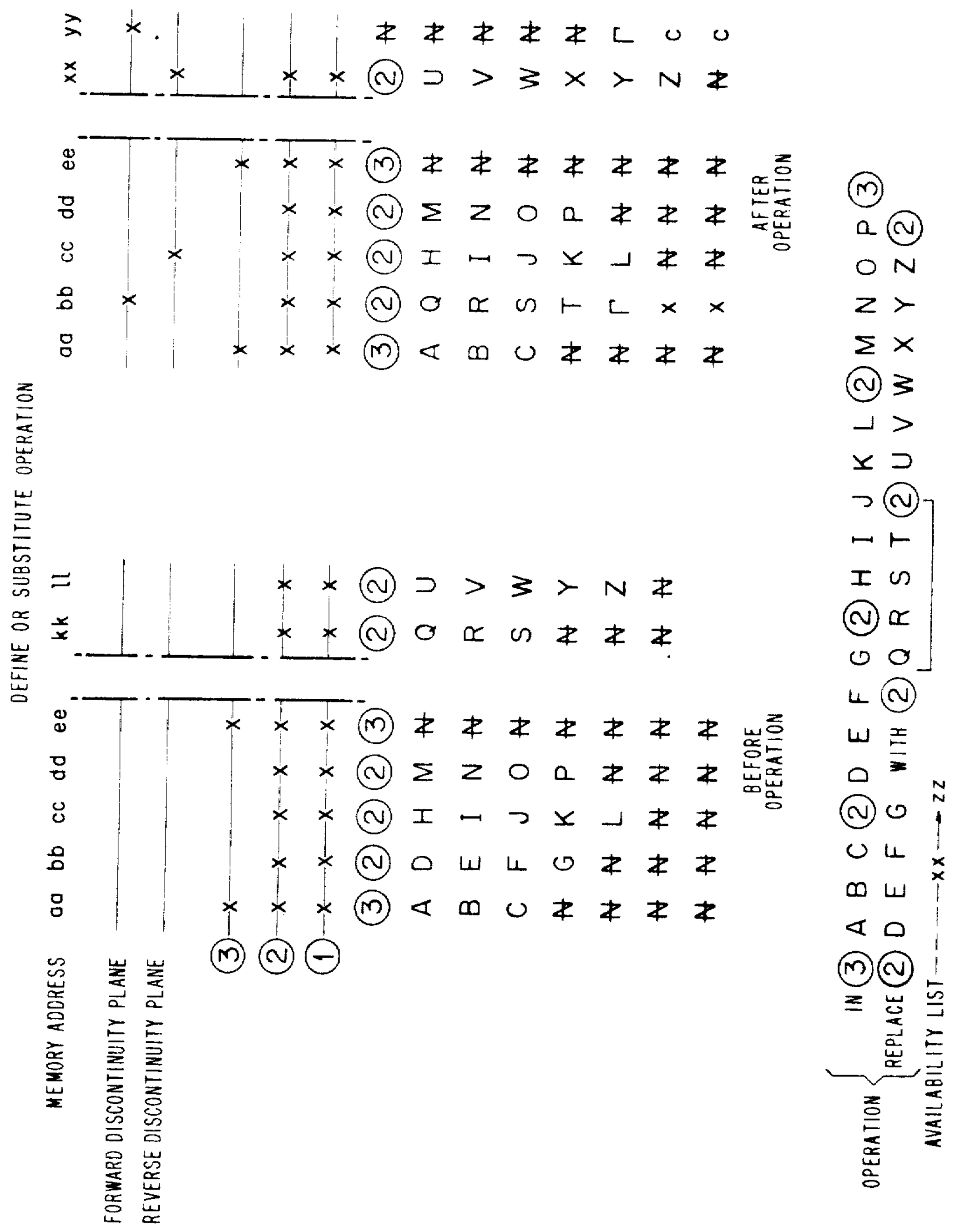
FIGURE 8 is a diagram illustrating a Delete operation wherein a portion of data is deleted from an existing data string.

FIGURE 8 is a diagrammatic illustration of a Define or Substitute operation where one portion of an existing data string is to be deleted and replaced with a different data string. This operation is very much like the above Insert operation with the exception of the fact that the storage location in memory of the portion of memory being defined is first filled with the replacement portion before the storage in the Availability List storage location is begun. The condition of the memory together with the various storage locations is again illustrated in the left-hand portion of FIGURE 8 where the original data string is shown occupying address locations "aa" through "ee" and the data to be inserted is stored in memory positions "kk" and "ll." In the right-hand portion of the figure, it will be noted that the first word of the insert ② Q R S T is stored at location "bb" where the deleted data string ② E F G was previously stored. However, controls are actuated at this point to indicate that only one word has been deleted and thus available for storage. Now the system must link to the Availability List for the storage of the remainder of the insert. Thus, the special link character and the address "xx" of the first position of the Availability List is stored in the memory at position "bb" in character positions 6, 7 and 8. The remainder of the insert is stored at storage location "xx" and now the system is told that the insert has been completed and a link must be formed back to the original data at position "cc." However, upon examining the last machine word of the insert it is found that character positions 6, 7 and 8 are occupied. Therefore, the next storage position of the Availability List, i.e. "yy" is accessed and the link character and linking addresses are stored at position "yy." Again, the various discontinuity occurrence marks are set as in the previously described examples. The result of this operation again is illustrated in the right-hand portion of FIGURE 8.

Figure 9:
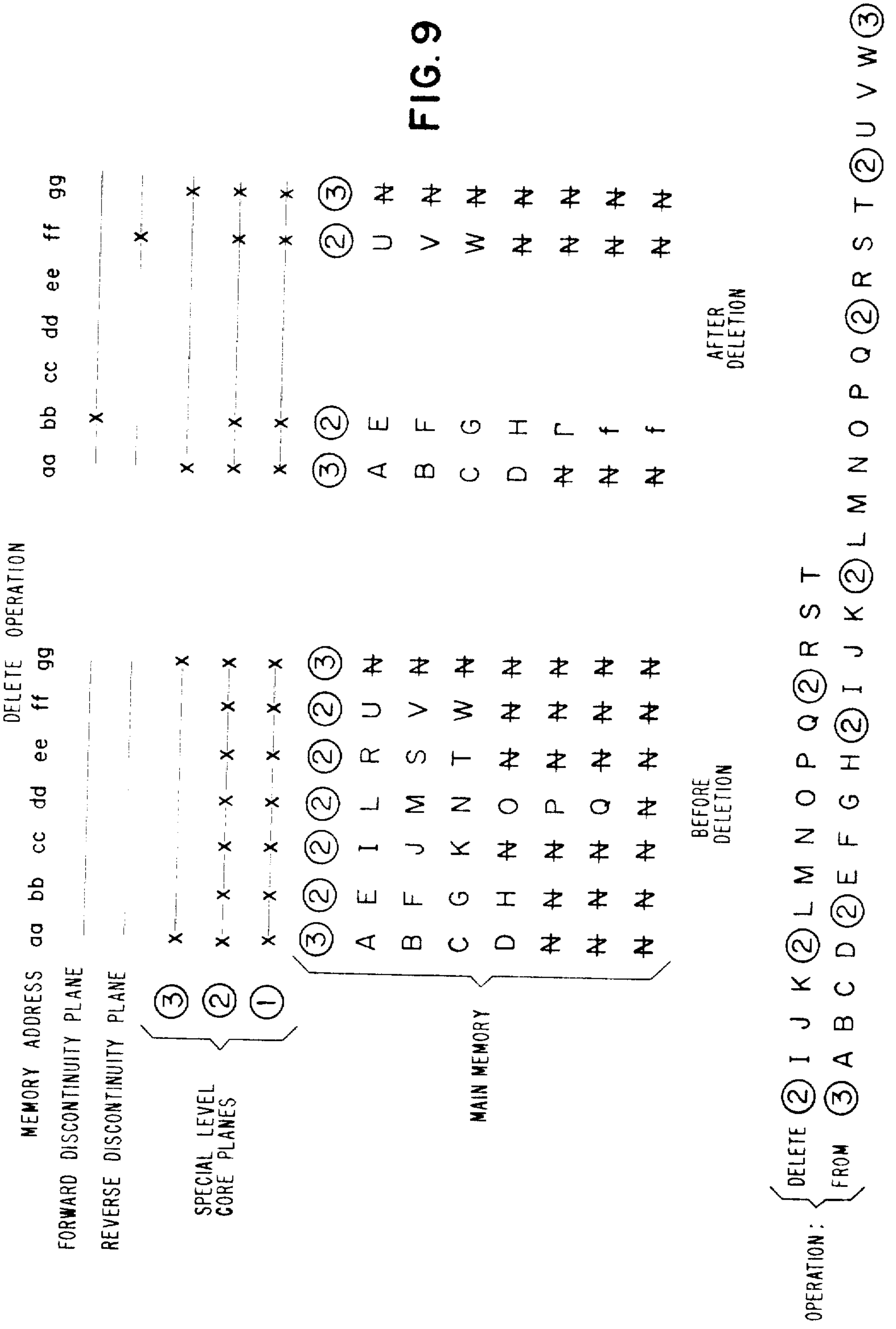
FIGURE 9 is a diagrammatic illustration of a Define or Substitute operation where one data string is substituted for a portion of an existing data string.

FIGURE 9 illustrates a Delete operation. This operation is also quite similar to the Insert operation in that the same basic registers and control circuitry are required. For the Delete operation, the portion of the data string to be deleted is treated in much the same manner as a portion of data to be inserted and is physically read out of the 2–D plane memory by a "read" operation and the data arrays by appropriate controls a machine word at a time. However, the controls are set so that the linking address actually stored in position "bb" is not the "link forward" link, but in actuality, the "link back" link which would have been stored in the last word of the insert had a standard Insert operation been performed. The condition of the system before and after a delete operation is again shown in the left-hand and right-hand portions of FIGURE 9.

It is believed that the above description of FIGURES 5, 6, 7, 8 and 9 illustrates how the system detects when a linking address is required, generates the same automatically and stores it in an existing data string and sets all of the necessary control circuitry for indicating the occurrence of a link character and linking address in a machine word. The description further shows how the system accomplishes the above operations of Input, Insert, Define and Delete. It is quite apparent that the ability to store data and readily move data around within the system greatly expands the capabilities of such a memory.

The proper searching of a stored string of data in memory will require the stopping of the Search every time that a link or discontinuity mark is detected during the search procedure. The machine word to which the discontinuity marks refer must be accessed and the sixth, seventh and eighth character positions examined to take the address to which the search must proceed if it is desired to accurately search this particular data string. Thus, in a forward direction of search, when any discontinuity mark is detected in a Forward Discontinuity Plane during a search for any level indication mark, the link address of the next portion of data will be immediately available to the system by accessing the said sixth, seventh and eighth character positions. However, upon searching in the reverse direction, the Reverse Discontinuity mark only is stored in memory to indicate a discontinuity in the data. Since the present system does not disclose the use of reverse linking addresses, although such could easily be obtained and stored, alternative means for pursuing a search in the reverse direction must be provided. This is done by the use of a Push-Down Store. The action of this Push-Down Store is to make available on a search in the reverse direction every address in memory where a forward discontinuity mark was detected. In other words as a search progresses in the right-hand direction through a particular data string and each time that a discontinuity mark is detected, the address in memory of said discontinuity mark and of the word in storage which contains the actual link forward address will be stored in the Reverse Push-Down Store in sequential storage locations. Thus as the search progresses the first, second and third discontinuity addresses will be stored in the RPDS, and as a reverse search proceeds, the third, second and first addresses would be read out in that order. In other words, the readout order is the reverse of the input order. Such Push-Down Stores are well known in the art and normally comprise a small section of the memory provided for the purpose having special Address Registers and Counters which increment on an Input and decrement on an Output operation. In the present system, the Reverse Push-Down Store block shown in the logical schematic of FIGURE 2 actually provides the address of the Reverse Push-Down Store location to the system so that the pertinent address associated with the forward discontinuity mark will be stored at the address in the RPDS Register. Upon the search left operations the address available in the RPDS would be that address in Main Memory for the most recently detected discontinuity mark.

Figure 10:
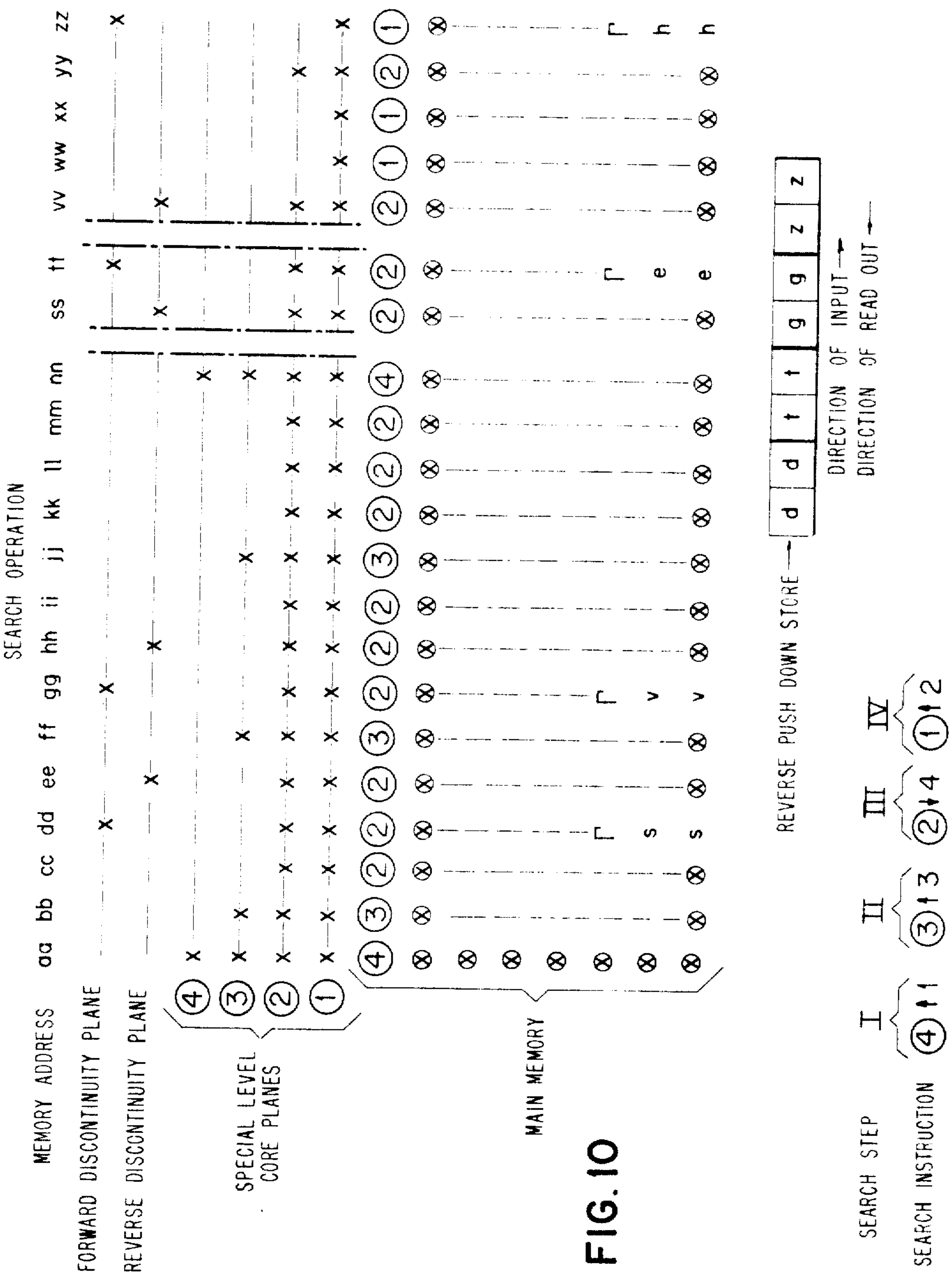
FIGURE 10 illustrates a Search procedure utilizing the teachings of the present invention.

Keeping these thoughts in mind, a general search will be described with reference to the diagram of FIGURE 10. As stated previously, FIGURE 10 is arranged in much the same way as FIGURES 5 through 9, with the exception that due to the number of machine words which it is desired to show for purposes of the example the actual characters other than the links in linking addresses have not been included in each of the storage locations. Again it will be noted that the top row contains the addresses of the associated machine words in Main Memory, the next line contains for forward discontinuity occurrence marks, the next line the reverse discontinuity occurrence marks and in the lower lines the hierarchical level occurrence marks. The Search instruction to be performed on the diagram data string appears in the lower portion of the figure and is seen to compose four separate steps. The first step comprises the ④↑1 which means find the first ④ level identifier in the data string beginning at address "aa," the second step of the Search instruction states that beginning at the address obtained in the first step find the third ③ level identifier. The third step says that at the address last obtained going in the opposite direction (i.e., reverse) find the third ② level identifier and the final Search instruction says at the address last obtained search forward and find the second ①. These four steps are indicated by the brackets and the Roman numerals I through IV. The level identifiers found as a result of this search are indicated by the Roman numerals I through IV appearing over the level identifiers in the 3–D portion of memory. The manner in which these results are obtained will be pointed out separately.

It will be noted that the data string indicated in FIGURE 10 occupies three distinct non-continuous machine storage locations, i.e., the portion at addresses "aa" through "nn," the portion at addresses "ss" through "tt" and the portion of addresses "vv" through "zz." Examining the Forward Discontinuity Planes and the linking addresses stored in the associated Main Memory machine words it will be noted that the data at addresses "ss" through "tt" is inserted in the string between the addresses "dd" and "ee." And likewise the data stored at memory locations "vv" through "zz" is inserted between storage locations "gg" and "hh."

Proceeding now with a search in the data string of FIGURE 10, it will be noted that starting at address "aa," the first ④ is actually encountered at this storage location, thus a successful comparison is made and the control circuitry drops down to the next portion of the Search instruction which says find the third ③ in the data string proceeding to the right. Thus, proceeding across the data string through positions "bb" and "cc," a discontinuity mark is detected at "dd" whereupon the system must read out the data word at position "dd" and extract the link address "ss." Now the search knows that it must continue to point "ss" in memory and accordingly, search this address "ss" and address "tt." However, at point "tt," again a discontinuity mark is indicated which indicates that the link "ee" must be extracted and the search will proceed at this point to position "ff" which is a ③ indicator, but not the one desired. Consequently, the search proceeds on to storage location "gg" where subsequently, another discontinuity mark is indicated and the linking address "vv" is extracted, causing the search to proceed through storage locations "vv," "ww," "xx," "yy," "zz," where the fourth discontinuity mark is encountered causing the search to return again to the linking address "hh." "Hh" is then searched and "ii." At location "jj" the third ③ mark is found thus satisfying the condition of the search. It should be noted that at this point that as each of the four discontinuity was detected consecutively at positions "dd," "tt," "gg" and "zz," each of these addresses was placed in the Push-Down Store shown at the bottom of FIGURE 10. The direction of the Push-Down Store being from left to right and the direction of the output being indicated as from right to left. The manner in which the Push-Down Store is used will now be illustrated by the third sequence of the Search instruction which says that going to the left find the fourth ②. Thus, the search proceeds back to the left and searches positions "ii" and "hh," both of which contains ② indicators. However, the desired ② indicators has not been found and in that position, i.e., "hh," a discontinuity mark was detected and the last position of the Push-Down Store to be accessed and an address stored therein is read out. This position of the RPDS contains the address "zz." Thus, it will be seen that a reverse search of such a linked data string is possible and the search accordingly continues at position "zz" and proceeds through position "zz," "yy," "xx" and "ww" and finally to "vv" where the desired fourth ② level indicator is in fact found. Although another reverse discontinuity mark has been found at this position, the successful location of the desired level identifier prevents the readout of the address "gg" from the Reverse Push-Down Store until it is determined whether or not the search is to continue in this direction. Since the fourth level of this search is again to the right, the Reverse Push-Down Store is not accessed. The search is completed in the ① level plane and the desired second ① is found at position "xx," which is the beginning address of the desired piece of data to be located by the search. At this point, of course the "end" address of the particular piece of data, whose beginning address is also automatically determined by the system as set forth in subsequent search examples.

It should be noted that in describing the above example, the specific details of the accessing of the new Level Planes and Discontinuity Planes at the new addresses in memory where the given searches were continued was not specifically described. Thus, in proceeding through one of the data links, i.e., from position "dd" to position "ss," the appropriate Level Identifier Plane and Forward Discontinuity Plane associated with the address "ss" are automatically gated out of the 2–D portion of memory into the respective registers in the Search Ring and the search continued. Thus, as will be apparent from reading the above-identified copending application of Rex Rice, as well as the present specification, the search procedure for such a hierarchically organized variable length data system actually comprises the 2–D portions of memory for level identifier marks beginning at a specified starting point in memory and that the data itself is never actually accessed as far as the content of said data is concerned until the beginning and end addresses for the desired piece of data are found. The exception to this condition occurs in the present system where the sixth, seventh and eighth character positions of data must be read out of Main Memory at the Main Memory Address referred to by a forward discontinuity mark. All of the circuitry for automatically effecting the detection of discontinuity marks in the Discontinuity Planes, the automatic accessing of the proper character positions from Main Memory to obtain linking addresses, as well as all controls for reading out the sections of 2–D portion memory for continuing the search are set forth in the subsequent detailed description of the Search operation.

The following general description of FIGURE 2 which will describe the more important elements thereof will occasionally relate back to the previous description of FIGURES 5 through 10. Most of the operating characteristics of the present system will be readily apparent from the subsequent general description of FIGURE 2 taken together with the preceding description of FIGURES 5–10. The subsequent detailed description of the Input, Insert and Search operations go in step by step fashion through the logical schematic diagram of FIGURE 2 which will make the specific operating details of the present system exceedingly clear.

Figure 2U:
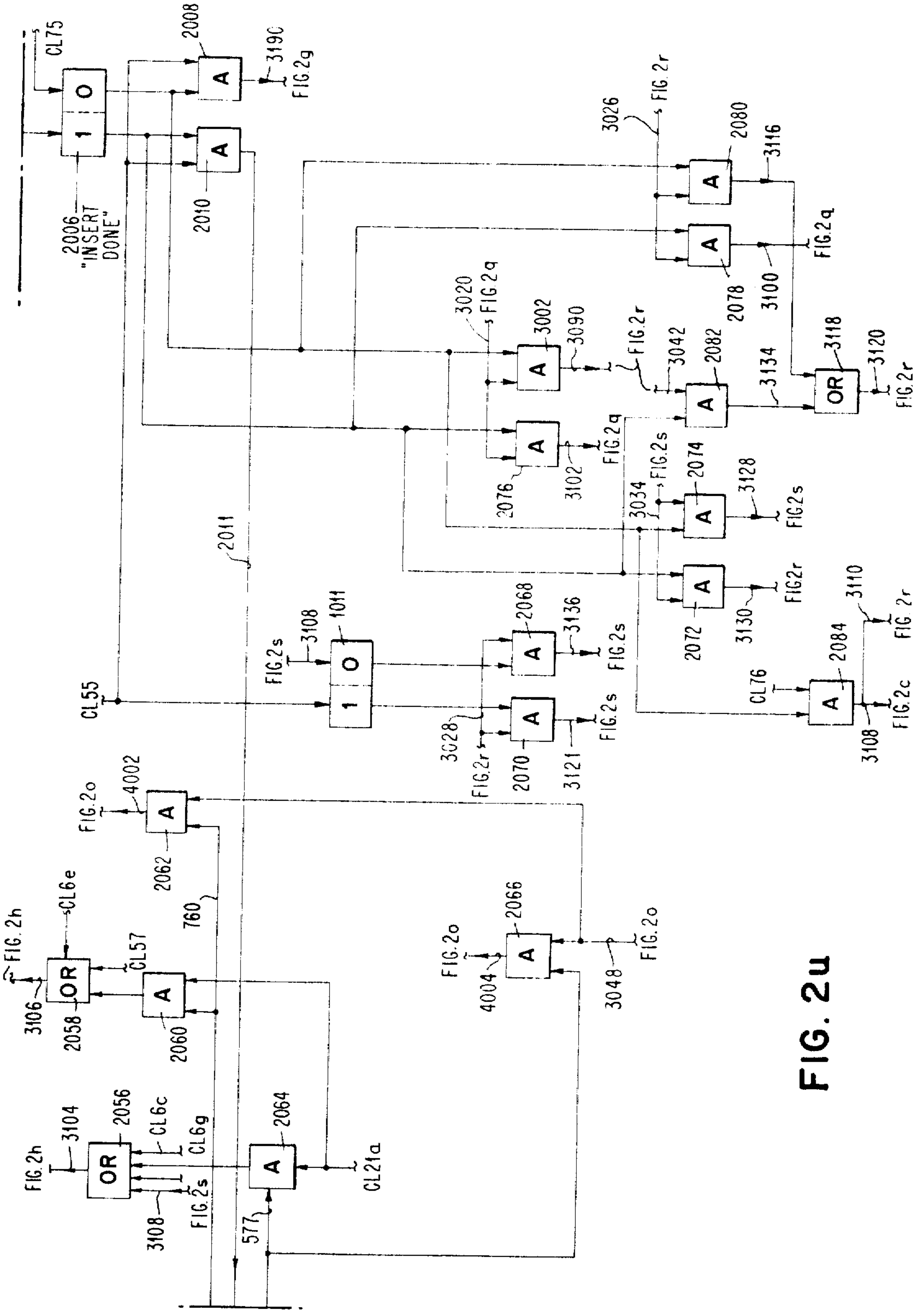

The following will be a general description of FIGURE 2, which as stated previously, comprises FIGURES 2*a*–2*u* which is a detailed logical schematic diagram of all of the control circuitry necessary to effect the operations required of the present system.

The system organization will best be appreciated if the drawings are laid out according to the composite FIGURE 2 located in the upper right hand corner of FIGURE 2*a*. In the following general description, only the more significant functional components of the system will be mentioned and described for purposes of clarifying the more important aspects of the system; however, it should be noted that the subsequent detailed descriptions of Input, Insert and Search operations will describe in detail the operation of virtually all of the logical circuitry shown on these drawings. It being noted that in a rare number of instances, certain logical blocks such as AND, OR, and INVERT elements have not been specifically numbered and described, where it is believed that their function is manifestly obvious.

Referring now specifically to the figure, there will first be described those portions of the system which are essentially the same as the system disclosed and described in the previously identified copending applications of Rex Rice. These portions of the system generally speaking are for inputing variable field length hierarchically organized data into continuous storage locations and searching through such data wherein no discontinuities are encountered.

Referring now to FIGURE 2*a*, the Input Buffer for the system is shown in block diagram form. The actual Buffer Storage Section 10 comprises a plurality of latches such as shown in "Arithmetic Operations in Digital Computers" by R. K. Richards, D. Van Nostrand, Inc., New York, FIGURE 2–14*a*. It will be seen that there are twelve stages or blocks in this Input Buffer Register which means that up to twelve characters can be stored therein at any one time. It should be noted that although twelve has been found to be a convenient number to give satisfactory flexiblity to the system that any number of stages desired could be used depending on the particular input medium, such as paper tape or magnetic tape, which is employed as the data input source. The Input Buffer 10 is controlled by the Input Control Ring 12 and the Output Control Ring 11 which determines the particular stage of the Buffer 10 into which information is being stored and from which information is being taken, respectively.

Information is allowed to be entered into the Input Buffer stages 10 under control of the input medium which, as stated previously, may be a magnetic or paper tape, magnetic drum, etc. As each character is available on the Input Bus, an "input advance" pulse also supplied with the input data is a "marker" pulse or the like which will cause the Input Control Ring to be stepped to the next position so that the characters are gated into successive positions of the Register 10. The Input and Output Control Rings are conventional stepping rings such as shown in the before referenced Richards' textbook, FIGURES 7–13*a*. As stated above, the actual number of positions of the Buffer Register of the Input Buffer Register 10 may be changed, the only requirement being that it be large enough to hold enough information so that one memory word can be loaded into the Memory Buffer Register without having to wait for the input to catch up and also, that there be a continuously available blank input position so that the input is not held up by the output speed. As a practical matter, the output from the Input Buffer Register 10 is so much faster than conventional mechanical input systems that this latter restriction is never a problem.

Counter 14 is provided to prevent an output from the Register 10 until at least eight characters are stored in the Input Buffer. This figure is chosen since the Memory Buffer Register and the Main Memory itself is set up to receive eight characters for a machine word and the efficiency of the system chronologically is greatly enhanced if it is insured that at least a machine word is available in the Input Register before the Comparing, Outputing and subsequent Storing operations are begun. If a 5 position Memory Buffer Register and machine word organization were used, a counter producing an output at a count of 5 would be used at 14. It will be apparent again that using such a counter is not absolutely necessary nor is the provision of any particular counter level before an output operation will be initiated. The Counter 14 is again a conventional Counting Register such as disclosed in the before referenced Richards' textbook Figure 7–1.

Figure 4:
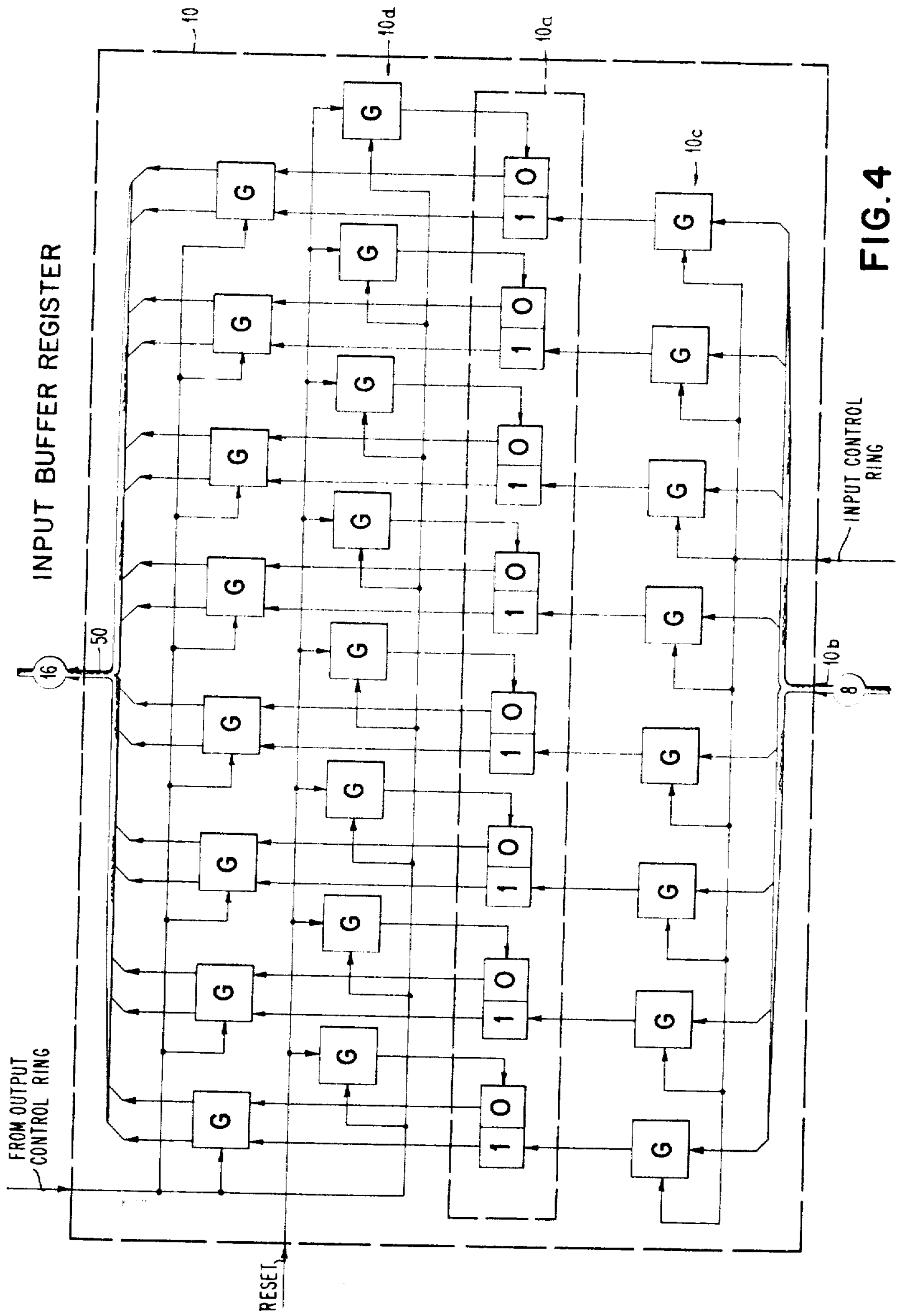
FIGURE 4 is a logical schematic diagram of one stage of the Input Buffer Register shown in FIGURE 2*a*.

While describing the Input Buffer Register 10 attention is directed to FIGURE 4 which is a more detailed logical schematic diagram of a single stage of the Input Buffer Register. While a more complete description of this and various other types of registers is referred to above, the following explanation briefly describes the operation of such a register stage.

The register stage comprises eight flip-flop circuits 10*a*, eight being required because an eight bit binary code is used. Incoming data enters the stage on the eight conductor input line 10*b*. Assuming that this stage is now active, a pulse is produced by the Input Control Ring on the cable provided therefor which activates the gate circuits 10*c* and allows the input data to set the flip-flops to the 1 position in accordance with the particular input signal on the lines. As will be noted, an eight conductor input cable is utilized, thus, a signal will appear on only those cables where a "1" forms a portion of the binary code; for such cables as are inactive, on which no signal appears, those flip-flops will remain reset in their 0 positions. It will be noted that a reset pulse is provided for the stage of the registers and sets gate circuits 10*d* together with an output from the Output Control Ring 11 from a previous cycle. Assuming now that input data is stored in the flip-flops 10*a* and their signal is received from the Output Control Ring to output such data into the Compare circuitry the gate circuits 10*e* will be actuated by such signal and an output will appear on line 50. As will be noted, a 16 conductor cable is utilized in the output so that for each bit position, the 1 or 0 cable will be brought up. It will be apparent to one skilled in the art that an eight conductor output cable could also be used wherein only active 1's would have a signal; however, this particular 16 conductor cable is compatible with the block diagram Compare circuitry shown in FIGURE 5 and is intended only to illustrate an operative embodiment of the invention.

Returning to FIGURES 2*b* and 2*c*, there are shown the Level Comparison and Control Circuits which are responsible for examining the input data from the Input Buffer Register 10 in accordance with the data organization rules of the present system set forth previously. Actually, this section operates or functions in conjunction with the "Input Clock" of FIGURES 2*d* and 2*g* to (a) examine each character to determine whether or not it is a level identifier, (b) initiate a memory cycle when eight characters are stored in the Buffer Register 96, (c) detect a second Level Identifier and prevent storage thereof in the Memory Buffer Register in any but the proper position, (d) detect the end of a data sequence and (e) provide for the insertion or placing of the proper Level Identifier marks in the special core planes of the auxiliary 2–D memory.

As stated previously, the operation of the specific circuitry disclosed in FIGURE 2 will best be understood in detail from the specific descriptions of the Input, Insert and Search operations to be set forth subsequently in the specification, together with the timing tables provided therewith.

One of the more significant functional elements of FIGURE 2*b* is the level compare circuitry in which each incoming character is compared with the seven level identifiers in parallel. The Compare flip-flop 64 is to prevent the gating of more than 1 Level Identifier into any one machine word and its operation will of course be described in detail in the subsequent example. The Compare counter 62 operates in conjunction with the Compare flip-flop 64 to determine the number of Level Identifiers which have been encountered in a data string insofar as it will affect the storage of such identifier in the Memory Buffer Register and also its position in the machine word.

All of the AND gates, OR gates, inverters and flip-flops disclosed in block form in the figures are believed to be so well known in the art, that they do not require specific references. It being generally stated that any of a very large number of textbooks may be referred to for a specific implementation of such circuits, two such books are, "Arithmetic Operations in Digital Computers" by R. K. Richards, D. Van Nostrand Co., Inc., New York and "Digital Computer Components and Circuits" by R. K. Richards, D. Van Nostrand Co., Inc., New York.

The Memory Buffer Register 96 is again a conventional magnetic memory buffer register. The position of the register into which succeeding binary characters will be placed is controlled by the Control Ring 102 which is also conventional with such registers. Input data is gated into the Memory Buffer Register from Register 6 under control of the Compare circuitry.

When a successful compare is made in the Compare circuitry, one of the lines 57 will become active and when gated through gate 68 under the control of the Compare flip-flop 64, will set one of the positions of the Level Ring 58, as will be explained later in the example, this Level Ring controls the highest position for a particular machine word in which a level mark will be placed in the special core planes and controls the subsequent insertion of such level marks and the corresponding positions in the lower order special core planes. The ring itself is a decrementing counter and is again a well known circuit in the art, a specific reference being made to the before referenced Richards' textbook, Figures 7–13.

The "Input Clock" of FIGURES 2*d*, 2*e* and part of 2*f* is a conventional single shot multivibrator flip-flop arrangement interconnected as shown in the diagram and is basically a very conventional clock arrangement as used in many synchronous computer systems. While the specific operations of the individual members of the clock will be set forth subsequently in the detailed operation description, stages 1–5 essentially control the storage of succeeding characters in the Memory Buffer Register and thus constitute a loop which will be continuous until a second level identifier is detected in a string or until eight characters are stored in the Memory Buffer Register, in which latter case, stage 6 of the Input Clock takes over and initiates a storage cycle. Stages 7 and 8 of the clock control the storage of marks in the special core planes and cause the stepping down of the Level Ring 58 as a mark is put in each subsequent level until all such marks are inserted, as again will be set forth specifically in the Operating example.

While describing the Level Compare Circuit 56, attention is directed to FIGURE 11 for a more detailed showing. It will be noted that an eight input AND gate is provided for each of the level identifiers, an input from the 0 and 1 lines of the sixteen conductor input cable from Register 6 being connected to appropriate inputs of the AND circuits in accordance with the particular character being checked. Whenever all eight inputs on a line come up into any one of the AND gates, a Compare output will appear on the single output from the AND gate. The seven outputs shown correspond to the output lines 57 coming from the bottom of the Level Compare circuit 56. FIGURE 11*a* shows the details of conventional flip-flop type circuits which would make up each of the large blocked AND gates of FIGURE 11. The connection of the various input lines to the desired side of the flip-flops is clearly indicated in this figure. It is, of course, to be understood that a "reset" pulse would be supplied to all of the flip-flops in all of the Compare circuits at the end of each Compare cycle for obvious reasons.

FIGURES 2*h*, 2*i*, 2*j* and 2*k* comprise a logical schematic diagram in functional block form of the Addressing Registers, Drivers, Decoders etc. of the 2–D and Main 3–D Memory. This section comprises the Main Memory 900 and the Auxiliary Memory 901, which for purposes of the preferred embodiment is shown to be a set of 2–D memory planes each of which is adapted to store different level identifiers or hierarchical occurrence marks as set forth previously and also the Forward and Reverse Discontinuity marks. It will be noted that only the lower three Level Identifier Planes 902, 904 and 906 of the 2–D memory are shown and are indicated with the particular level identifiers, i.e., ①, ②, and ③ which they represent. Planes 907 and 909 are the Reverse and Forward Discontinuity Planes respectively. The figure further shows the principal Memory Address Register 300 from which the address for any read-write operations for both the 3–D and the 2–D auxiliary memory are obtained as is well understood in the art. Also shown are the various decode matrices and core drivers for driving both the X and Y lines in the Main or 3–D Memory. Additionally described are the means for deriving the drive selection and control for the 2–D portion of the memory also from the Main Memory Address Register 300 as well as the separate means for writing a single bit of information into the 2–D memory on the input cycle and reading a complete line from the 2–D portion of memory on the Search cycle as will be explained more fully subsequently. The Memory Buffer Register 96 shown in the figure is the same Memory Buffer Register shown by the numeral 96 in FIGURE 2. As will be well understood by a person skilled in the art, this register may be utilized both for gating information into or out of the Main Memory 900. Register 312 which is a 128 bit register receives the information gated out of the 2–D Memory Planes 902, 904, 906, etc. The binary information in this register is gated upon command to the Register 610 of the Search circuitry whose operation is explained subsequently.

To store information in the system, the address for insertion of a bit of information is first put in the Main Memory Address Register 300. This address will be obtained from the system in a manner to be described subsequently.

Assuming that an address is in the Register 300 and a machine word is in the Memory Buffer Register 96 ready for storage, the X portion of the address is decoded through Decode Matrices 540 and 542 and gated through gates 546 and 544 into the 8 x 16 core driver array 548 which places a half-select pulse on a selected X line in Main Memory as is well understood in the art. At the same time, the Y portion of the address in Register 300 is decoded by Matrix 541 and its associated gate elements to drive the 8 x 16 Y core driver array 549 which energizes a selected Y line in the 3–D Memory 900 with a half-select pulse. Thus, a machine word is selected in accordance with the particular X and Y lines addressed and the particular data or machine word it is desired to write is gated from the Memory Buffer Register 96 by gate 908 and drives selected numbers of the Inhibit Drivers 910 in accordance with the machine word stored in the Memory Buffer Register.

Concurrently, with the writing of a machine word from Memory Buffer 96 in Main Memory 900 a bit or "1" may be placed in the corresponding position of any of the 2–D planes 902, 904 and 906, etc. To accomplish this a half-select pulse is put on the particular X and Y drive lines in the identifier plane which has been selected. The writing of said bit in the 2–D portion 901 of memory in an address corresponding to that of the machine word in Main Memory 900 is accomplished as follows:

The X portion of the address in Memory Address Register 300 is transmitted on line 912 through the 2–D Memory Decode Matrix 914 and gated through gate 916 into the Write Driver Matrix 918. One of the output lines in bus 920 will be provided with a half-select pulse in accordance with the X address from the X portion of Memory Address Register 300. The particular 2–D plane into which this half-select pulse is gated is determined by gates 922, 924, 926, 1116, 1092 etc. which are under the control of the Level Ring 58 of FIGURE 2 as was explained previously and 3104 and 3106 as will be explained subsequently. Concurrently, with the application of the half-select pulse to a particular one of the X lines of one of the level planes, the Y portion of the address of Memory Address Register 300 is decoded in Decoder 310 and gated into Driver Matrix 552 which will bring up one of 128 Y drive lines in accordance with a particular Y address in the Memory Address Register 300. Driver 552 likewise provides a half-select pulse which will be gated into a selected one of the 2–D planes by means of gates 928, 930, 932, etc., again under the control of the Level Ring 58 as explained previously or gates 1090 and 1118 in the case of the Discontinuity Planes. Thus, it will be seen that when a machine word is stored in the 3–D memory 900, a bit is written into the special planes 902, 904, etc. of 2–D memory 901 concurrently therewith and at the same address as in the Main Memory. Level identifier marks will also be written into the same location of all the lower level planes associated with such a machine word. In other words, the same address in Memory Address Register 300 may be used to store the bits sequentially in the lower order planes of 2–D memory 901 in exactly the same manner as described above except that the Level Ring 58 will automatically gate a level select signal into the subsequent input control gates of the Identifier Planes until the Level Ring 58 is in the zero position. The bits may be stored in the Discontinuity Planes in the exact same manner using the Register 300 Address but different Control circuits, Control gates 1090, 1092, 1116 and 1118 as will be described later. A detailed description of this operation appears in the subsequent specific descriptions.

In the system Search sequence, the reading out of a line of information from a particular Level Identifier Plane results in the development of a "begin" and "end" address for a desired string of information since the actual reading out of a word or words from the Main Memory 900 is completely conventional. The unique feature of this portion of the system resides in the manner in which the address for the particular data string to be read out is obtained by using the special Level and Discontinuity Identifier Planes. A detailed description of the method by which a line of data from one of the Identifier Planes will be utilized is explained subsequently both in the general description of FIGURE 2*n* and in the particular Search example set forth.

It is required by the system that the search begin at a particular place or address in memory as determined by the "program" search instruction, this beginning Search location in memory will be gated to the Memory Address Register 300. As explained in more detail subsequently, it is desired to read out the entire X line in which this starting address is contained, therefore the X address portion from Register 300 is transmitted over line 912 through the Decode Matrix 914 and this time is gated through gate circuit 934 to the Driver Matrix 936. Matrix 936 is what is known in the art as a "full select" driver matrix. In other words, it will provide a pulse sufficient in and of itself to cause a switching of the cores without a coincident pulse on the Y drive line. Such operation is likewise well known in the art and will not be described in further detail. For a more complete description of the operation of 2–D memories using both coincident current half-select pulses or single full select pulses reference is made to the book, "Digital Computer Components and Circuits" by R. K. Richards, D. Van Nostrand Co. in the chapter entitled "Magnetic Core Storage." In a manner similar to that described for the "input" operation, one of the 128 lines in bus 920 is activated by the Driver Matrix 936 and this current is gated into one of the Level Planes 902, 904, 906, etc., in accordance with the particular gate 922, 924, 926, etc., determined from the Search program and stored in Register 528. When the full select pulse from Driver Matrix 936 is applied to, for example, Level Plane 902 for the ① level through gate 922, the entire X line selected will be read out on the Y lines into bus 938, which it will be noted serve as sense windings in the "read" portion and half-select write windings during the "input" or "write" portion of the 2–D memory cycle of operation. All of the 128 lines of bus 938 are gated through gates 304 and 538 through an appropriate Sense Amplifier 940 into the Register 312. Thus, the contents of the particular X line selected and the particular plane selected are stored in the 128 bit Register 312 and may be gated through gate circuit 314 to Register 610 of the Search Ring circuitry. As will be described more fully subsequently when a Level Plane is interrogated the associated X line in the appropriate Discontinuity Plane will be read out and both will be placed in the Search Ring 614.

The auxiliary or 2–D memory planes 902, 904, etc. are conventional 2–D core arrays wherein each X and Y line is separately addressable as set forth above. As will be noted in the drawing, one end of the X and Y lines is grounded and the other connected as desired to the various driver matrices through appropriate gating circuits. As will be seen from the above description it is possible to write individual bits of binary information into the 2–D memory and read information out a line at a time as is required by the Search organization.

This 2–D portion of Memory 901 has been presented as a preferred embodiment of the invention in that it may be readily seen how the X and Y addresses are taken from the Main Memory Address Register 300 and utilized directly through appropriate decoding matrices and driver arrays to select particular positions in said 2–D memory directly corresponding with the position in which a machine word is located or stored in the Main Memory. However, it is to be understood that this is a description of a preferred embodiment and that other more complicated memory systems could be used, if desired, having appropriate decoding matrices and drivers for selecting a position in said auxiliary memory whose address corresponds unambiguously to a particular address in the Main Memory.

The Main Memory 900 and its associated control circuitry is a highly conventional 3–D word organized memory containing X and Y windings sense and inhibit windings so organized that a machine word may be written into or read out of the Main Memory selecting the desired X and Y drivers in the "read" operation and selected X, Y drive and inhibit drivers in the "write" operation. The operation of such a word organized core memory is well known in the art and is incorporated in a large number of present day commercial computers. A complete description of such a 3–D memory may be found in the above cited book and chapter of R. K. Richards; the article "Computer Memories: A Survey of the State of the Art" by A. Rajchman, page 104 of Proceedings of the IRE, January 1961, vol. 49, No. 1; the article "A 32,000-Word Magnetic-Core Memory" by Foss and Partridge, page 102 in the IBM Journal of Research and Development, vol. 1, No. 2, April 1957; the IBM 704 and 705 Customer Engineering Reference Manual; The IBM Customer Engineering Manual for the 7302 Core Storage Unit.

Similarly, specific descriptions of the Memory Address Registers, Decode Matrics, Core Driver Arrays, etc. disclosed in block diagram form in FIGURE 2 may be found in the above references.

Still referring to FIGURES 2*h*–2*k* the addressing circuitry for such a 3–D word organized memory must, of course, be able to select any one of the 16,384 words used in the present 128 x 128 64 plane 3–D memory. To do this, a fourteen position Memory Address Register shown as 300 in FIGURE 2*i* is utilized to select the address for a particular word in memory. As will be readily understood, this fourteen bit Register is capable of 16,384 combinations which can be decoded through proper decoding matrices as will be explained subsequently. Seven of the bits of the fourteen bit Address Register are utilized to determine the X address and the other seven bits, the Y address. This is likewise clearly shown in the figure. The addresses supplied to this register will be supplied from a number of different sources as will be apparent from the following detailed descriptions of typical system operations. However, for a standard Input operation, the sequential address for storing data will be gated from Current Register 1032 which obtains its initial address from the Availability List. In such a case, the first position of said segment of available storage locations is placed in the Memory Address Register 300 and subsequent machine words are automatically fed into adjacent locations upon command of the incremented Current Register 1032. Of course, on "read out" operations, it is to be understood that a specific address would be fed to the register from the Search Control Circuitry and the "read out" operation carried out in accordance with such address.

As stated above, the fourteen bit total memory address is decoded seven bits at a time in the X and Y decoding sections. These decoding systems may take any one of many forms including electron tubes, transistors and various types of magnetic core circuits. For the general system to be described herein, it will be assumed that the Decode Matrix is a standard set of transistors having relatively low power output which must be amplified by suitable amplifiers or driver circuits and subsequently fed to a pulse transformer array or the core driver array as it is usually referred to in the art and subsequently to the individual X and Y driver lines selected in accordance with the address.

The core driver matrix or array is a conventional method of driving large numbers of cores in a memory matrix. They are actually very similar to the individual memory cores themselves in that they have a square hysteresis loop and are bistable. They possess a further advantage in that they can be arranged in an array in a manner similar to that used for the main storage section and although 128 core drivers will be necessary to drive 128 X or Y lines they may be arranged in, for example, an 8 x 16 array and will thus necessitate only 24 driving circuits which are selected in accordance with the output of the decoders. The 8 x 16 core driver arrays shown in FIGURE 2*i* are again quite conventional and are convenient since the address for the eight input portion may be conveniently decoded from the first three bits of the X or Y address and the sixteen input portion from the latter or second four bit address for the X or Y portion of the Main Memory Address. It is for this reason, for the sake of clarity, that the X and Y Decoders 540 and 541 are shown schematically in two sections as they actually break up the address into the two discrete portions to drive the Core Driver Array. Since each of the X and Y drive lines must be able to produce pulses of $H_C/2$ of both the positive and negative value, the output of the pulse transformers or cores of the core array must be capable of being driven in opposite directions by its associated drivers. This is conventionally accomplished by feeding the output of the decode matrix into one of two sets of drivers, each of which is connected to different windings on the cores of the core array which produce opposite polarity pulses in the output winding which feeds the individual X and Y drive lines. Which set of drivers is selected, i.e., read or write, is determined by the Main Memory Timing Circuits or Clock.

In summary, the manner in which a particular word location is addressed includes the following steps, the Main Address for the word to be brought out of or read into memory is placed in the Memory Address Register, the address is decoded in the X and Y Decoding Matrices, the output of the Decoding Matrices is amplified in the Driver circuitry and the Driver circuitry is utilized to select particular cores of the X and Y Core Driver Arrays to produce coincident current pulses on selected X and Y Drive lines in the Main Memory. This pulse appearing on the X, Y drive line causes all cores at that particular address, i.e., 64 in number to be switched in their "1" or their "0" states and accordingly, any core which was previously in the opposite state will produce a pulse in its associated sense winding as it changes states on its hysteresis loop. This output pulse is brought out on the individual sense lines for each of the 64 planes and is stored as a one in the associated position in the Memory Buffer Register, i.e., 96, after passing through suitable gating circuits and sense amplifiers.

As stated previously, in a conventional read, write cycle, after the reading operation, the write cycle automatically follows and the word read out of the memory will automatically be replaced in the memory in order to preserve the data contained therein for future reference. It will, of course, be understood that if it is desired to completely erase the word from the position in storage, the Memory Buffer Register may be set to all 0's by well known means so that nothing will be written back into the Main Memory on the "write" cycle.

As is well known, in order to specifically write binary information into a memory location in accordance with the binary data in the Memory Buffer Register, means must be provided for supplying an $H_c/2$ pulse to the Z or inhibit windings passing through each plane so that at the appropriate places the writing of a binary "1" in the cores may be prohibited or inhibited during the write portion of the memory cycle. This is accomplished by a series of inhibit drivers which may for the sake of simplicity be considered as 64 separate drivers or amplifiers whose outputs are brought up in accordance with the appearance of a "1" or a "0" in the associated position of the Memory Buffer Register. The output pulse of the Inhibit Driver circuit is, of course, chosen to be sufficient to produce an M.M.F. of $H_c/2$ in the inhibit driving winding. Since the polarity of the inhibit drive is always the same, i.e., to cancel out half of the coincident current produced $H_c$ for writing a "1," only one driver is required for each plane.

As a practical matter, it is to be understood that for both the inhibit and sense windings due to noise and various other considerations caused by the magnetic circuitry both of these windings are often broken up into sections and read out or driven in parallel so that fewer windings will have to be driven in series. However, this operation is essentially the same and identical functionally to that described herein.

It is believed that the above description, while very general, clearly indicates the manner in which a typical three dimensioned word organized core memory operates. Timing circuits are used to control all of the above operations of such a memory in proper sequence and time. Such units are usually asynchronous because they initiate all of their own timing pulses.

Any Core Storage operation must be started by a selected signal supplied to the particular Core Storage Unit. A signal appearing on what is conventionally known as a "memory select line" is the basis for all timing operations within such units.

The timing circuits themselves often consist of a group of Delay Units fed from the pulse appearing on the Memory Select line. By choosing delays of proper duration a pulse may be obtained at any time throughout the Core Storage Unit cycle. Specifically, gate pulses may be obtained by using one delay line to turn on a Trigger Circuit and a second delay line to turn off the trigger. A self-contained Clock or series of single shots of the type disclosed in the present system could likewise be used for effecting the timing in the Memory controls.

The major timing events in such a system are illustrated in the timing chart of FIGURE 12 wherein the first curve represents the read and write pulses which appear coincidently or concurrently on both the X and Y drive lines during the read and write portion of the memory cycle. The opposite polarity of the read and write currents is apparent from the curve. The portion of this curve marked PWD is "post write disturb" pulse that is passed through the X and Y drive lines subsequent to a memory cycle to compensate for problems due to the lack of squareness or perpendicularity of the sides of the hysteresis loop and is well known in the magnetic core storage field and will not be mentioned in greater detail.

The second curve indicated as "read gate" is the pulse supplied to the gating circuits which gate the output of the Decoding units into the read drivers and thus produce a read pulse on the X and Y lines. The third curve is the inhibit gate pulse which gates the output of the inhibit drivers into their respective windings during the write portion of the cycle for the purpose explained above. The write gate operates similarly to the read gate, and gates the output of the X and Y decoders into the write instead of the read drivers for this portion of the cycle. The RO or read out sample pulse occurs during the read portion of the cycle as the name indicates and gates the sense amplifiers during only a small portion of the entire read cycle and serves to eliminate much noise that would otherwise be picked up as is well understood in the art. The last curve entitled "Reset Buffer Register" and "Reset Storage Address Register" is a pulse which serves to increment the Memory Address Register if sequential memory locations are to be used during writing operations, or can alternatively be used to reset the Memory Address Register to zero if a new address is to be fed in from program storage. The pulse similarly resets the Input, Output or Memory Buffer Register, i.e., 96 back to its "0" state to allow for storage of a new machine word either to be stored in memory or to be read out from memory. All of the timing systems, sequences, and circuits described herein are quite conventional and the specific details of the operation of any one type may be obtained from most of the sources in the list of references set forth above.

The control of the various operations of such a Memory unit is determined by the program which states whether information is to feed from external storage into the memory or whether it is desired to read specific data strings at specific addresses out of the memory. Once having received the program instruction, such a memory control system is essentially autonomous and carries out the instruction whether an "input" or a "read out" instruction automatically and after carrying out one instruction is ready to proceed with the next program step.

Writing and reading operations in such a conventional 3–D and 2–D memory are well known. In the present system all that is required to erase a 3–D word is to remove the occurrence marks associated therewith in the 2–D memory as is described in the Insert operation. Thus, if no marks occur in the 2–D planes, that portion of associated data in the 3–D memory will never be accessed. It will of course be obvious that the 3–D word would be erased if desired by a proper clock pulse to cause resetting the MBR to all "0"s and initiating a 3–D write cycle at the time of the 2–D "erase" cycle.

As stated previously in the specification, the above described system components comprise the Data Input section of this system where no links are to be effected. There will now be generally described that portion of the Search controls of FIGURE 2 which operate when no data discontinuities are detected. The specific details of the operation of each of the specific logical blocks will be described in detail in the specific description of a Search operation and the timing table (V) for such Search operation.

Starting Address Register 516 in FIGURE 21 contains the Starting Address of a data string where a search of the heiarchically organized data is to begin. This address is gated upon command to the Memory Address Register 300 in Main Memory, described previously, which provides for the gating out of the proper X line from the 2–D memory to enable a search for a level identifier in this line. This address also provides for the gating of the proper Discontinuity Plane line as described previously. Register 528 stores the particular level which is to be searched, i.e., ④ for a level which again is obtained from the search program. This identifier is decoded in the Decoder 529 which functions to gate an entire Y line from the desired, i.e., ④ special memory plane of the 2–D memory, which operation was described with reference to FIGURES 2*h*, 2*i*, 2*j* and 2*k* previously.

The identifier count or the number of the identifier to be sensed starting from the "beginning address" is placed in Register 562 and again is derived from the program. This count is brought down into the Compare Circuit 638 and compared against the results from the Search Ring itself 614. The direction of the Search whether left or right is likewise determined from the program input and sets Direction Flip-Flop 580. The input to this flip-flop is likewise determined from the program.

It should also be noted that a "do search" input is provided to OR circuit 512 which is again derived from the program and it is this input which initiates the actual Search cycle. In summary, the information from the program necessary to initiate the Search cycle is the "do search" input, the starting address, the identifier marks to be searched, the number of identifiers in each level which are to be counted and recognized and finally, what the direction which each Search for each identifier is to have.

Section F includes the Search Ring and several controls and performs the actual searching of the Level Planes to provide the absolute beginnings and end addresses of a particular bit of data being sought.

With the hierarchial level identifier marks stored in the auxiliary planes of Memory Section 901, as described above, a particular string of information may be found, provided its relative position in a data string is known, i.e., by first scanning the core plane associated with the highest order of classification at the beginning address of the data string to find the memory address in which the highest order of classification for the desired information is located, then dropping down to the core in the next highest order plane which corresponds to this address and continuing the search until the required number of data identifiers have been found in this plane; and so on until the desired address is located. Thus a Search instruction of the general type might be starting at Address A find the first ④, the second ③, the fifth ②, and third ①. While the Search generally proceeds in only one direction, it is possible that the Search might also have to be conducted in the opposite direction. For example, suppose it is desired to locate next-to-the-last field in the second record of a particular block of data. Here the Search proceeds in the first plane until the second record identifier is found, and then back in the other direction in the next plane until the first field identifier is found.

It is, therefore, seen that the search circuitry for such a memory device must be capable of initiating a Search in the cores of the Identifier Planes, or in any other register in which the identifier bits are stored, at any desired position and should be capable of searching the register in either direction for maximum flexibility. The circuit must also be capable of generating an output signal when a bit is found which signal may be encoded to indicate the corresponding Memory Address. The Search circuit must also be capable of continuing the search to succeeding positions if the located address, i.e., level identifier, is not the desired one.

Figure 3:
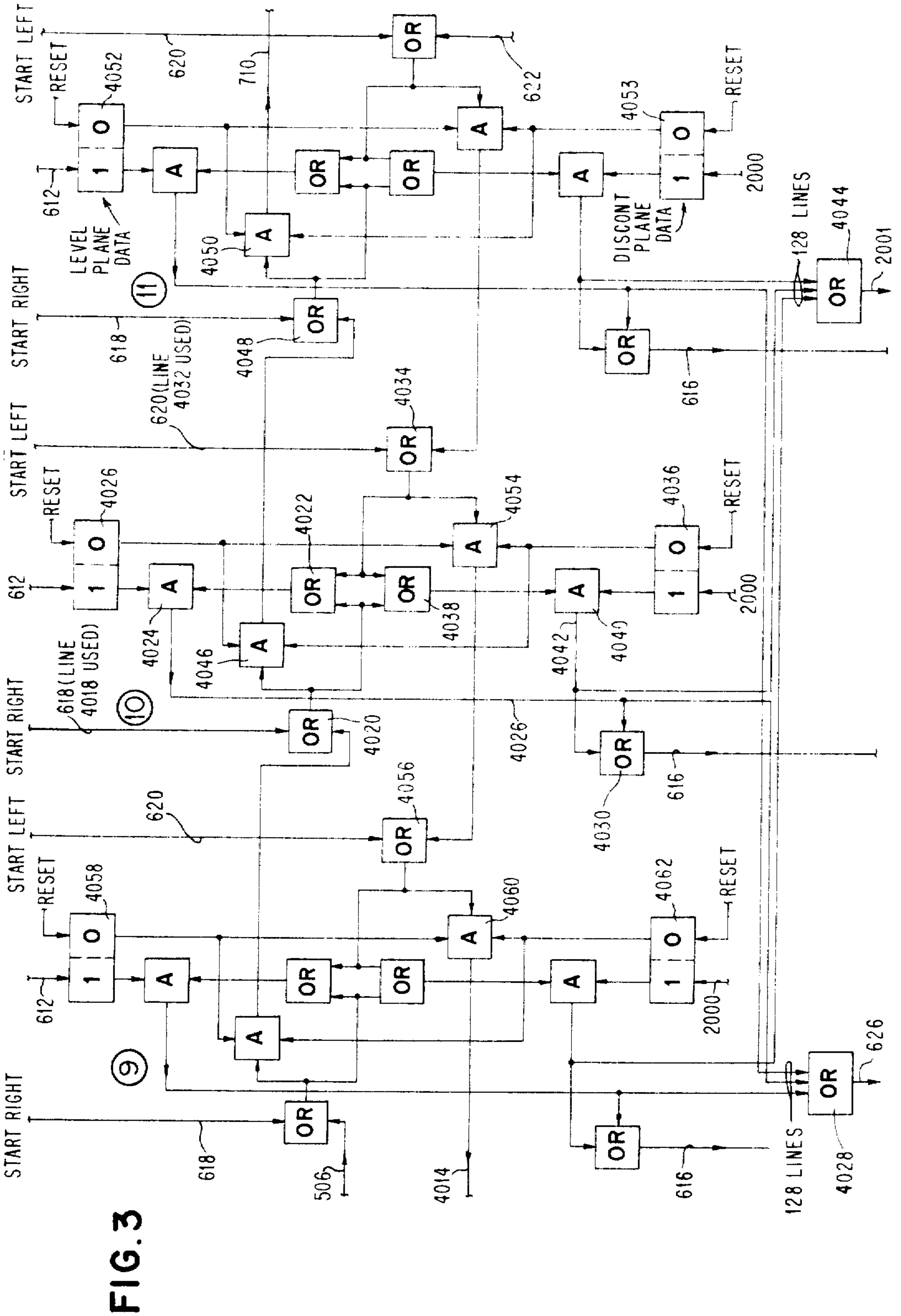
FIGURE 3 is a logical schematic diagram of a special Search Ring utilized in the present system to concurrently search two storage registers.

It should perhaps be stated at this time in the description of the Search Ring that the Search Ring must be able to concurrently search a line of data gated thereto from an appropriate Level Identifier Plane and at the same time search the corresponding line from the Forward or Reverse Discontinuity Plane depending on whether a "search right" or "search left" instruction respectively is being conducted. FIGURE 3 whose operation is described in detail in the subsequent specific description of a Search operation discloses three stages of a 128 stage Search Ring capable of performing such a concurrent search. Generally, the Search Ring operates as follows:

First, the contents of the appropriate X line from an indicated Level Identifier Plane are gated from Register 312 over line 612 into the upper series of bistable elements 4058, 4026 and 4052. This data will set these elements in accordance with their binary content. Similarly, the same X line from the appropriate Discontinuity Plane is gated from Register 312 over lines 2000 into the lower set of bistable elements 4062, 4036 and 4053. Various AND gates will be partially selected in accordance with the contents of their associated bistable elements. When a "search right" or "search left" signal is applied to any of the 128 stages in the Search Ring, the signal will go directly through such stage wherein both bistable elements are set to a "0." If on the other hand, one or both of the bistable elements contain a "1," the propagation of the signal will be stopped. Regardless of whether the "1" bit was encountered in the upper or lower portion of the ring, an output will be provided on line 616 which as will be explained subsequently, indicates the stage in which a "1" bit was encountered. If a "1" bit occurred in the upper row of Level Plane Registers, an additional input will occur on line 626 which is ORed together for all 128 stages of the Search Ring and merely indicates that a level identifier bit has ben detected in the ring. If a "1" bit is detected in the lower Discontinuity Register, an output will occur on line 2001 which indicates that a discontinuity has been detected in the data string stored in memory, said discontinuity occurring at the address associated with the particular 616 line which was activated.

An output on any of the lines 2001 will initiate Clock Pulse 30 in the Search Clock to start a Discontinuity sequence, so that the search may be continued in the suitable portion of memory in the linked data string. The reason for the Discontinuity sequence is apparent from the previous description of a Search operation illustrated in FIGURE 10. The specific details of the Discontinuity sequence are fully described in detail in the subsequent specific description of the Search operation.

Returning to the operation of said ring, if there were no discontinuity bit detected but a level identifier bit, if after having located this bit and comparing it to determine that it is not the proper occurrence and it is desired to continue the search onto succeeding positions, means are provided for re-energizing the search continuing means. This Search Ring will then continue the search in either direction depending upon whether a "search right" or "search left" line is energized by the Control circuitry.

Referring to FIGURE 2*n*, which is a portion of the Search Control Circuitry, there will be seen two gate circuits 610 and 2–3 which function to gate the contents from a particular X line from a Level Plane and a Discontinuity Plane into the upper and lower registers of the Search Ring 614. As stated above, the Search Ring is capable of sequentially scanning this stored information until a bit is located in either the upper or lower Storage Registers associated therewith. The outputs from stages 0–127 are fed to the Control circuitry for requesting the next line of data from the auxiliary planes in the event that the desired bit is not located. This operation is described in the specific description of the Search operation. However, for a more detailed description of a simple search procedure without discontinuities, reference is again made to the copending application of Rex Rice. When a bit is located in the level stage of the ring, an output signal appears on line 616 as stated previously corresponding to that stage of the ring and the scan stops. The scan may be reinitiated starting with the succeeding stage to the right of that in which the bit was located by applying a signal to the line 618 corresponding to the stage in which the bit was found, or the search may be continued starting with the adjacent stage to the left of that in which the bit was found by applying a signal to the line 620 associated with the stage in which the bit was found. A pulse applied to reset line 622 from OR circuit 623 is operative to reset all the stages of Search Ring 614 at the end of each Search cycle or in the event that a desired mark is not found in the Current Search and prepares the ring to search the new contents gated from the special 2–D core planes. The specific details of a similar but single ended Search Ring will be found in copending U.S. patent application Serial No. 224,966, filed September 20, 1962 by R. F. Schauer. This Search Ring while only showing the search of a single register, discloses typical circuitry which could be used in the present ring. The operation of the above mentioned ring is very much like that disclosed herein.

An output on any line 616 from Search Ring 614 is applied through common line 626 to Counter 628, a signal on a line 616 is also fed to Encoder 630, an input to the Encoder 630 causes outputs on seven of the fourteen lines 632 one line from each section to be applied to the seven flip-flops FF1, FF2, FF4, FF8, FF16, FF32 and FF64 of Address Register 634. A signal on the left line of 632 of each pair indicates the presence of a bit in that position and sets the flip-flop it is connected to, to its "1" state while a signal in the right line indicates the absence of a bit in that position (the NOT condition) and sets the associated flip-flop to its "0" state. Register 634 indicates in which one of the 128 stages of the Search Ring the last bit detected was located. The flip-flops of Address Register 634 may also be set by applying signals to seven of the fourteen lines 558 coming from gate 550, this allows the external Control circuit to determine where in the Search Ring 614 the particular search will begin. It will, of course, be obvious that an address stored in Register 634 may either be indicative of a level identifier bit if line 626 is also energized or a discontinuity bit if line 2001 is energized.

In the former event, the contents of Counter 628 are compared in Compare circuit 638 with a value set in the Compare circuit over line 639 from the Count Register 562. This value is determined by the relative positions of the relative positions of the desired information in the data string and is in the level identifier planes previously described, equal to the number of identifier bits which must be detected before the desired address is found at the identifier level being sampled. When the comparison is successful, a signal goes out to the external Control circuitry along line 640 to indicate that the desired address has been found and to, among other things, cause the resetting of the stages of Search Ring 614. When a comparison is unsuccessful, a signal on line 642 is applied to the fourteen AND gates 644 to gate the outputs from flip-flops FF1–FF64 of Address Register 634 through seven of the AND gates 644 to energize seven of the fourteen lines 646. The lines 646 are one of the inputs to Decoder 648. The other inputs to this decoder are search right line 650 and search left line 652. When the search right line 650 has a signal on it, the Decoder 648 energizes the continue right line 618 which corresponds to the address stored in Address Register 634. Similarly, when the search left line 652 has a signal on it, the Decoder 648 energized the continue left line 620 which corresponds to the address stored in Address Register 634.

The above general description of the Search Ring and its associated controls, is general in nature and it is only intended to explain the general function of the circuit. A specific description of the operation of the individual logical elements is presented in the following specific description of a Search operation.

The "Search Clock" shown in FIGURE 20 is very similar to the "Input Clock" in that it comprises a series of single shot multivibrators having their inputs and outputs connected as indicated in the drawing of FIGURE 2. The specific detailed operation of this portion of the circuitry again may best be understood by referring to the following specific Search operation where a typical "do search" Input instruction is gone through step by step in conjunction with a timing chart for the Search operation.

Before proceeding further with the general description of the more significant portions of FIGURE 2, now with specific reference to the circuitry for inserting the links and linking characters and for searching same, it should be noted that different sections of the clocking or timing circuits, denoted by the single shots 1–72, are functionally organized to perform different operations. These clocks are referred to as the Input Clock C, the Insert Clock G, Search Clock L and Discontinuity Clock M in FIGURE 1.

Referring now to FIGURE 2, the Input Clock comprises single shots 1 through 11. These single shots are organized as follows: s.s. 1 through s.s. 5 controls the simple storage of characters in the Memory Buffer Register via storage in Main Memory; s.s. 6 and s.s. 7 initiate a 3–D memory cycle in the first 2–D memory cycle and s.s. 7 and s.s. 8 store the remainder of the 2–D level marks which are called for by the Compare Circuitry and the Level Ring 58. The remainder of the single shots 9 through 11 perform various functions, which functions are clearly set forth in the timing chart of Table 3, which precedes the specific description of the Input operation. It should be further noted with respect to the Input Clock that the single shots *3a–3c* and *6a–6h* actually control the storage of the appropriate link characters and linking addresses and control the routing of beta from the Input Memory Buffer Register into the proper memory addresses.

Referring now to FIGURES *2q*, *2r* and *2s*, on which are located s.s. 45 through s.s. 72, it will be noted that this part of the clocking arrangement comprises the Insert Clock. This clock sequence controls an Insert operation and assures that all of the proper addresses are accumulated in the proper registers and as an Input operation proceeds, supplies the proper addresses to the Main Memory Address Register 300 both for the reading and writing of data as well as for the generation and storing of the link characters and linking addresses. Again, the specific operating sequence of this clock is clearly set forth in the timing chart of Table 4, located prior to the specific description of such Insert operation.

Single shots 21 through 29 in FIGURE *2o* comprise the standard Search Clock, referred to in FIGURE 1 as block L. This portion of the clock controls a normal search routine when no discontinuities are discovered in the data string. In other words, the clock accesses the search information including the starting address of the data string to be searched, the information in the Count Register and in the Identifier Register and accesses the proper lines of both the Level Plane and the proper Discontinuity Plane, gates same into the Search Ring and proceeds with the standard search for the Level Identifiers.

Clocks 30 through 40 constitute the Discontinuity Clock and control the operations involved in accessing the Main Memory Word at the address at which the discontinuity mark was located. This clock sequence locates the linking address from this word, accesses the new data string and provides the Memory Address Register with the same and when necessary, initiates the Reverse Push-Down Store sequence, which as stated in the description of the example of FIGURE 10, allows a reverse search through the discontinuous data prior to a forward search through same.

Having thus described the various clock sections of the Control section of the system, the more important functional elements of the link generation and discontinuity search element will be described.

As stated previously in the specification, the beginning and end addresses of an available storage location must be loaded into suitable registers provided therefor in the system. It will be noted that Registers 1032 and 1040 marked "Current" and "End" are the registers in which the Availability Lists are placed. It will be noted that the output of both of these registers are supplied to the Current—End Compare Unit which as described previously will produce a signal or "1" when the addresses in the Current and End Registers are the same. Also, as described previously, this signal indicates that the current storage room in Main Memory has been used up and that links must be created to a new storage section. The Link character itself is generated by the block marked Link Character in the upper left-hand corner of FIGURE *2f* which character is stored in binary form in, for example, a series of flip-flops, whose state may be transmitted upon command to the sixth character position of the Memory Buffer Register 96 through the gate circuit 1064. Whenever desired, this Link character may be placed in the Memory Buffer Register prior to storage. It will also be noted that cables are provided for transferring the address from 1032 into the seventh and eighth character positions of the Memory Buffer Register. Two cables are required for the two character positions previously, since both an X and a Y address are required, each taking up seven bits of a character. It will also be apparent that the linking address may be supplied to the seventh and eighth character positions of the Memory Buffer Register during different operation cycles from Register 780 over lines 3148 and 3150 through gate circuits 2018 and 2016. The address is taken from this register during an Insert operation and it is this address that links the Insert back into the original data stream as will be described specifically in the Insert operation description.

Referring now to FIGURE 21 and to the Begin Register 764 and the End Register 780, it will be noted that these registers are used during a standard search sequence to store the "beginning" and "end" address of a particular string of data being searched by the system. During an Insert operation, if the register is first supplied with the "beginning" and "end" addresses of the data string to be inserted in another existing data string, the addresses are gated on command to Registers 1764 and 1780. After this is done, the Registers 764 and 780 are provided with the address of the word in which the insert is to be placed, i.e. the beginning address of this word is actually provided as it is required by the system to define a portion of data by its "beginning" and "end" address. However, the "end" address of the word is actually the spot where the links will be inserted and it is this address in Register 780 with which we are concerned in the Insert operations as will be clearly set forth subsequently.

As stated above, the extent addresses of the data string to be inserted are transferred to Registers 1764 and 1780. Wherein once the link character and linking address are inserted in the original data stream at an address ascertained by decrementing the Register 780, the Insert operation or the transfer of the data from the storage locations specified in the Registers 1764 and 1780 to the new storage locations as determined from the Availability List is begun. As stated in the general description of FIGURES 6 and 7, this data is transferred a machine word at a time from the storage location currently in the Register 1764 and transferred to the new storage location. Also, it is pointed out that each time a machine word is transferred, the Register 1764 is incremented one count to access the next machine word of the insert data string. The Compare Circuit block located between Register 1764 and 1780 performs the function of determining when the insert has been completely transferred. When a signal is produced on the output line of the Compare circuit and transmitted to AND circuit 2096, the system knows that it must now link back into the original data string again at an address which is determined from Register 780.

Thus, to recapitulate briefly, during an Insert operation, and this would also apply to a Define and Delete operation the system must continually be keeping track of three sets of addresses. The first is the Availability List of blank storage locations which, as stated previously, are stored in Register 1032 and 1040. The second is the addresses of the data string in which the insert is being placed; these addresses being stored in Registers 764 and 780. Thirdly, the extent addresses of the actual insert material must be stored, which, as stated previously, is first ascertained in Registers 764 and 780, by for example, a conventional search procedure and then transferred to the Insert Data Registers 1764 and 1780.

Referring back to the description of FIGURE 7 where it was stated that in certain instances before a Link character or linking address may be stored in a given data word, it must be ascertained whether or not data is contained in that position. This test is affected by the blocks marked Compare and Null Character located in the lower right-hand corner of FIGURE 2*c*. The binary representation of the Null Character is stored in a conventional register or some other sort of read only memory well known in the art and when it is desired to test the sixth character position of the Memory Buffer Register, the contents thereof are read into the Compare block and compared with the stored binary notation in the Null Character block. If it is determined that a Null is present, it is then necessary to temporarily transfer the data from the sixth, seventh and eighth character positions of the machine word currently stored in the Memory Buffer Register. This is done in the New Data Register 3113. This register is a simple three character storage register which will store the characters transferred from the Memory Buffer Register in positions 6, 7 and 8 and hold them in storage until it is determined where this data is to be put subsequently.

It should perhaps be again stated at this time that whenever a write cycle is initiated in the Main Memory and the information in the Memory Buffer Register written into a specified address, the Memory Buffer Register is reset not to zeros but to the special Null Characters. This simplifies a number of machine operations involved in the present hierarchically organized variable field length data system as there are many machine word locations which will normally not be completely filled by eight characters when subsequent level identifier marks are detected in the data. This means that regardless of whether the Memory Buffer Register is filled or not, the machine word currently in the MBR must be written into memory and a new word started. This characteristic is helpful in the present system also such, for example, as when the last word of a data insert contains more than five characters and it is not possible to write the Link Character and Link Back Address in this last word of the insert. Again referring back to FIGURE 7, it will be seen that an additional storage location from the Availability List is needed into which only the special Link Character and the "link to" address are stored, leaving the first five positions of the machine word with Null Characters.

It is believed that the above general description of FIGURES 5 through 9 together with the general description of FIGURE 2 and the more significant components thereof as well as the functional inter-relationship of these components clearly describe the method of generation of the Link Characters and Link Addresses as anticipated by the present invention and further specifies the manner in which the location of these Link Characters is achieved by the circuitry relative to the Forward and Reverse Discontinuity Planes.

The special circuitry required for the Search operation must provide for the detection of discontinuities and other search features utilizing the discontinuity marks and the linking addresess. The circuitry comprises three primary additional functional elements over those required for a standard Search operation through such a variable field length hierarchically organized data system. These are the Reverse Push-Down Store section of memory shown in block form in FIGURE 2*i* in the block marked RPDS ADD. The second item is the special "double ended" Search Ring which has been generally described previously and whose operation will be described in detail relative to FIGURE 4 and the following specific description of a Search operation. The third component is the special section of the Search Clock, i.e., single shots 30 through 40, which control the system during a Discontinuity operation. It will be noted that the bistable flip-flop labelled Discontinuity Latch shown in the upper center portion of FIGURE 2*o* actually is the element which is set to a "1" when a discontinuity is detected by the Search Ring and a suitable output provided on one of the lines 2001. It is the setting of the Discontinuity Latch to the "1" position which initiates the Discontinuity Clock and causes the machine word stored at the detected location in the Discontinuity Plane which location is an address stored in Register 634 to be read out of memory into the Memory Buffer Register. The Discontinuity Clock then causes the linking address in the seventh and eighth character positions of the Memory Buffer Register to be transferred back into the Starting Address Register over lines 3168 and 3170 in the upper left-hand corner of FIGURE 21. This new address is then utilized in a manner that will be specifically detailed in the following description of the Search example to access a new line of the Level Plane and the appropriate Discontinuity Plane in the 2–D memory and supply the contents of said lines again to the Storage Registers in the Search Ring 614.

Concurrently, with this operation, the address of Register 634, which would have been used by the Memory Address Register 300 to gate the associated data word out of memory to obtain the linking address, will be stored at an appropriate location in memory in accordance with the Reverse Push-Down Store Address. Thus, in the simplest case, assuming that a reverse search were to be implemented just subsequent to the storing of the single address in the Push-Down Store, when the reverse discontinuity occurrence mark is encountered in the Search Ring, the control would access the last used portion of a Reverse Push-Down Store which would provide the address for linking back to the first part of the data string at the first forward link location and allow the search to continue at this point. Of course, it will be obvious that in the Reverse Search operation, where the address for the first link is obtained from a Reverse Push-Down Store, it will not be necessary to gate the marked machine word out of Main Memory as the linking addresses have been obtained from said Push-Down Store. Therefore, the steps of accessing the Main Memory and reading out character positions seven and eight will be eliminated from the procedure during a Reverse Search across a link. It will then be necessary to go through a Push-Down Store cycle.

It will be reiterated again for emphasis, that in order for a Reverse Search to be accomplished with the present system, it is necessary that a search proceed across the sections of memory to be reverse searched in the right direction before proceeding in the reverse or left direction.

It is believed that the portion of the present system concerned with the searching of a hierarchically organized variable field length storage and handling system provided with means for linking desired data strings together has been clearly disclosed and described relative to the general concepts involved. The following detailed description of Input, Insert, and Search operations will clearly explain the specific operations of the great majority of the logical circuitry shown in FIGURE 2.

The following "Insert," "Input" and "Search" operations describe very simple data strings, i.e. they are short and do not illustrate all of the situations relative to the breaking up and storage of this hierarchically organized variable field length data. For more complicated data input problems reference is again made to the above-mentioned copending application of Rex Rice. It should be noted, however, that the present examples do completely illustrate the generation of the "links" and "linking addresses" and the storage of marks in the Discontinuity Planes such as would be necessary in any "Input,"

"Insert," "Delete" or "Define" operation. The Search example illustrates and explains the manner in which these "linking addresses" and discontinuity work are utilized to search memory through a discontinuous data string.

It will be noted in these examples that a Timing Sequence Table precedes each operation description. Reference to these tables while proceeding through the detailed description of the particular operations being described will greatly enhance an understanding of the description. In fact, the tables themselves list in proper sequence all of the unique operations performed during the various operations.

TABLE III.—TIMING SEQUENCE FOR INPUT OPERATION

Initially:
- Set F.F. 38 to "1"
- Set Output Ring to 1
- Set MBR Ring to 1
- Set MBR to nulls
- Set Compare Counter to 0
- Set Compare Ring to all pos. off
- Set Compare F.F. to "0"
- Count of 8 in Input Counter starts Clock
- Load 1032 and 1040 from Availability List
- Set "current-end" Latch to "0"
- Set F.F. 1000 to "0"
- Set F.F. 1001 to "0"

CL–1:
- Gate Char. to 6
- Set up Level Compare circuitry
- Go to CL–2

CL–2:
- Reset corresponding position of Input Buffer
- Set F.F. 38 to "0"
- Subtract one from Input Buffer Counter 14
- If Compare Counter is at 1, set Compare F.F. to its "1" state
- If 1st or "no compare"→CL–3
- If 2nd compare and MBR Ring not on 1st pos.→CL–6
- If 2nd compare and MBR Ring on 1st pos.→CL–9

CL–3:
- Gate char. from 6 to MBR
- If "current-end" Latch is set to "1," gate Current Register to 300→Cl–3a
- If "current-end" Latch 1010 is set to "0,"→CL–4

CL–3a:
- Gate new Availability Addresses into Current and End Registers
- Reset "current-end" Latch to "0"
- Set F.F. 1000 to "1"—this enables a gate to connect the 5th position of MBR 96 through an OR circuit with line 128 to the left hand input of AND circuit 100.
- →CL–3b CL–3b:
- Gate "link" character into 6th position of MBR 96→CL–3c CL–3c:
- Gate the address in the "current" Register to the 7th and 8th position of 96→CL–4

CL–4:
- If MBR Ring not on 8 or 5, Blank Input and Input Counter="0" not up,→CL–5
- If MBR Ring on 5th position, F.F. 1000="0," Blank Input and Input Counter="0" not up→CL–5.
- If MBR Ring on 5th position, F.F. 1000="1,"→CL–6d
- If MBR Ring on 8th position,→CL–6
- If Blank Input up, Input Counter="0" F.F. 1000="0,"→Cl–6
- F.F. 1000="1,"→CL–6d CL–5:
- Advance Output Ring
- Advance MBR Ring
- Reset 6
- →CL–1

CL–6:
- Gate "current" Register to 300
- →CL–6a

CL–6a:
- Increment "current" Register
- →CL–6b

CL–6b: Initiate 3–D Memory cycle

During this memory cycle, the contents of the MBR will be stored in the 3–D memory. If a level identifier has been encountered, it will be a stored in the highest plane.

The "have-used memory" pulse counts down the Level Ring, resets the MBR to nulls, resets the MBR Ring to its 1st position and→CL–6c.

CL6c:
- Gate equal output of Compare unit between "current" and "end" Registers to the "1" side of the "current-end" flip-flop.
- If F.F. 1001 is in its "0" position,→CL–7
- If F.F. 1001 is "1,"→CL–6d CL–6d:
- Initiate 3–D memory cycle
- Resets MBR to nulls
- Resets MBR Ring to ones
- Count down Level Ring→CL–6e CL–6e:
- Initiate 2–D memory cycle (to store mark in FD Plane at the address in 300)
- →CL–6f CL–6f:
- Reset F.F. 1000 to "0"
- Set F.F. 1001 to "1"
- →CL–7

CL–6g:
- Initiate 2–D memory cycle to store mark in RD Plane at address in 300
- →CL–6h CL–6h:
- Reset F.F. 1001 to "0"
- →CL–7

CL–7:
- If Level Ring is in its zero position and Compare Counter is at two,→CL–9
- If Level Ring is not zero,→CL–8
- If Level Ring is zero and Compare Counter is at 0 or 1,→CL–1
- If Level Ring is zero, Compare Counter is at 0 or 1, Blank Input is up and F.F. 1001="1,"
- →CL–1

CL–8:
- Initiate 2–D memory cycle
- The "have-used memory" pulse counts down the Level Ring
- →CL–7

CL–9:
- Reset Compare Counter to zero
- Reset Level Ring to zero
- Reset Compare F.F. to "0"
- →CL–10

CL–10:
- Gate 6 to Compare circuits
- →CL–11

CL–11:
- Set Compare F.F. if Compare Counter is at 1
- →CL–3

*Input operation*

The following section specifically describes the operation of the system during an Input operation and explains the generation of links when the input data string exceeds the currently available address. Assume the following input string to the Input Buffer Register 10, FIGURE 2*a*, ④ A B C D E ② F G Current Address equals 100, End Address equals 101. 100 and 101 are loaded into the Current and End Registers 1032 and 1040. The next available Current Address equals 600. The Associated End Address is 601. The Input Counter 14 of FIGURE 2*a* has a one added to it each time a character is added into the Input Buffer Register and a 1 subtracted from it each time a character is taken from the Input Buffer Register and placed into the Memory Buffer Register. When the Input Counter 14 is equal to 8, a signal on line 32 is routed down to OR 34 at the bottom of FIGURE 2*d* and will supply a pulse to AND 36. The other input to AND 36 is conditioned by a signal from the "1" side of flip-flop 38 The signal from AND 36 is fed to DIF unit 40 which will supply a signal through OR 1003 to line 1002, OR 42, and turn on s.s. 1. The output of line 46 from s.s. 1 is fed to AND 48, FIGURE 2*a* and will gate a character to Register 6, FIGURE 2*b*. The signal on line 46, through OR 52, AND 54, will route the information from Register 6 into the Level Compare Unit 56. This first character in our example is a ④ and will result in an output on line 1004, through OR 60, and bump Compare Counter 62 to the 1 position. When s.s. 1 times out, a signal on line 70 will turn on s.s. 2. The signal on line 72, through OR 74, FIGURE 2*b*, will produce a signal to AND 76. The other input to AND 76 is conditioned by the "1" output of the Compare Counter 62. Flip-flop 64 will be set to the left hand side. The signal on line 72, FIGURE 2*d*, is also routed to set flip-flop 38 to the right hand side. The #1 output of the Compare Counter 62, FIGURE 2*b*, is routed through OR 80 to condition one input of AND 82. The other input of AND 82 is conditioned by the signal from s.s. 2 on line 72. The output of AND 82 will set flip-flop 84 to the left hand side and flip-flops 194 and 232 to the right hand side. The signal from flip-flop 84 on line 86 will condition one input of AND 88 on FIGURE 2*d*. The other input of AND 88 will be conditioned when s.s. 2 times out. This will result in a signal from AND 88 through OR 90 and turn on s.s. 3. The output of s.s. 3 on line 92 is routed to gate 94 on FIGURE 2*b* and will transfer this first character from Register 6 into the first position of the Memory Buffer Register 96, FIGURE 2*c*. When s.s. 3 times out, a signal will be sent to AND's 1006 and 1008 in the right hand lower section of the diagram. The "current-end" flip-flop 1010 was initially set to the right hand side. Therefore, a signal on line 1012 will condition the other input of AND 1008. The output of 1008 through OR 1013 will turn on s.s. 4 times out, a signal to turn on s.s. 5 will be generated as follows. There is no signal from OR 1014 (shown on the left hand side of FIGURE 2*d*) since the Memory Buffer Register is not sitting at the 5th or 8th position. Note that if the MBR had been sitting at the 5th position, a signal on line 127 would have conditioned one input of OR 1014. If the MBR had been sitting on the 8th position, a signal on line 128 would have conditioned one input of OR 1014. With no input signal to Inverter 1016, a signal from that inverter will condition one input of AND 1018. The other input of AND 1018 wil be conditioned by the signal on line 114 when s.s. 4 times out. The signal from AND 1018 through OR 1020 will condition one input of AND 1022. The other input of AND 1022 will be conditioned by a signal from Inverter 1024, the operation of which will be fully described later. The output of AND 1022 on line 108 will turn on s.s. 5. The signal on line 124 from s.s. 5 will advance the Output Control Ring 11, FIGURE 2*a* to the #2 position. It will also advance the Buffer Control Ring 102, FIGURE 2*c* to the #2 position. This same signal on line 124 will also reset Register 6. When s.s. 5 times out, a signal on line 126 is routed through OR 42 to turn on s.s. 1. When s.s. 1 is on, the second character from the Input Buffer will be routed into Register 6 in a manner as previously described in connection with the first character. This sequence of CL–1–2–3–4–5 will continue for six cycles and result in the loading of ① A B C D E into the MBR. On the next cycle, during s.s. 1 time, the character ② will be loaded into the Register 6. Since Register 6 now contains a level indicator character, it will result in an output on line 1026 from the Level Compare Unit 56. The signal on this line through OR 60, will bump the Compare Counter 62 to its #2 position. When s.s. 1 times out, s.s. 2 will be turned on. When s.s. 2 times out, s.s. 6 will be turned on in the following manner. The output from Inverter 184, FIGURE 2*c* will condition one input to AND 188. Inverter 184 has no input signal since the MBR Control Ring is not in the first position. The MBR Control Ring is now at position #6. The other input of AND 188 is conditioned by the output from #2 position of the Compare Counter 62 on line 226. The signal from AND 188 on line 190 conditions one input to AND 192. The other input to AND 192 is conditioned by the CL–2 pulse from s.s. 2. The signal from AND 192 will set flip-flop 194 to the "1" side and flip-flops 84 and 232 to the "0" side. The output of flip-flop 194 on line 196 conditions one input of AND 198, FIGURE 2*d*. When s.s. 2 times out, the other input to AND 198 will be conditioned and result in a signal through OR 118 to turn on s.s. 6. The output of s.s. 6 on line 112, through OR 1028, Gate 1030, will route the "current" address from Unit 1032 (FIGURE 2*e*) through OR 517 into MAR 300. When s.s. 6 times out, a signal will be had to turn on s.s. 6a shown in the bottom center portion of the diagram. The output of s.s. 6a on line 1034 is routed to increment the Current Register by "1." The Current Register will now contain the Address 101. When s.s. 6a times out, it will turn on s.s. 6b. This will initiate a 3–D memory cycle, during which time the contents of the MBR will be stored in a 3–D memory at the address specified in MAR 300. The "have-used" memory pulse will count down the Level Ring. Note here also that during the 3–D memory cycle, the Level Identifier, in this example ①, was stored in the #4 plane. The Level Ring will now be at its #3 position. The "have-used" memory pulse will also reset the MBR to nulls, reset the MBR Ring to its first position and turn off flip-flop 1036 which was turned on by the pulse from s.s. 6b. The signal from flip-flop 1036 through DIF 1038, will turn on s.s. 6c. It is the pulse from DIF 1038 which resets the MBR and the MBR Control Ring. During 6c time, we will check to see if the address in the "current" Register 1032 is equal to the address in the "end" Register 1040. Since, in our example, we have advanced the "current" Register to 101 and we specified the contents of the "end'" Register as 101, we will get an indication that the next address used will be the last one in the currently available list. The signal from s.s. 6c on line 1042 is routed to AND 1044. The other input to AND 1044 is the signal from the "current-end" Compare Unit 1046. This will result in the "current-end" flip-flop 1010 being set to the left hand side. We now have a signal on line 1046 from flip-flop 1010. This will condition one input of AND 1006 shown at the bottom of the diagram. Flip-flip 1001 at the bottom of the diagram was originally set to its "0" side. When s.s. 6c times out, a signal through AND 1048 on line 1050, through OR 1052, will turn on s.s. 7. Since the Level Ring 58 is at position 3, our next purpose is to take a 2–D memory cycle and store an indication in the #3 plane at Address 100. The pulse from s.s. 7 is routed to AND 156. Since the Level Ring is not at the "0" position, the output of Inverter 150 will condition the other input of AND 156. This will set flip-flop 160 to the left hand side and flip-flops 176 and 204 to the right hand side. The output of flip-flop 160 on line 162 will condition one input of AND 164 so that when s.s. 7 times out, s.s. 8 will be turned on. During CL–8 time, a 2–D memory cycle will store a bit in the #3 level plane. The "have-used" memory pulse, at the end of the memory cycle, will count down the Level Ring to its #2 position. We will now turn on s.s. 7. Since the Level Ring is not at its "0" position, we will go back to CL–8 cycle. The oscillation between CL–7 and CL–8 will continue inserting level bits in the proper planes and reducing the count in the Level Ring until it reaches "0." When the count reaches "0," we will go from the CL–7 position to the CL–9 position since the Compare Counter is on its #2 position. When the Level Ring reaches its "0" position, one input to AND 200, FIGURE 2*b* is conditioned. The other input to AND 200 is conditioned by the signal on line 266 from the #2 position of the Compare Counter. The output of AND 200 conditions one input of AND 202 so that the CL–7 signal will go through to set flip-flop 204 to its "1" side and flip-flops 160 and 176 to the "0" side. The signal from flip-flop 204 on line 206 will condition one input of AND 208, FIGURE 2*d*. Now, when s.s. 7 times out, the signal from AND 208, OR 210 will turn on s.s. 9. During CL–9 time, the Compare Counter will be reset to "0," the Level Ring will be set to "0," the "compare" flip-flop 64 will be set to "0." When s.s. 9 times out, s.s. 10 will be turned on. During Clock 10 time, the character in the Register 6 which is a ② will again be routed to the Level Compare circuit 56. The output from the Level Compare on line 1026 through OR 60 will bump the Compare Counter 62 to its #1 position. Since a "compare" flip-flop was set to "0," the signal on line 26 through Gate 68 will set the Level Ring to its #2 position. When s.s. 10 times out, s.s. 11 will be turned on. During CL–11 time, the "compare" flip-flop 64 will be set to its left hand side since the Compare Counter contains a "1." When s.s. 11 times out, the signal through OR 90 will turn on s.s. 3. During CL–3 time, the character in Register 6 which is a ② will be routed to the first position of the MBR. Also, the address in the Current Register 1032, which is 101, will be routed to MAR 300. Now, since the "current-end" flip-flop 1010 is set to a "1," we wish to turn on s.s. 3a. The signal on line 1046 from flip-flop 1010 will condition one input to AND 1006, the bottom of the diagram. The signal when s.s. 3 times out, through AND 1006 will turn on s.s. 3a. During 3a time, we will gate the new availability addresses into the Current and End Registers 1032 and 1040. The signal on line 1054 from s.s. 3a is routed to gates 1056 and 1058 at the top of the diagram. These gates route the information from the Availability List into the Current Register 1032 and the End Register 1040. The signal on line 1054 will also set flip-flop 1010, the "current-end" flip-flop, to the right hand side. This same signal will also set flip-flop 1000 to the left hand, or "1" side. When s.s. 3a times out, s.s. 3b will be turned on. The signal on line 1060 from s.s. 3b will gate a "link" character from Unit 1062 through gate 1064 into the 6th position of the MBR. When s.s. 3b times out, it will turn on s.s. 3c. During CL–3c time, we will gate the address in the Current Register to the 7th and 8th position of the MBR. The signal on line 1066 will condition gates 1068 and 1070 to accomplish this. When s.s. 3c times out, it will turn on s.s. 4, through OR 1014. Since the MBR Ring is at the #2 position, we will go to CL–5 when s.s. 4 times out. During CL–5 time, we will advance the Output Ring to its next position and advance the MBR Ring to its #2 position. The Output Ring is now at its #8 position. Register 6 will be reset and when s.s. 1 times out, we will turn on s.s. 2. During s.s. 2, we will gate the F which is in the #2 position of the Input Register into Register 6. Since the Compare Counter is on its #1 position, we will turn on s.s. 3 when s.s. 2 times out. During CL–3 time, the F will be routed from Register 6 into the second position of the MBR. When s.s. 3 times out, we will turn on s.s. 4. When s.s. 4 times out, we will advance to s.s. 5 since the MBR is not on the 5th or 8th position. During CL–5 time, we will advance the Output Control Ring to its #9 position and the MBR to its #3 position. When s.s. 5 times out, we will turn on s.s. 1. During CL–1 time, the G in the #9 position of the input will be set into Register 6. When s.s. 1 times out, we will turn on s.s.2. The CL–2 pulse will again subtract 1 from the Input Buffer Counter which will now be set at 0. When s.s. 2 times out, we will turn on s.s. 3 since the Compare Counter 62 contains a 1. During CL–3 time, the G will be routed from Register 6 into the 3rd position of MBR. When s.s. 3 times out, we will turn on s.s. 4. When the input machine had sent the last character of the current string into the Input Buffer Register, a signal was put on the "blank input" line 218, FIGURE 2*d*. This condition to one input of AND 1066 is shown on the insert of FIGURE 2*c*. When the Input Counter was reduced to "0," the signal from AND 240, the bottom left hand corner of FIGURE 2*d*, on line 1068 conditions the other input of AND 1066. The output of AND 1066 conditions one input of AND's 1070 and 1072. Note here that during the last CL–3a cycle, flip-flop 1000 was set to the "1" side. The output of this flip-flop on line 1074 conditions the second input of AND 1070. Now, when s.s. 4 times out, the signal on line 114 will condition the 3rd input of AND 1070. The output of AND 1070 on line 1076, OR 1078 will produce a signal on line 1080 to turn on s.s. 6d. During clock time 6d, the machine word ② F G ₦ ₦ the "link" character (Γ) and the link-to-address will be stored in the memory position 101. An occurrence mark will also be stored in the #2 level plane at Address 101. When 6d turns on, flip-flop 1076 will be set to a "1." The "have-used" memory pulse at the end of the memory cycle will step down the Level Ring 58, FIGURE 2*b*, to its #1 position. It will also set flip-flop 1076 back to the right hand side. This will produce a signal through DIF 1078 to turn on s.s. 6e. The output of DIF 1078 through OR 1080 will also reset the MBR to nulls and the MBR Control Ring to its #1 position. During CL–6e time, a 2–D memory cycle will be initiated during which time a mark will be put in the Forward Discontinuity Plane, FIGURE 2*h*, at Address 101. This is a "forward discontinuity" bit and indicates that the rest of the record is located at an address not immediately following the present address. The 2–D memory signal is initiated by the signal on line 1082 from s.s. 6e through OR 1084, line 1086, OR 142, FIGURE 2*c* to the Memory Control. This signal also sets flip-flop 1088 to the left hand side. The signal on line 1082 through gates 1090 and 1092 at the top right side of the diagram, enables the machine to write the mark in the Forward Discontinuity Plane. At the end of the memory cycle, the "have-used" memory pulse resets flip-flop 1088 back to the right hand side and through DIF 1094, produces a signal to turn on s.s. 6f. During 6f time, flip-flop 1000 is set back to its "0" side to indicate that the current address is no longer equal to the "End" Address. Flip-flop 1001 is set to the left hand or "1" side to indicate that a discontinuity has been encountered. The signal from s.s. 6f on line 1096 is routed to the right hand side of flip-flop 1000 and to the left hand side of 1001. When s.s. 6f times out, the signal on line 1098, OR 1052 will turn on s.s. 7. The purpose of going to CL–7 and 8 is to complete the writing in the level planes at Address 101. The Level Ring is now set to its #1 position. When s.s. 7 times out, a signal through AND 164 will turn on s.s. 8. The circuit for the signal from AND 164 has been previously described. During CL–8 time, a 2–D memory cycle will be performed in which a bit will be stored in the #1 Level Plane at Address 101. The "have-used" memory pulse will count down the Level Ring to its "0" position. After CL–8 time, s.s. 7 will be turned on. Since the Level Ring is now at its "0" position, the Compare Counter is at "1," the blank input line 218 is up, flip-flop 1001 is set to a "1," we wish to skip to the next Current Address at which position we will write the current record and insert a Reverse Discontinuity bit in the proper plane. AND 1100 will have one of its inputs conditioned when s.s. 7 times out. Another of its inputs is conditioned by the signal on line 1102 which is the output from the "1" side of flip-flop 1001. The third input of AND 1100 is conditioned by the output from the "1" side of flip-flop 176. This flip-flop was set to the left hand side during CL–7 time because the Level Ring was in the "0" position and the Compare Counter did not contain a value of 2. The output of AND 1100, FIGURE 2*d*, will condition one input of AND 1104, the other input of which is conditioned by the "blank input" signal on line 218. The output of AND 1104, OR 1003, line 1002, OR 42, will turn on s.s. 1. During CL–1 time, the character will be loaded from the Input Buffer Register since the "blank input" line is up indicating that there is no more information available from the input device, a null character will be routed from the Input Register to Register 6. When s.s. 1 times out, s.s. 2 is turned on. Since the compare counter is sitting in its #1 position, s.s. 3 will be turned on when s.s. 2 times out. During CL–3 time, the null character in register 6 will be routed to the first position of the MBR. Since the Current Address is now 600 and the End address is 601, the current-end flip-flop 1010 is still set to the "0" side. Therefore, when s.s. 3 times out, s.s. 4 will be turned on. The following condition still exists. Blank Input line 218 is up, Input Counter equals "0," flip-flop 1000 is equal to "0." When s.s. 4 times out under these conditions, it will turn on s.s. 6 in the following manner. AND 1066 is applying a signal to AND 1070 and 1072 shown on FIGURE 2*c*. The inputs to AND 1066 are the "blank input" signal and the Input Control equals "0" signal previously described. The signal from flip-flop 1000 on line 1106 will supply a signal to the second input of AND 1072. When s.s. 4 times out, the third input of AND 1072 will be conditioned. This will supply a signal through OR 1108, line 1110, OR 118 to turn on s.s. 6. We are now preparing to write a record into the 3–D memory at address 600, the "current address" from the new Availability List. During CL–6 time, the address in the Current Address Register 1032 will be routed through gate 1030 into MAR 300 as previously described. When s.s. 6a times out, s.s. 6b will be turned on. During 6b time, a 3–D memory cycle will write nulls from MBR into Address 600 of the memory. Flip-flop 1036 will be set to the left hand side at 6b time. The "have-used" memory pulse will set flip-flop 1036 back to the right hand side, produces a signal through DIF 1038 and turn on s.s. 6c. It should be mentioned here that during 6a time, the Current Address Register 1032 was incremented "1" so that it now contains the Address 601. Now, during 6c time, a signal will be ANDed at 1044 from the "current-end" Compare Unit 1046 to set flip-flop 1010, the "current-end" flip-flop to the left hand side. Flip-flop 1001, in the lower portion of the diagram, is now set to the left hand side. This is holding one input to AND 1112 conditioned. Now when s.s. 6c times out, the signal through AND 1112 will turn on s.s. 6g. The signal on line 1114, from s.s. 6g, will condition gates 1116 and 1118 so that during the 2–D memory signal, a bit will be written into the Reverse Discontinuity Plane at Address 600. The signal on line 1114, from s.s. 6g, will also set flip-flop 116 to the left hand side. The "have-used" memory pulse at the end of the 2–D memory cycle will set flip-flop 1116 back to the right hand side and through DIF 1118 and turn on s.s. 6h. The signal on line 1120 from s.s. 6h is routed over to set flip-flop 1001 to the "0" side. When s.s. 6h times out, a signal through OR 1052 will turn on s.s. 7. Since flip-flop 1001 is now set to the right hand side, s.s. 7 will time out, turn on flip-flop 38 through AND 180 as previously described and the machine will stay in this condition until the input device supplies 8 additional characters at which time a signal on line 32 from the input counter, through OR 34 to AND 36 will cause a signal from DIF 40 to again start the machine at CL–1. Three AND circuits 1122, 1124, and 1126, are shown on FIGURE 2*c*, the purposes of which are as follows. When s.s. 4 times out, one input to AND circuits 1112, 1124 and 1126 is conditioned. If flip-flop 1000 is set to the right hand side, indicating that a discontinuity has not been encountered, the second input of AND 1122 is conditioned. If the Memory Buffer Ring is on the #5 position, we should continue filling the MBR with characters prior to taking a 3–D memory cycle. The signal from MBR on line 127 will allow the signal on line 114 through AND 1122, OR 1020, to condition one input of AND 1022. If the Blank Input or the input counter equals "0," a signal is not present, the other input to AND 1022 will be conditioned and the pulse on line 108 will turn on s.s. 5 during which time the circuitry will be conditioned to read the next character from the Input Register into the proper position of the MBR Ring. If flip-flop 1000 is set to the "1" side, indicating that a discontinuity has been encountered, AND circuit 1124 will supply a signal through OR 1078, line 1080, to turn on s.s. 6d. Under these conditions, the 5 data characters plus the link symbol and the characters of the link address would be written into the Main Memory at the address specified by MAR 300. When 8 characters have been written into MBR, the signal is supplied from the MBR, line 128, to condition one input of AND 1126. This condition would indicate during CL–4 time, that the MBR is full and that this record should be written into the 3–D memory at the address specified by MAR 300. When s.s. 4 times out, under these conditions, a signal from AND 1126, OR 1108, line 1110, OR 118 will turn on s.s. 6 and result in a 3–D memory signal to provide for the storing of the information just described.

TABLE IV.—TIMING SEQUENCE FOR INSERT OPERATION

Initially:
- Load extent addresses from Availability List into Registers 1032 and 1040.
- Load extent addresses of "insert" data string into Registers 1764 and 1780.
- Load extent addresses of data string into which the "insert" is to be placed into Registers 764 and 780.
- Provide "insert" signal to the input of the Decoder in the center right hand portion of FIGURE 2*q*.

CL–50:
- Decrement 780
- Go to CL–51

CL–51:
- Load "current" and "end" Registers of Availability List
- Set F.F. 1010 to "0"
- Go to CL–52

CL–52:
- Gate 780 to 300
- Go to CL–53

CL–53:
- Increment 780
- Go to CL–54

CL–54:
- Initiate 3D memory read cycle, 6th char. position to compare if 6th character is null→CL–55
- If not a null→CL–76.

CL–55:
Insert link char. in 6th char. position of 96 and insert "current" address of avail. in 7th and 8th, if F.F. 2006 is zero, or, insert 780 in 7th and 8th if F.F. 2006 is one.
Set F.F. 1011 (FIGURE 2*e*) to "one."
Go to CL–55a.
CL–55a:
Gate MBR pos. 1 to 56 and OR input with 66 to open gate 68 to Ring 58.→CL–56.
CL–56:
Initiate 3D
Store MBR at Address in 300
If level zero on→CL–57.
If level zero off→CL–56a.
CL–56a:
Initiate 2D memory cycle. The "have-used memory" pulse counts down the Level Ring. Fall 56a and level zero off→CL–65a. Fall 56a and level zero on→CL–57.
CL–57:
Initiate 2D memory cycle
Mark FD plane at Address in 300. (→CL–58 if F.F. 2006 is zero). If F.F. 2006 is one,→CL–74.
CL–58:
Gate 1764 to 300. If F.F. 1003 is zero→CL–59
If F.F. 1003 is "one,"→CL–77
CL–59:
Initiate a read 3D memory cycle whose address is contents of 300
Go to CL–60
CL–60:
Increment 1764
During CL–60:
Compare 1764 with 1780 and set Latch 2006 to "1" if equal.
Go to CL–61
CL–61:
Gate "current" to 300
If F.F. 2006 is a "1," check 6th char. of MBR
If=null→CL–55
If ≢null→CL–76
If F.F. 2006 is a zero, →CL–62
CL–62:
Gate MBR Pos. 1 to 56 and OR input with 66 to open gate 68 to ring 58→CL–63
CL–63:
Store MBR at address contained in "current" Reg. of Avail. List
If F.F. 1011 is a "one"→CL–64
If F.F. 1011 is a "zero"→CL–66
CL–64:
Initiate 2D memory cycle
Store mark in RD plane at Address in 300
Reset F.F. 1011. Fall 64 and level zero off→CL–65. Fall 64 and level zero on→CL–66
CL–65:
Initiate 2D memory cycle
The "have-used memory" pulse counts down the Level Ring
Fall 65 and level zero off→CL–65. Fall 65 and level zero on→CL–66
CL–66:
Increment "Current Register"
If F.F. 2006 is one, go to CL–78
If F.F. 2006 is zero, go to CL–67
CL–67:
Compare "current" and "end"
If not equal→CL–58
If equal, →CL–68
CL–68:
Gate "current" to 764
Go to CL–69
CL–69:
Gate new numbers into "current" and "end"
Reset "current-end" latch to zero
Go to CL–70
CL–70:
Gate 1764 to 300
Go to CL–71
CL–71:
Initiate read 3D memory cycle whose address is contents of 300
Go to CL–72
CL–72:
Increment 1764
Go to CL–73
CL–73:
Gate 764 to 300
Fall 73 check for null is char. 6 of MBR
If null→55
If not null→76
CL–74:
Gate 780 to 300
Go to CL–75
CL–75:
Initiate 2D memory cycle. Mark RD Plane at Address in 300 Reset F.F. 2006
Reset F.F. 1011 to "0"
Insert Complete
CL–76:
If F.F. 2006 is zero
Gate chars. 6, 7, and 8 to Data Register (new)
Set F.F. 1003 to "1"→CL–55
If F.F. 2006 is one→CL–62
CL–77:
Gate new Data Register to MBR 1, 2, 3
Reset F.F. 1003
Go to CL–61
CL–78:
Gate "current" to 300
Go to CL–55

*Insert operation*

Assume that the "beginning" and "end" addresses in memory of the string to be inserted are located in Registers 1764 and 1780. These addresses will have been provided by the program.

When s.s. 29 times out, which is the last cycle of the normal search procedure which provides the exend address of the data string into which the insert is to be placed, the signal on line 3060 conditions one input to AND's 3064 and 3066. Since we are doing an "Insert" instruction, F.F. 3068 will be set to the left hand side by the "Insert" instruction and will be holding the second input to AND 3064 conditioned. A signal from AND 3064, line 3070 will turn on s.s. 50.

The CL–50 signal will decrement Register 780. Register 780 will now contain the address of the word in memory into which will be inserted the "link to" Address of the data to be inserted.

When s.s. 50 times out, it will turn on s.s. 51. The CL–51 signal, through OR 3008, line 3072, OR 3074 will set f.f. 1010 to the right hand side and condition gates 1056 and 1058. This will doad the "Current" and "End" Registers 1032 and 1040 from the "Availability List."

When s.s. 51 times out, it will turn on s.s. 52. The CL–52 signal, through OR 3010, line 3076 will condition gate 2088 to route the address from Register 780 into MAR 300.

When s.s. 52 times out, it will turn on s.s. 53. The CL–53 signal will increment Register 780. When s.s. 53 times out, it will turn on s.s. 54.

The CL–54 signal through OR 3078, line 3080 will initiate a 3D memory read cycle, and store the contents of that address specified by Register 300 into MBR 96. This is the data into which we will store the "link to address" of the data we are going to insert. When s.s. 54 times out, a check is made of the 6th character in MBR 96 to see if it is a null character or not. If it is a null character, it means that there is sufficient space in the record in MBR (Characters 6, 7, 8 are all null if character 6 is null) to store the link symbol (Character 6) and the "link to" address (Characters 7, 8). If character 6 is not null, that character and any "not null" characters following will be "remembered" in the New Data Register 3113 and written into the first record at the "linked to" Address.

Note here that the 6th character of MBR 96 is routed into Compare Unit 3082. A null character is routed from Unit 3084 into Unit 3082.

Assume first that character 6 is a null character. Therefore, a signal on line 3086 will condition AND 2042 and Inverter 2040, the output of which will decondition AND 3088. When s.s. 54 times out, a signal through OR 3000, AND 2042, OR 3018 will turn on s.s. 55.

If the 6th character of MBR 96 had not been a null character, there would have been no signal on line 3086, AND 2042 and Inverter 2040 would not have been conditioned. Therefore, the output of I.2040 would be holding one input of AND 3088 conditioned. Under these conditions, the signal through OR 3000, when s.s. 54 times out, would have propagated through AND 3088, line 3090 and turned on s.s. 76. The action of s.s. 76 and subsequent events will be fully described later.

Take now the condition when character 6 of MBR 96 is a "null." The CL–55 signal through OR 1061 will condition gate 1064 and route a link character from Unit 1062 into the 6th position of MBR.

Since this is the first CL–55 signal for this operation, the "Insert Done" F.F. indication will be zero. Note: Even if the "string" to be inserted is only one word long, the addresses in 1764 and 1780 would be say 146–147. (Not equal.)

CL–55 conditions one input to both AND's 2008 and 2010. Since F.F. 2006, the "Insert Done" F.F., is set to "0," the CL–55 signal will propagate through AND 2008, line 3190, OR 1067 to condition gates 1068 and 1070. This will route the Current X and Y Addresses through OR's 2012 and 2014 to the 7th and 8th positions of MBR 96. Also, the CL–55 signal will set F.F. 1011 to "1." When s.s. 55 times out, it will turn on s.s. 55a.

The CL–55a through OR 4066, lines 4068, 4070 will condition OR 4072 and gate 2048 respectively to route position 1 of MRB 96 through gate 2048, OR 2020 into Level Compare 56 and from Level Compare 56 through gate 68 into Level Ring 58. When s.s. 55a times out, it turns on s.s. 56.

The CL–56 signal, through OR 3118 will initiate a 3D memory write cycle during which time the record in MBR 96 will be stored at the address specified by MAR 300. The record at that address will now contain a link character in position 6 and a "link to " address in positions 7 and 8.

When s.s. 56 times out, the signal on line 4064, OR 1080, line 4072, will reset MBR 96 to nulls and reset the MBR Control Ring 102. It will also condition AND's 4076 and 4078. If the Level Ring is in the zero position, a signal on line 3125 will condition AND 4078. The signal from AND 4078, line 4080, OR 4082, line 4083 will turn on s.s. 57. If the Level Ring is not in the zero position, a signal from Inverter 3126, line 4074 will condition AND 4076. The signal from AND 4076, line 4084, OR 4086, line 4088 will turn on s.s. 56a. The CL–56a signal through OR 142 will initiate a 2D memory write cycle to store a bit in a level plane designated by the bit position in the Level Ring 58 at the address specified by the address in MAR 300. The "have used memory" pulse will count down the Level Ring. When s.s. 56a times out, the signal on line 4090 will condition one input each of AND's 4092 and 4094. If it is required to write a bit in an additional Level Plane, a signal from Inverter 3126, line 4074 will be conditioning one input to AND 4092. The output of AND 4092, line 4096, OR 4086, line 4088 will turn on s.s. 56a. This action is required to write bits in additional level planes. When all required level planes have been written (Level Ring 58 reduced down to 0) a signal on line 3125 will condition AND 4094. The signal on line 4090 (when s.s. 56a times out) will now get through AND 4094, line 4098, OR 4082, line 4083, will turn on s.s. 57.

CL–57 will cause a 2D memory write cycle which will store a mark in the FD Plane at the address specified by MAR 300. When s.s. 57 times out, a signal on line 3020 conditions AND's 2076 and 3002. Since F.F. 2006 is set to the "0" side, one input to AND 3002 is also conditioned. The signal thus received from AND 3002 on line 3090 through OR 3004 will turn on s.s. 58.

The CL–58 signal through OR 3012, line 3092 will condition gate 2090 which will route the address in Register 1764 into MAR 300. MAR 300 now contains the address of the 1st word of information to be inserted. F.F. 1003 is at "0" because s.s. 76 has not yet been energized. When s.s. 58 times out, the signal on line 3022 will condition on input each of AND's 3094 and 3096. Since F.F. 1003 is set to "0," one input to AND 3096 is being held conditioned. Therefore, a signal from AND 3096 will turn ON s.s. 59.

CL–59 will cause a 3D memory read cycle. The information thus read into the MBR will be the 1st word of the information to be inserted. When s.s. 59 times out, it turns on s.s. 60.

The CL–60 signal, through OR 3014, line 3098 increments Register 1764. If we assume that there is a single word to be inserted, the address in 1764 is now equal to the address in 1780. This will result in a signal from AND 2096 to set F.F. 2006 the "Insert Done" F.F. to a "1." When s.s. 60 times out, a signal through OR 3024 will turn on s.s. 61.

The CL–61 signal, through OR 1028 will condition gate 1030 and route the "Current" address into MAR 300. MAR 300 now contains the address at which the 1st word (in our case, we have only one word to insert) of the data to be inserted will be located. When s.s. 61 times out, a signal on the line 3026 will condition on input to AND's 2078 and 2080. Since "Insert Done" F.F. 2006 is set to "1," and 2078 will produce a signal on line 3100, OR 3000, AND 2042 (assume that the record to be inserted had less than 6 characters, therefore the 6th character is a null and such condition produces a signal on line 3086), OR 3018 to turn on s.s. 55.

During CL–55 a link character will be inserted into the 6th position of MBR 96 as previously described. Now, however, "Insert Done" F.F. 2006 is set to "1." The CL–55 signal will now pass through AND 2010, line 2011 to condition gates 2016 and 2018, which will route the address from 780 into the 7th and 8th positions of MBR 96. We are preparing to write the "inserted" information into the loop and the information just put into the 6th, 7th, and 8th positions will provide the link to the next address of the "old" string. When s.s. 55 times out, it will turn on s.s. 56.

CL–56 will cause a 3D memory write cycle and put this "new" information into the address specified by MAR 300. When s.s. 56 times out, it will turn on s.s. 57.

The CL–57 signal will cause a 2D memory cycle to mark the FD Plane at this address. Now "Insert Done" F.F. 2006 is set to "1." When s.s. 57 times out, the signal on line 3020 will pass through AND 2076, line 3102 to turn on s.s. 74.

The CL–74 signal through OR 3010, line 3076 will route the address from Unit 780 into MAR 300 as previously described in connection with CL–52. This address is the location of the word "linked to" by the "inserted" word and requires an R.D. mark at its address. When s.s. 74 times out, it turns on s.s. 75.

The CL-75 signal sets "Insert Done" F.F. 2006 to "0." The CL-75 signal, through OR 3006 causes a 2D memory cycle to place a mark in the RD Plane at the location specified by the address in MAR 300. CL-75 through OR 3006, line 3108, OR 2056, line 3104 provides for writing the bit in the RD Plane. CL-75 also sets F.F. 1011 and F.F. 2006 "Insert Done" to the "0" side. When s.s. 75 times out, an "Insert Completed" signal emerges on line 3040 to apparatus not shown.

Let us now consider the condition that the 6th character in MBR 96 is not a null character at the end of CL-54.

When s.s. 54 times out, the signal through OR 3000 will get through AND 3088. (No signal on line 3086 to I2040 so one input to AND 3088 is conditioned.) The signal from AND 3088, line 3090 turns on s.s. 76.

We are preparing to "remember" characters 6, 7 and 8 of MBR prior to loading a link character and "link to" address into MBR. Assume that "Insert Done" F.F. 2006 is set to "0."

CL-76 conditions one input to AND 2084. The other input to AND 2084 is conditioned because F.F. 2006 is set to "0." The signal from AND 2084 on line 3108 conditions Gate 2098, and also sets F.F. 1003 to "1" via line 3110. The 6th, 7th and 8th positions of MBR 96 will through gates 2098, be set into "New Data Register" 3113. When s.s. 76 times out, the signal on line 3042 conditions one input to AND 3112, the other input of which is conditioned from the "1" side of F.F. 1003. The signal from AND 3112, line 3115 OR 3018 will turn on s.s. 55.

CL-55 will insert the link character in the 6th position of MBR 96 and the "current" address of the Availability List into the 7th, and 8th positions of MBR 96 (F.F. 2006 is zero) as previously described.

F.F. 1011 will be set to "one" as previously described. When s.s. 55 times out, it will turn on s.s. 56.

During CL-56 time, a 3D memory write cycle will store the record which now contains the "link to" address as previously described. When s.s. 56 times out, it will turn on s.s. 57.

CL-57 marks the F.D. Plane as previously described. When s.s. 57 times out, it turns on s.s. 58 as previously described "Insert Done" F.F. 2006 is set to zero.

CL-58 gates the address from 1764 to MAR 300 as previously described (1764 contains the address of the starting point in Memory where the "data to be inserted" is located). When s.s. 58 times out, the signal on line 3022 goes through AND 3094 (F.F. 1003 was set to "1" during CL-76) line 3114 will turn on s.s. 77.

CL-77 will condition Gate 2097 and route the "new data" 3113 into the 1st three positions of MBR 96. (The "New Data Register" was previously loaded during CL-76.) CL-77 will also set F.F. 1003 to "0." When s.s. 77 times out, the signal on line 3044 OR 3024 will turn on s.s. 61.

CL-61 will route "Current" Address into MAR 300 as previously described. When s.s. 61 times out, the signal on line 3026 will pass through AND 2080 (F.F. 2006 is set to "0," so AND 2080 is being held conditioned) line 3116, OR 3118, line 3120 to turn on s.s. 62.

CL-62 will condition Gate 2048 and route the #1 position of MBR 96 into Level Compare Unit 56 and through OR 2022 open Gate 68 to set up the level ring 58. When s.s. 62 times out, it will turn on s.s. 63.

The CL-63 signal, through OR 3118 will cause a 3D memory write cycle and store 1 to 3 characters into the address specified by MAR 300. When s.s. 63 times out, the signal on line 3028 will get through AND 2070 (F.F. 1011 was set to "1" during CL-55), line 3121 to turn on s.s. 64.

The CL-64 signal, through OR 3006, line 3108, OR 142 will initiate a 2D memory cycle to restore a mark in the RD Plane and set F.F. 1011 to "0" as described with relation to CL-75. When s.s. 64 times out (assume level zero off, i.e., it is necessary to mark additional level planes at the address specified by MAR 300), the signal on line 3030 through OR will condition one input of AND's 3016 and 3124. Since level zero is off, there is no signal on line 3126 so AND 3016 is deconditioned and a signal from I 3126 is holding AND 3124 conditioned. The signal from AND 3124 will turn on s.s. 65.

The CL-65 signal through OR 142 will initiate a 2D memory write cycle to put a mark in a level plane (corresponding to the position of the bit in the Level Ring 58), at the address specified by MAR 300. The "have used memory" pulse, line 144, will count down the Level Ring one unit. When s.s. 65 times out, the signal on line 3030, OR 3122 will get through AND 3124 will again turn on s.s. 65. This action will repeat in CL-65 until all required level planes have been "marked." (An output on line 3126, the zero output of Level Ring 58, signals that all required level planes have been marked.) With a signal on line 3126 the signal on line 3032, when s.s. 65 times out through OR 3122 will get through AND 2016, OR 3062 to turn on s.s. 66.

Note here that if level zero had been on when s.s. 64 timed out, the signal on line 3030, OR 3122, AND 3016, OR 3062 would turn on s.s. 66, thus skipping s.s. 65.

The CL-66 signal, through OR 2024 will increment the Current Register 1032. When s.s. 66 times out, the signal on line 3034 will condition on input to AND's 2072, and 2074. Since F.F. 2006 is set to "0" (insertion not yet complete), AND 2074 is being held conditioned on one side and the resultant signal from AND 2074 on line 3128 will turn on s.s. 67.

Note here that if "Insert Done" F.F. 2006 is on "1" (insertion fully written) the signal when s.s. 66 timed out on line 3034 would have gotten through AND 2072 line 3130 to turn on s.s. 78. The action of s.s. 78 will be fully described later.

The CL-67 signal, OR 2026 will perform the comparison of "current-end" as previously described in relation with CL-6c. Assume now that the addresses in the "current" and "end" Registers, 1032 and 1040 respectively are not equal (there are addresses not yet used in the present list of "available addresses"). The signal from the "0" side of F.F. 1010 on line 1012 will hold one input to AND 2030 conditioned. When s.s. 67 times out, the signal on line 3036 will get through AND 2030, line 3132, OR 3004 to turn on s.s. 58.

The CL-58 signal will gate the address from Register 1764 to MAR 300 (address from which to retrieve a word of data to be inserted) as previously described. When s.s. 58 times out, the signal on line 3022 will get through AND 3096 (F.F. 1003 was set to the "0" side by CL-77) line 3134 to turn on s.s. 59.

The CL-59 signal through OR 3134, line 3136 will initiate a 3D memory read cycle as previously described. When s.s. 59 times out, it will turn on s.s. 60.

The CL-60 signal will increment 1764 and set F.F. 2006 to "1" (all words to be inserted have been inserted). This action has been previously described. When s.s. 60 times out, it will turn on s.s. 61. If we assume that the 6th character in MBR is a null character, the sequence of events will be Cl-55, 56, 57, 74, 75 as previously described.

Remember that CL-55 inserts a link character and a linking address into the 6th, 7th and 8th positions of MBR so that a "linkage" is established from this "inserted string of data" back to the original string of data.

If the 6th position of the MBR had not been a null it will be necessary to insert the link character and a "link to" address (address in 780) in the next available address as follows:

When s.s. 61 times out, if F.F. 2006 set to "1" and the 6th character of MBR $\neq$ null (last word of data to be inserted is 6-8 characters, see previous example of FIG- URE 7), the following occurs. The signal on line 3026 gets through AND 2078 (F.F. 2006 set to "1") line 3100, OR 3000, AND 3088, (no signal on line 3086 because 6th character in MBR is ≢ null, so output of I 2040 is holding one input to AND 3088 conditioned) line 3090 to turn on s.s. 76.

We have said that F.F. 2006 is set to "1." The CL–76 signal cannot get through AND 2084 to set the 6th, 7th and 8th characters from MBR into new Data Register 3113. When s.s. 76 times out, the signal on line 3042 gets through AND 2080, line 3134, OR 3118, 3120 to turn on s.s. 62.

The CL–62 signal will operate as before. When s.s. 62 times out, it will turn on s.s. 63. The CL–63 signal will operate as previously described. When s.s. 63 times out (F.F. 1011 was set to "0" on a previous CL–64 cycle), the signal on line 3028 AND 2068, line 3136, OR 3062 will turn on s.s. 66.

The CL–66 signal will increment the "current" Register 1032 as previously described. When s.s. 66 times out, the signal on line 3034, a AND 2072 (F.F. 2006="1") line 3130 to turn on s.s. 78.

The CL–78 signal through OR 1028 will gate the address in the Current Register 1032 to MAR 300 as described with reference to CL–61. When CL–78 times out, the signal on line 3046, OR 3018 will turn on s.s. 55.

The CL–55 signal will insert a link character into the 6th position of MBR and Register 780 in the 7th and 8th positions of MBR (F.F. 2006 set to "1") as previously described.

The sequence will then be CL–56, 57, 74, and 75 as previously described.

Now consider the case where the Current Register 1032 contains the same address as the "end" Register.

The CL–67 signal through OR 2026 will condition one input to AND 1044. Since "Current"="End" compare unit 1046 is holding the other input of AND 1044 conditioned. The output of AND 1044, line 3138 will set F.F. 1010 to "1." When s.s. 67 times out, the signal on line 3036 will get through AND 2028. (There is a signal on line 1046 because F.F. 1010 is set to "1.") The signal from AND 2028 on line 3140 will turn on s.s. 68.

The CL–68 signal will condition Gates 2032, and 2034, route the Current Address from the Current Register 1032 through gates 2032, 2034, OR's 2036, 2038 into "Begin" Register 764. When s.s. 68 times out, it will turn on s.s. 69.

The CL–69 signal through OR 3008 will perform the same function as CL–51 signal which has been previously described. When s.s. 69 times out, it turns on s.s. 70.

The CL–70 signal through OR 3012, line 3192 gates the address from Unit 1764 into MAR 300 as was described in relation with CL–58. When s.s. 70 times out, it turns on s.s. 71.

The CL–71 signal through OR 3134, line 3136 initiates a 3D memory cycle the same as was described in relation with CL–59 and others. When s.s. 71 times out, it turns on s.s. 72.

CL–72 is identical in function to CL–60, previously described. When s.s. 72 times out, it turns on s.s. 73.

The CL–73 signal conditions Gate 2086 and routes the address from register 764 into MAR 300 via OR 517. When s.s. 73 times out, the signal on line 3038, OR 3000 will pass through either AND 2042 or AND 3088 to turn on either s.s. 76 or s.s. 55 as previously described in conjunction with s.s. 54.

TABLE V.—TIMING SEQUENCE FOR SEARCH OPERATION

Starting conditions:
- These are set up by the instruction "Do Search"
- Load starting Address Register 516
- Load Level Identifier Register 528
- Load the Count Register 562
- Load Direction F.F. 580
- Reset "$\overline{\text{last}}$" or (not last) or "last" F.F. to "0" (726)
- Reset Counter 628 to −1
- Reset RPDS address to fixed address CL–21:
- Gate starting address to 300.
- Reset Discontinuity F.F. 3182 to 0
- Set "end of search" to F.F. to 0.
- Go to CL–21a

CL–21a:
- If a "search right" operation, a 2–D memory cycle is initiated to read a row of the FD Plane specified by the X portion of MAR 300 into Register 312
- If a "search left" operation, a 2–D memory cycle is initiated to read a row of the RD Plane specified by the X portion of MAR 300 into Register 312
- Go to 21b

CL–21b:
- Gate Register 312 into the lower register of Search Ring 614
- Go to CL–22

CL–22:
- Gate Identifier to Memory Level Controls. Initiates 2–D memory cycle. This reads a row of a Level Plane to 312. The "have used memory" pulse on 144′
- Go to CL–23

CL–23:
- Gate 312 to upper register of Search Ring 614
- Gate Y Starting Address to Register 634.
- Gate Count to Compare Register 638.
- Go to CL–24

CL–24:
- Gate contents of Register 634 to Decoder 648.
- Go to CL–25

CL–25:
- Search
- Go to CL–26

CL–26:
- In this Clock cycle, six tests are made for "compare" or "no compare" upon location of an identifier mark or discontinuity mark.
- In conjunction with the states of the overflow F.F. and the $\overline{\text{last}}$ or last F.F.

(1) If "compare" (1st cond) and EOS F.F. is on 0 (2nd cond) and the $\overline{\text{last}}$ or last F.F. is on $\overline{\text{last}}$ (3rd cond) a signal appears on the line labelled "request for new level identifier." In this case the Search Clock stops on the 6th Clock pulse.
(2) If "compare" (1st cond) and EOS F.F. is on 0 (2nd cond) and the $\overline{\text{last}}$ or last F.F. is on last, (3rd cond) go to CL–28.
(3) If "compare" and "end of search" F.F. is on 1, go to CL–29.
(4) If overflow, go to CL–27
(5) No comp., no overflow, no Disc. Go to CL–24.
(6) No comp., no overflow, Disc. Go to CL–30.

CL–27: Increment or decrement Starting Address. Go to CL–21.

CL–28:
- Gate 34 to "begin" or "end" Register.
- Set EOS flip-flop to 1. Set counter to 1. Go to CL–24.

CL–29:
- Gate 34 to "begin" or "end" Register. The pulse from this number 29 single shot when it gives off is used to indicate the "search completed."

CL–30: Gates 634 to 516. Go to CL–30a.

CL–30a: 516 to 300. Go to CL–31.

CL–31:
- Initiate 3–D Memory cycle (read).
- If "right" search, go to 32.
- If "left" search, go to 37.

CL–32:
- Gate MBR chars. 7 and 8 to 516.
- Go to CL–33

CL–33: Gate 300 to MBR chars 1, 2.
CL–34: Increment RPDS Address.
CL–35: Gate RPDS Address to 300.
CL–36:
Initiate 3–D write memory cycle with address in 300. Go to CL–21.
CL–37: Gates RPDS Address to 300.
CL–38: Initiate 3–D read memory cycle.
CL–39: Gate MBR char. 1, 2 to 516.
CL–40: Decrement RPDS Address. Go to CL–21.

*Search Operation*

The Search operation is initiated by a "do search" instruction from the program. The initiating pulse is applied to line 510 which, through OR 512 will turn on s.s 21. In addition to starting the Clock, the "do search" instruction sets the starting conditions as stated previously.

The CL–21 signal through OR 3156 will condition AND 518. This will route the address contained in starting Address Register 516 through AND 518, OR 517 into MAR 300. The CI–21 signal also sets the "end of search" F.F. 724 to "0." When s.s. 21 times out, it will turn on s.s. 21a.

The CL–21a signal conditions one input to each of AND's 2060 and 2064. Assume first a "search right" instruction. F.F. 580 wil be set to the "0" side as a result of the instruction and a signal on line 760 will be holding AND 2060 conditioned. The output of AND 2060 line 3158, OR 2058, line 3106 to condition Gates 1090, 1091, 1092, and 538 in order to read a row (selected by the x portion of MAR 300) of information from the FD Plane into Register 312. When s.s. 21a times out, it turns on s.s. 21b.

The CL–21b signal conditions gate 3162 and routes the information from Register 312 into the lower register of Search Ring 614. When s.s. 21b times out, the signal on line 3164 will turn on s.s. 22.

The CL–22 signal to AND 526 wil read a Level Identifier from 528 through Decoder 529, OR's 532, lines 533 to Memory controls. This will cause a 2–D memory read cycle of the proper Level Plane. The row which is read will be controlled by the x portion of the address in MAR 300 (starting address). The information contained in the selected row of the selected Level Plane will be read into Register 312.

The way in which the memory is addressed is as follows. The X address is decoded by the Decoders 914 applied via the gate 934 to an 8X16 array of full select core drivers similar to 548 and 549 designated by the reference character 936. As explained previously, this is conventional circuitry which is used in many core memories of this type. In this manner, any one X driver will be selected, as shown in the diagram, extends through one of the planes of the 2D memory. As explained before, which plane is selected is determined by which one of the gates such as 922, 924 or 926 is enabled by the active line 533 to read out of a row of bits from the level plane selected by the identifier in Register 528 and this row of 128 bits is read into the Register 312. Gate 538 will be energized by the Memory Clock during the "read" portion of the 2–D memory cycle. When the "have used memory" pulse appears on line 144, it will trip s.s. 23.

The CL–23 signal will condition gate 314 and route the information from Register 312 into the upper register of Search Ring 614. The CL–23 signal will also condition gate 550 to route the Y portion of the "starting address" from MAR 300 via cable 558 into Register 634. The CL–23 signal will also condition gate 518 to route the "count" from Count Register 562 into Compare Unit 638. When s.s. 23 times out, the signal on line 564, OR 566 will turn on s.s. 24.

The CL–24 signal will condition AND 570 and through OR 752 will condition AND's 644 to route the information from Register 634 via AND's 644, lines 646, AND 570 to decoder 648. When s.s. 24 times out, it will turn on s.s. 25.

The CL–25 signal will condition AND's 576 and 578. Since we are doing a "search right" operation, F.F. 580 is set to "0" and is holding on input to AND 576 conditioned. The output of AND 576 will condition one input each of AND's 583, and 721. Assume that over flow FF. 582 is set to "1." One input to AND 583 is conditioned by the signal from the "1" side of F.F. 582. The signal from AND 583, line 584 is applied to Decoder 648. The Direction F.F. 580 will operate in conjunction with the Search Ring 614 as fully described in said copending application, Serial No. 282,807 to start the search to the right (line such as 618) at the Y address which is in the Decoder 648. The search will continue in the Search Ring 614 for a Level Identifier such as specified by Register 528. If one is encountered, a signal will be sent on line 626 which will increment Counter 628 one count. If the number now in counter 628 is not equal to the count in Register 638, a signal on line 586 will set compare F.F. 588 to "0." If the counts in 628 and 638 are equal, a signal on line 640 will set compare F.F. 588 to "1."

Assume no compare, F.F. 588 is set to "0." The "overflow" F.F. 582 will stay at "1." When s.s. 25 times out, it will turn on s.s. 26.

During CL–26, six tests, as specified in Clock Sequence Table III are made. Only one of these tests will be satisfied.

The CL–26 signal will propagate through AND 594 since Overflow F.F. 582 is set to "1." It will also propagate through AND 768 because Compare F.F. 588 is set to "0," but AND 770 is deconditioned. The signal from AND 594 can get through AND 592 because F.F. 588 is set to "0." The signal on line 504 conditions AND's 3178 and 3180, AND 3178 since Discontinuity F.F. 3182 is "0" line 2004 to set F.F. 596 to "1" and F.F.'s 598, 700, 702, 704, and 3184 to "0's" through their corresponding OR's. When s.s. 26 times out, the signal on line 3058 will propagate through AND 706 (F.F. 596 is set to "1") line 708, OR 566 to turn on s.s. 24.

It should be noted that in a previous Search operation the particular position in which the Level Identifier is encountered will be transmitted to the Encoder 630 and encoded into an address which is placed in Register 634.

CL–24, 25 and 26 will continue until the contents of Counter 628 (incremented each time a bit is found in Search Ring 614 during CL–25 time) equals the contents of Register 638 or an overflow condition is reached (all level bits in search ring 614 have been counted into Counter 628 and the number is not yet equal to Register 638.) If an over flow condition is reached, the CL–25 signal will emerge from Search Ring 614 on line 710 and through OR 580 will set overflow F.F. 582 to "0."

The CL–26 signal through AND 714, line 506 will set F.F. 702 to "1" and F.F. 598, 700, 596, 704, and 3184 to "0." When s.s. 26 times out, a signal on line 3058, AND 716 will turn on s.s. 27.

The CL–27 signal through AND 720 (a "search right" operation is being performed; so the output from the "0" side of F.F. 580 on line 760 is holding one input of AND 720 conditioned) will increment Starting Address Register 516. When s.s. 27 times out, the signal on line 3186, OR 512 will turn on s.s. 21.

The sequence CL–21, 22, 23, 24, 25 will proceed as before, this time with a new row of bits from the Level and Discontinuity Planes.

Note here that since overflow F.F. 582 is set to "0," the CL–25 signal through AND 576, AND 3188, line 722 will start the search at the left end of Search Ring 614 instead of at a position determined by Decoder 648 as was done previously.

Assume that a CL–25 signal finds a level identifier position and produces a pulse on line 626 to add into Counter 628. Also assume the contents of Counter 628 are equal to the contents of Register 638. A signal will now be had on line 640 to set F.F. 588 to the "compare" F.F. to "1."

The CL–26 test which can now succeed will be between the "compare" F.F. 588, end of search F.F. 724 and the "not last or last" F.F. 726. If F.F. 726 is set to "0," it means the search just completed is not the last identifier in the string and a signal must be provided to ask the program for the next level identifier to be searched and its count or place in the data string relative to the last search. This is done as follows:

F.F. 726 and F.F. 724 set to "0." The signal from AND 730, line 732 conditions one input to AND 734. The CL–26 signal through AND 736 (F.F. 588 set to "1") line 742 will condition the other input to AND 734. The signal from AND 734, line 508, will set F.F. 704 to "1" the others to "0."

Now, when s.s. 26 goes off, the signal on line 3058 will get through AND 738, line 740 to request a new level identifier.

*Last identifier in a string*

The flip-flop 726 in this case is set to "1" by the initial conditions which are set up by the "do search" instruction. The search as done by Clock Pulse CL–25 is the same as previously described, but there will be new conditions to test for during Clock Pulse CL–26. If it be assumed that the Counter 628 agrees with the Compare Unit 638 as a result of the application of a CL–25 Clock Pulse, then the condition to be tested for by the CL–26 is that of a "compare," the "EOS" F.F. 724 on "0" and the F.F. 726 on "1." The test that succeeds in this case is the output of AND circuit 736, one input to which, is line 590 and the other input to which is the "compare" F.F. 588 which is on "1." The output of AND circuit 736 extends via wire 742 to AND circuit 744. The other input to AND circuit 744 comes from AND circuit 746 which is satisfied by the F.F. 726 being on "1" and F.F. 724 being on "0." An output will thus exist on line 500 which extends to the F.F. 598 to set it to a "1" and at the same time set F.F.'s 700, 596, 702, and 704 to "0." AND circuit 748 will thus be enabled when s.s. 26 goes off to trip s.s. 28. This will bring up line 750. Line 750 will extend through the OR circuit 752 to enable the AND circuit 644 and apply the contents of Register 634 to the Channel 646. Channel 646 extends to AND circuit 754 and AND circuit 756. Because in the earlier part of this description it was assumed that a "search right" operation was in progress, AND circuit 758 will be enabled by the line 760 which is the "0" output of F.F. 580 and the pulse on wire 750. The output of AND circuit 758 will thus extend through OR circuit 762 to enable AND circuit 754 which will allow the contents of Register 634 to be placed in the "begin" Register 764. The F.F. 724 (EOS) is changed to its "1" state by the pulse on line 750. When s.s. 28 goes off, it transmits a pulse via wire 766 and OR circuit 566 to trip s.s. 24. Clock Pulses 24 and 25 will be repeated and the conditions to be tested for by Clock Pulse CL–26 is that of a "no-compare" condition and the "EOS" F.F. 724 in its "1" state. When this condition occurs, AND circuit 768 will have an output because one input is the pulse on line 590 and the other input is in the "0" side of the "compare" F.F. 588. (Compare) The output of AND circuit 768 is applied to AND circuit 770. The other input to which is the "1" side of F.F. 724. An output will thus exist on line 502 which extends to F.F. 700 to set it to its "1" state and also set F.F.'s 598, 596, 702, and 704 to their "0" state. AND circuit 772 will thus have an output when s.s. 26 goes off to trip s.s. 29 and bring up line 774. Line 774 through OR circuit 752 enables AND circuit 644 and also AND circuit 776. The other input to AND circuit 776 is the active condition of line 760 because we are describing a "search right" operation. The output of AND circuit 776 will extend through OR circuit 778 to enable gate 756 which will allow the contents of Register 634 to be placed in the "End" Register 780.

In the above Search example no specific numbers were used as it is believed that the description did not require same. As set forth in the general description of section F of FIGURE 2 if it were desired to locate the third phrase of the second sentence of the third paragraph of the block of data marked "payroll"; the beginning address of this block of data being assumed to be any number, e.g. 1007. The Address 1007 in binary form, i.e. 00001111101111 is gated into Starting Address Register 516 and paragraph on ④ identifier number placed in Identifier Register 528 and the number 3 in Count Register 562. And since the search is to begin at the beginning of the address the "search right" F.F. is set accordingly. The search then proceeds as described in detail above until the third ④ is found and the next two steps of the search routine i.e. (1) find second ③ and (2) third ② are carried out and the address for this beginning and end of this piece of data are stored in Registers 764 and 780.

Let us now consider the operation when a Discontinuity is found.

During CL–25 time, a signal on line 2001 from search ring 614 will set Discontinuity F.F. 3182 to "1."

The CL–26 signal, with F.F. 582 set to "1" (no overflow) and F.F. 588 set to "0" (no compare) will get through AND 594, AND 592, line 504, AND 3180, line 3192 will set F.F. 3184 to "1" and the others to "0." When s.s. 26 times out, the signal on line 3058 will get through AND 3194, line 3196 to turn on s.s. 30.

The CL–30 signal through OR 752 will condition AND's 644. It will also condition Gate 3198. This will route the information from Register 634 via AND's 644, lines 646, Gate 3198, OR 4000, into right hand portion of starting address Register 516. When s.s. 30 times out, it will turn on s.s. 30a.

The CL–30a signal, through OR 3156 will condition AND 518 and route the contents of Starting Address Register 516 through OR 517 into MAR 300. When s.s. 30a times out, it turns on s.s. 31.

The CL–31 signal through OR 3134, line 3136, initiates a 3–D memory read cycle as previously described. When s.s. 31 times out, the signal on line 3048 conditions one input of AND's 2062 and 2066. Since we have assumed a "search right" operation, F.F. 580 is set to "0" and will be holding one input of AND 2062 conditioned. The output of AND 2062 line 4002 will turn on s.s. 32. Note that if we had assumed a "search left" operation, the "1" output of F.F. 580 would have been conditioning AND 2066 and the resultant signal from AND 2066 on line 4004 would have turned on s.s. 37.

The CL–32 signal will condition gates 4006 and 4008 and will route characters 7 and 8 of MBR 96 through OR's 4000 and 4010 into Starting Address Register 516. When s.s. 32 times out, it will turn on s.s. 33.

The CL–33 signal will condition Gates 2044 and 2046 to route the contents of MAR 300 into the 1st and 2nd character positions of MBR 96. When s.s. 33 times out, it will turn on s.s. 34.

The CL–34 signal will increment the address in the Reverse Push Down Store Unit 4006. When s.s. 34 times out, it turns on s.s. 35.

The CL–35 signal through OR 3172, line 3174 conditions gate 2054 which routes the address contained in RPDS 4006 through OR 517 into MAR 300. When s.s. 35 times out, it will turn on s.s. 36.

The CL–36 signal through OR 3118 will initiate a 3–D memory write cycle to store the contents of MBR 96 at the location specified by MAR 300. When s.s. 36 times out, the signal on line 3050, OR 512 turns on s.s. 21.

To briefly summarize. In step 31, a 3–D memory read cycle we obtained a piece of data which, in positions 7 and 8, contains the address at which to skip for the discontinuity. The RD Plane will have a mark at this address. CL–32 time will provide for "remembering" this address in Register 516. CL–33 will provide for inserting into positions 1 and 2 of MBR the address of the F.D. mark corresponding to the just mentioned R.D. mark. CL–34 increments the RPDS starting point address which has been inserted into Register 4006. The initial address in 4006 is actually one less than the 1st one to be used. CL–35 puts the address contained in RPDS (the address in memory to be used), into MAR 300. CL–36 time will then store in the address specified by MAR 300 a record containing in positions 1 and 2 the address of an FD mark and in positions 7 and 8 the address of the corresponding RD mark.

The events following such as CL–21, etc. to search for level identifiers, discontinuity bits are as previously described.

Now consider a "search left" operation. F.F. 580 will be set to "1" for this type of search. The CL–25 signal will now propagate through AND 578 instead of AND 576 as in a "search right" operation. If we assume that an over-flow has not yet been encountered, F.F. 582 (Overflow) is set to "1" and conditioning AND's 583 and 4006. The output of AND 578, line 4016 will get through AND 4006, line 4012 to Decoder 648.

The output on line 4010 will operate in conjunction with the decoder to select the proper "search left" lines 620 at the Y address which is in Decoder 648. If a level bit is encountered, a signal on one of lines 616 corresponding to the position of the encountered level bit will actuate Encoder 630 and result in a binary representation of that level bit position into Register 634. Since a level bit was encountered, a signal will be realized on line 626 to increment Counter 628.

Consider now FIGURE 3, a detail drawing of 3 stages of Search Ring 614. Assume that Decoder 648 contains an address selecting the 10th position of Ring 614 and that a "search right" is being done. A signal on line 4018 (one unique line of group 618) OR 4020, OR 4022, AND 4024 (F.F. 4026 is set to "1" because a level bit is present) line 4026, OR 4028 and out on line 626 the action of which is previously described. The signal on line 4026 also conditions OR 4030 to produce an output on line 616, previously described.

If a "search left" had been called for at this address, the input signal would have been on line 4032 (of group 620) OR 4034, OR 4022, etc.

If a discontinuity bit is encountered (F.F. 4036 set to "1") a "search right" at position 10 will also result in a signal through OR 4038, AND 4040, Line 4042, AND 4044, and out on line 2001 previously described.

If a search right from position 10 and no level bits or discontinuity bits are present, the signal on line 4018 (of Group 618) goes through OR 4020, AND 4046 (F.F. 4026 and 4036=0), OR 4048, AND 4050 (F.F. 4053 and F.F. 4052 set to "0") out on line 710 (the overflow line).

If a "search left," the signal on line 4032 (of group 620) gets through OR 4034, AND 4054 (F.F. 4026 and 4036=0) OR 4056, AND 4060 (F.F. 4058 and 4062=0) and out on line 4014 (overflow).

Note here that if a "search left" operation had been requested, CL–21a would have read out a row of the RD Plane in a manner similar to that described for reading out a row of the FD Plane in connection with a "search right" operation.

When a discontinuity is sensed, a skip is made from CL–26 to CL–30.

CL–30 and 31 proceed as previously described. Now when s.s. 31 times out (search left operation) the signal on line 3048 will get through AND 2066 (F.F. 580 set to "1") line 4004 to turn on s.s. 37.

The CL–37 signal, through OR 3172 line 3174 will gate the address contained in RPDS 4006 to MAR 300 as described in relation to CL–35. When a s.s. 37 times out, it will turn on s.s. 38.

The CL–38 signal through OR 3134 will initiate a 3–D memory read cycle as previously described. When s.s. 38 times out, it will turn on s.s. 39.

The CL–39 signal will condition gates 2050 and 2052 to gate characters 1 and 2 in MBR 96 through OR's 4000 and 4010 into Starting Address Register 516. When s.s. 39 times out, it turns on s.s. 40.

The CL–40 signal decrements RPDS 4006. When s.s. 40 times out, the signal on line 3052, OR 512 turns on s.s. 21.

To summarize the action of steps CL–37, 38, 39, 40.

Step 37 gets an address from the RPDS to use in addressing the Main Memory. Step 38 reads the Main Memory at the address now in MAR 300. The first 2 characters of the data at that address are the address of the word that it is desired to "link back to." This address is routed into Starting Address Register 516 during CL–39 time. This address is read from 516 into MAR 300 during the following CL–21 time. CL–40 decrements the RPDS which will then contain the address of information for the next "reverse linkage" if and when it is requested.

Having thus described the instant data handling system with reference to the specific detailed description of typical Input, Insert, and Search operations, the flexibility of the present system in being able to handle variable field length hierarchically organized data and form links between various desired strings of discontinuous data without having to completely rewrite said data as is usually necessary in prior art systems becomes quite apparent.

While the present data handling system is designed primarily for use with a variable field length hierarchically organized data handling system of the type disclosed and described in the copending application of Rex Rice, it is to be understood that the system could be used with a conventional fixed field length system by making extensive but possible modifications. In any event, by encompassing the linking concept of the present invention, it would at least be possible in the standard system to link discontinuous data strings together although Insert and other of the more complicated operations would be difficult with a fixed field length system.

A particular example of a relatively conventional system wherein such a linking mechanism could be used at least during the inputing of data without any great trouble would be one wherein long strings of data which are essentially of variable field length are to be stored continuously in memory and where it is assumed that the string would be many, many machine words in length and the particular machine word in which it is desired to store such string was not important. In such case, it would be relatively simple to insert the Link characters and "linking addresses" in such a string and provide a single discontinuity plane for the system, which during a standard read out operation of the memory would be searched concurrently, for example, by a single register or single ended Search Ring of the type described in the copending application of Rex Rice wherein only one special 2–D core plane is searched at a time.

It is also apparent from the present system that short storage positions in memory which are not filled or which are erased in subsequent operations may be utilized again by use of the present linking mechanism and thus, result in a far greater Main Memory storage utilization. By combining the present linking concept as set forth in the present invention with the data organization and searching mechanism of the previous copending application, an extremely powerful over-all computer system is realized.

It should be fully understood, however, that the specific embodiment shown for the present system is not to be construed as in any way limiting upon the scope of the invention. As set forth specifically earlier in the specification, other types of memories could equally well be utilized such as the older electrostatic or Williams' tube types of memory as well as thin film or cryogenic memories. Similarly, the specific read, write control circuits for such memories vary greatly in number and organization and any memory system capable of parallel read and write operations on a data string of machine word length could equally well be used in the Main Memory. Similarly, the auxiliary memory which has been described as a 2–D core memory in the present embodiment could take on a number of different forms. For example, this section of memory could be a portion of the 3–D memory, i.e., several planes taken in the word organized direction of the 3–D memory and suitable controls utilized to obtain the 2–D addressing effect outlined in the embodiment disclosed. Further, in place of sequential read out of the auxiliary planes, it would be possible to access more than one plane at a time and store the information from each in separate registers similar to 312 which could then be accessed on demand from the search controls.

Likewise, the various controls, i.e., the clock segments or single shots, in the Input, Insert, Search, and Discontinuity Clock sections could take on a great many different design configurations. For example, the particular clocks utilizing single shot multivibrators could be replaced by a timing sequence of the system utilizing a simple initiating pulse in a series of delays and gate circuits as mentioned briefly in the general description of a suitable timing circuit for such typical 3–D memories.

A number of additional modifications are possible in the present system wherein it will be noted that there could conceivably be more compaction of the Input and Insert Clocks wherein certain of the timing functions are in essence dualed. However, for the sake of clarity, the various control sequences were kept separate as it was believed that this embodiment of the system would be the most straightforward to describe. In summary, as stated above, with such an involved system there are a great many directions in which the design could proceed and accomplish the same effects and still be within the scope of the system capable of creating such links as disclosed by the present invention.

As discussed briefly in the general description of FIGURE 2 when referring to the Push-Down Storage section of memory, it would be possible to modify the present invention and actually provide reverse addresses directly in memory of the type provided in the forward direction. The extra timing steps and circuitry required for performing this operation would be obvious to a person skilled in the art based on the teachings of the present invention. It should be noted, however, that since the majority of searchers will proceed in one direction, i.e., left to right, it was not considered a maximum utilization of memory to take up three more character positioins and in many cases, even an entire machine word to provide the reverse links in data.

Another possible aspect of the present invention is that a common segment of data could be inserted in a plurality of data string by following the general teachings of the present invention. In such a case, the linking address to the common insert would have to be stored at the proper location in all of the data strings together with address of the end of the common Insert. Before transfer was made to the Insert, the proper return link address would be stored in character positions 7 and 8 of the last word of the Insert. In this way a proper return address is always available from the Insert even though this return address is variable.

It is obvious from the above considerations that there are even further system ramifications and data handling possibilities presented by the linking concept anticipated by this invention.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A data handling system for inputing data into the main memory of an electronic computer in discontinuous storage locations in said memory including means for creating and storing a linking address in the data in the machine word stored in the last machine word location of a first discontinuous storage location, said linking address containing the address of the first machine word of a second discontinuous storage location where the remainder of the data is stored, and means for storing said linking address at a predetermined location in said machine word.

2. A data handling system as set forth in claim 1 above including means for placing an occurrence mark in an auxiliary memory indicative of the fact that a discontinuity exists in the data, the address of said occurrence mark in said auxiliary memory means being directly relatable to the address of the storage location in main memory where the linking address is stored and means for monitoring the search of the main memory concurrently in said auxiliary memory so that when a data string is searched said monitoring means will detect any discontinuity that exists in said data and further means for accessing the linking address included in said data for continuing the search in the non-contiguous portion of said data string.

3. A data handling system for storing long continuous data strings in discontinuous memory locations including input means for breaking the data up into machine words, means for linking two portions of data together said means including address registers and associated control circuitry for sequentially supplying storage addresses to said input means, means for determining when a first of said discontinuous storage locations is full and means for inserting a special link character and a linking address in the last machine word location of said first discontinuous storage location, said linking address being the address of the first storage location in a second discontinuous storage location in memory.

4. A data handling system as set forth in claim 3 above including means for sequentially supplying the extent address of said discontinuous storage locations to said address registers on command for said control circuitry.

5. A data handling system as set forth in claim 4 above wherein said means for determining when one of said storage locations is full includes compare circuit means and means for incrementing one of said address registers each time a word is stored in memory and means responsive to a compare signal from said compare circuit to gate the extent address of the next discontinuous storage location to said storage registers.

6. A data handling system as set forth in claim 5 above including means for storing an occurrence mark in an auxiliary storage means concurrently with the storage of said word containing the special link character and linking address in main memory, the address in said auxiliary storage means being directly relatable to the address of the word in memory containing the special link character and the linking address.

7. A data handling system as set forth in claim 6 above including means for concurrently searching the auxiliary storage means when said data string is being searched to indicate that a discontinuity exists in the data string at a given point and means for accessing the main memory to obtain the linking address for continuing said search at the proper location in memory.

8. In a data handling system for automatically storing and searching variable field length hierarchically organized data having hierarchical level identified symbols included as an integral part of the incoming data string to set off individual level segments of the data including, means for examining each data character being input into the system to determine whether or not it is one of said level identifier symbols, a main word organized randomly addressable memory having suitable read-write controls for accessing any word location therein and including a memory buffer register means associated with said main memory for accumulating characters input to the system subsequent to the comparison step and accumulating up to a machine word of such characters at a time and automatically storing same in said main memory means, means to store any such level identifier in only the lowest or first character position of any machine word and for ascertaining that only one such level identifier appears in any one machine word, auxiliary storage means for storing occurrence marks for said hierarchical level identifier symbols in response to said comparison means, the location of any occurrence mark in said auxiliary storage means being directly relatable to the address location in the main memory where such level identifier symbol is actually stored, means for searching a desired segment of said auxiliary memory beginning at a fixed determinable address therein for such occurrence marks, means for determining whether a detected occurrence mark is the one sought and means provided for determining the address of a desired and located occurrence mark in said auxiliary memory, the improvement which comprises a data linking and searching system including means for storing such variable field length hierarchically organized data in discontinuous storage locations in said main memory and including means for creating and storing a linking address in the data in the machine word stored in the last machine word location of a first discontinuous storage location, said linking address comprising the address of the first machine word of a second discontinuous storage location where the next segment of said data is stored.

9. A data linking and searching system as set forth in claim 8 above including means for placing a discontinuity occurrence mark in a portion of said auxiliary memory indicative of the fact that a discontinuity exists in the data, the address of said discontinuity occurrence mark in said auxiliary memory means being directly relatable to the address of the storage location in main memory where the linking address is stored and means for monitoring a search of data in the main memory concurrently in said portion of the auxiliary memory so that as a data string is searched, said monitoring means will detect any discontinuity that exists in said data and further means being provided for accessing the linking address included in said data at the address indicated by the discontinuity mark for continuing the search in the non-contiguous portion of said data string.

10. A data linking and searching system as set forth in claim 9 wherein the means for inputing the data into the non-contiguous storage locations includes address register means and associated control circuitry for sequentially supplying storage addresses to said input means from said address register means, means for determining when a first one of said discontinuous storage locations is full and means for inserting a special link character in the machine word just prior to the linking address.

11. A data linking and searching system as set forth in claim 10 above including means for sequentially supplying the extent address of said discontinuous storage locations to said address register.

12. A data linking and searching system as set forth in claim 11 wherein said means for determining when one of said storage locations is full includes compare circuit means, means for incrementing one of said registers each time a word is stored in memory and means responsive to a compare signal from said compare circuit to gate the extent address of the next discontinuous storage location to said storage registers.

13. A data linking and storage system as set forth in claim 12 wherein the auxiliary storage means for storage of discontinuity occurrence marks indicative of machine words containing said linking addresses comprises a portion of the auxiliary storage means utilized to store occurrence marks for the hierarchial level identifier symbols and means provided for storing occurrence marks for discontinuities in data and for level identifier symbols at the same address location of said auxiliary memory but in distinct portions thereof if both a linking address and a level identifier symbol occur in the same machine word.

14. A data linking and searching system as set forth in claim 13 wherein said means for concurrently searching the auxiliary storage means for occurrence marks includes means for searching the portion of said auxiliary storage means containing said discontinuity occurrence marks and the portion containing the level identifier occurrence marks.

15. A data linking and searching system as set forth in claim 14 above wherein said auxiliary storage means includes a plurality of two dimensional (2–D) storage planes each said plane being separately addressable and having a number of storage positions therein equal to the number of machine word storage locations in said main memory and wherein a given address in any of said two dimensional planes is directly relatable to a word address in said memory.

16. In a data system for automatically storing and searching variable field length hierarchically organized data having hierarchical level identifier symbols included as an integral part of the incoming data string to set off individual level segments of the data including means for comparing each data character being input to the system to determine whether or not it is one of said level identifier symbols, a main word organized randomly addressable memory having suitable read-write controls for accessing any word location therein and including a memory buffer register means associated with said main memory means for accumulating characters input to the system subsequent to the comparison step and for accumulating up to a machine word of such characters at a time and automatically storing same in said main memory means, means to store any such level identifier in only the lowest or first character position of any machine word and for ascertaining that only one such level identifier appears in any machine word, auxiliary memory means for storing occurrence marks for said hierarchical level identifier symbols in response to said comparison means said auxiliary memory means having a plurality of substantially identical portions for each hierarchical level to be encountered in data, the location of an occurrence mark in said auxiliary memory means in any of said portions being directly relatable to the address location in the main memory where such level identifier symbol is actually stored and means for searching a desired portion of said auxiliary memory beginning at a fixed determinable address therein for such occurrence marks, means for determining whether a detected occurrence mark is the one sought and means provided for determining the address of a desired and located occurrence mark in said auxiliary memory the improvement which comprises a data linking system for such variable field length hierarchically organized data to link discontinuous in said memory and to provide the storage addresses for the inputing of said data and for creating links in said data when said storage addresses are discontinuous in memory, said system comprising
storage location register means to which the extent addresses of available storage location sequences are supplied,
means for keeping the available storage location current as data is input into the system,
means for determining when an available storage location is filled,
means responsive to the last named means for supplying a new available storage location sequence extent address to the storage location register means, and
means for storing in the last word location of a first available storage location a linking address which comprises the address of the first word location of the next available storage location and a special link character inserted in said last word just prior to the linking address.

17. A data linking system as set forth in claim 16 including
two additional portions in said auxiliary storage means each of said portions having a plurality of storage locations therein equal to the number of word storage locations in said main memory, the address of a storage location in said auxiliary memory portion being directly relatable to the address of a word in main memory,
means for inserting a discontinuity occurrence mark in a first of said portions at an address relatable to the machine word containing the linking character and the linking address in main memory, and
means for inserting a discontinuity occurrence mark in the second of said special storage portions of said auxiliary memory at an address directly relatable to the address of the first word location of the next available storage location sequence.

18. A data linking system as set forth in claim 17 wherein said storage location register means comprises
two separate registers to which the beginning and end address of an available storage location sequence in main memory are supplied on demand,
means for incrementing the register containing the beginning address of said sequence one count each time an address is supplied from said register means to the main memory addressing circuitry for storing an additional machine word accumulated in said memory buffer register means during a data inputing operation.

19. A data linking system as set forth in claim 18 including
means for storing said special link character and linking addresses in the last three character positions of said last word in the first available storage location,
and means for automatically stopping the inputing of data into said memory buffer register means at the character position just prior to said last three available character positions when it is determined that a link must be created at this point in data.

20. A data linking system as set forth in claim 19 wherein the means for determining when the available storage location has been filled comprises compare circuit means connected to the beginning and end registers of said storage location register means, said compare circuit providing an output signal when the address in the incremented begin address register is the same as the address in the end register.

21. A data linking system as set forth in claim 20 including means responsive to the output of said compare means for transferring the address of the last available word position in said first available storage location sequence to the main memory address register and for supplying the extent address of the next available storage location sequence to the begin and end registers of said storage location register means, means for extracting the beginning address of the next available storage location sequence from said beginning address register and storing same in the machine word to be stored at the address currently in said main memory address register, said new beginning address constituting the linking address for this data discontinuity.

22. A data linking system as set forth in claim 21 wherein the control circuitry for said system comprises a plurality of single shot multivibrators whose inputs and outputs are inter-connected through logical circuit means to provide for the sequencing of said system and the generation of the special link characters, linking addresses and discontinuity occurrence marks in the two additional portions of the auxiliary memory as data is input into the system.

23. A data linking system as set forth in claim 22 wherein the auxiliary memory comprises a series of two dimensional core planes each plane comprising one portion of said auxiliary memory and each plane having a storage location for every machine word location in said main memory, each storage location in each of said planes also being directly addressable by the main memory addressing circuitry so that an address to a machine word location in said main memory relates directly to an address in one of said planes, a separate plane being provided for each of the hierarchical level identifier symbols encountered in the data string and for both of the discontinuity occurrence mark portions of said auxiliary memory.

24. In a data handling system for automatically storing and searching variable field length hierarchically organized data having hierarchical level identifier symbols included as an integral part of the incoming data string to set off individual level segments of the data, including means for comparing each data character being input to the system to determine whether or not it is one of said level identifier symbols, a main word organized randomly addressable memory having suitable read, write controls for accessing any word location therein and including a memory buffer register means associated with said main memory means for accumulating characters input to the system subsequent to the comparison step and for accumulating up to a machine word of such characters at a time and automatically storing same in said main memory means, means to store any such level identifier in only the lowest or first character position of any machine word and for ascertaining that only one such level identifier appears in any machine word, auxiliary memory means for storing occurrence marks for said hierarchical level identifier symbols in response to said comparison means, said auxiliary memory means having a plurality of substantially identical portions, the location of an occurrence mark in said auxiliary memory means in any of such portions being directly relatable to the address location in the main memory where such level identifier symbol is actually stored, said auxiliary memory having a separate storage portion for each hierarchical level mark to be encountered in the data string, and means for searching a desired portion of said auxiliary memory beginning at a fixed determinable address therein for such occurrence marks, means for determining whether a detected occurrence mark is the one sought and means provided for determining the address of a desired and located occurrence mark in said auxiliary memory the improvement which comprises a data linking system for altering an existing data string stored in such a variable field length hierarchically organized data handling system which comprises
means for entering the existing data string at a desired location and inserting a linking address to another non-contiguous storage location where it is desired that the data string continue and
means for storing a linking address at the non-contiguous storage location linking back into the original data string at a desired location therein,
means for inserting a discontinuity occurrence mark in a first portion of said auxiliary memory the address of said occurrence mark being directly relatable to the address of a machine word in main memory where the linking address is stored and means for inserting a similar discontinuity occurrence mark in a second portion of said auxiliary memory at an address directly relatable in main memory to the linking address itself, and wherein any new data to be added to an existing data string must be previously stored in the memory and the extent addresses of said data provided to the system.

25. A data linking system for altering an existing data string as set forth in claim 24 including insert register means for indicating where an existing data string is to be altered, storage location register means to which are supplied the extent addresses of an available storage location in memory where any data to be added to said existing data string is to be stored, insert data register means for indicating the extent addresses in memory of new data to be added to said existing data string, means for creating a link in the word at the address from the insert register means to the first address in the storage location register means, means for transferring data from the storage locations indicated in the insert data register means to the available storage locations indicated in the storage location register means, means for indicating when the insert data has been completely transferred to the available storage location and means for obtaining a linking address back to the original data string at an address indicated in the insert register means.

26. A data handling system for altering an existing data string as set forth in claim 25 wherein said insert register means comprises at least one register from which the specific address into which a first linking address is to be placed may be derived and from which the specific linking back address for insertion into an added string of data may be derived, said storage location register means comprises two registers for storing the beginning and end extent addresses of an available storage location sequence and wherein the begin address register is incremented one count each time a word of data is stored in this available storage location and wherein said insert data register means comprises two registers for storing the beginning and end extent addresses of a data string to be added to an existing data string and wherein the beginning address register is incremented one count each time a word of data is transferred from the storage location currently indicated in the beginning address register of said insert data register to the storage location currently indicated in the beginning register of the storage location register means.

27. A data linking system for altering an existing data string as set forth in claim 26 wherein means are provided for storing the linking address to a non-contiguous data string in the last three character positions in the word location in the existing data string where the link is to occur, means for interrogating said last three character positions to determine whether there is data stored therein, means responsive to the occurrence of data in said locations of said machine word to transfer the three characters of data from said existing storage means to a temporary storage location, and means for inserting a special link character and linking address to the first word storage location of the next available storage location sequence in memory, means for storing the data in said temporary storage location in said first word location of said next available storage location and then continuing with the transfer of data from the addresses determined from the insert data register means into said available storage location sequence.

28. A data linking system for altering an existing data string as set forth in claim 27 including means for determining when a data string to be inserted in an existing data string has been completely transferred to the new storage location indicated in the storage location register means which comprises a compare circuit means which provides an output when the address currently in the incremented begin register portion of the insert data register means is the same as the address in the end portion of the insert data register means, said output being effective to set a bistable latch means to indicate the occurrence of the finished condition to the system control circuitry.

29. A data linking system for altering an existing data string as set forth in claim 28 including means for indicating when an available storage location in memory has been used up by the transfer operation and all of the data to be transferred or added to the existing data string has not yet been so transferred, said means comprising compare circuitry connected to the begin and end registers of the storage location register means such that an output is provided when the address in the beginning register is the same as the address in the end register, said output causing a new available storage location sequence extent address to be supplied to said storage location register means and a linking address inserted in the last word location of the storage location sequence just filled to the next storage location sequence and wherein means are provided to continue transferring data from the addresses indicated in the insert data register means into the new available storage location sequence.

30. A data linking system for altering an existing data string as set forth in claim 29 wherein upon an indication that a string of data to be added to an existing data string has been completed means are provided for interrogating the last three character positions of the last word of the insert data string to determine if they are blank, if the determination is positive the special link character and linking address back into the original data string being inserted in these positions and if the positions are not blank the special link character and linking addresses being stored in the next word location subsequent to the location where the last word of the data insert is stored, said link character and linking address being stored in the last three character positions of said word.

31. A data linking system for altering an existing data string as set forth in claim 30 wherein the control circuitry for said system comprises a plurality of single shot multivibrators whose respective inputs and outputs are interconnected through suitable logical control circuitry actuable to interrogate the system operating conditions during said linking operations to effect the creation of the links between discontinuous portions of data.

32. A system for altering an existing data string as set forth in claim 26 wherein the alteration comprises a deletion of a portion of the existing data string and substituting therefore another new data string currently stored in memory, wherein means are provided for supplying the extent address of the portion of data to be deleted from the existing data string to the insert register means and means are provided for supplying the same address to the storage location register means and wherein data is transferred from the addresses specified in the insert data register means to the addresses specified in the storage location register means until an indication is obtained that the storage location register means is filled at which time the extent address of the next available storage location sequence is supplied to the storage location register means from an availability list and a linking address is placed in the last storage location previously made available by the storage location register means to said new storage location sequence and the transfer of data from the insert data register means is continued until said transfer is completed, means for obtaining the reentry point into the orginal data string subsequent to the portion of said data string to be deleted from said insert register means where such address was previously stored.

33. A system for altering an existing data string as set forth in claim 26 wherein a portion of an existing data string is to be deleted therefrom and a link formed between the two remaining portions of said data string on either side of said deleted portion including means for inserting the extent address of said portion of data to be deleted in the insert register means, the storage location register means and the insert data register means, means for storing a linking address in the last word position just before the portion of the data string to be deleted the address in which the linking address is to be placed being obtained from the beginning register of the insert register means, the actual linking address back into the other preexisting portion of the data string being obtained from the end address portion of said insert register means, and means for reading the data to be deleted sequentially out of memory under control of the addresses in the insert data register means and deleting said data from memory.

34. In a data system for automatically storing and searching variable field length hierarchically organized data having hierarchical level identifier symbols included as an integral part of the incoming data string to set off individual level segments of the data, including means for comparing each data character being input to the system to determine whether or not it is one of said level identifier symbols, a main word organized randomly addressable memory having suitable read, write controls for accessing any word location therein and including a memory buffer register means associated with said main memory means for accumulating characters input to the system subsequent to the comparison step and for accumulating up to a machine word of such characters at a time and automatically storing same in said main memory means, means to store any such level identifier in only the lowest or first character position of any machine word and for ascertaining that only one such level identifier appears in any machine word, auxiliary memory means for storing occurrence marks for said hierarchical level identifier symbols in response to said comparison means said auxiliary memory means having a plurality of substantially identical portions, the location of an occurrence mark in said auxiliary memory means in any of said portions being directly relatable to the address location in the main memory where such level identifier symbol is actually stored wherein said auxiliary memory has a separate storage portion for each hierarchical level mark to be encountered in the data string, and means for searching a desired portion of said auxiliary memory beginning at a fixed determinable address therein for such occurrence marks, means for determining whether a detected occurrence mark is the one sought and means for determining the address of a desired and located occurrence mark in said auxiliary memory the improvement which comprises a search system for a variable field length hierarchically organized data handling system wherein non-contiguous strings of data stored in said main memory have been linked together by providing in the last word location of each non-contiguous string of data a linking address which is the address of the first word of the next sequential portion of said data string wherein said linking addresses are stored in predetermined locations in such machine words and wherein two additional portions of said auxiliary memory are provided which are identical to those portions of said auxiliary memory for storing the level identifier symbol occurrence marks, in the first portion of which are stored discontinuity occurrence marks for all words in memory containing a linking address and in the second portion of which are stored occurrence discontinuity marks at all of the actual linking address locations themselves,

- means for concurrently searching the first of said discontinuity mark portions of said auxiliary memory while one of the portions of said auxiliary memory containing level identifier symbol occurrence marks is searched, wherein the identical address portions of said two portions of memory are searched concurrently,
- means for stopping the search whenever a discontinuity occurrence mark is detected in said first portion of memory,
- means for accessing the machine word stored at the address indicated by the discontinuity occurrence mark,
- means for reading out the linking address from the special storage location provided therefore and for continuing the search for the desired level occurrence mark at said address.

35. A search system for use with a variable field length hierarchically organized data handling system of the type set forth in claim 34 above including

- means for searching the first portion of said auxiliary memory containing the discontinuity occurrence marks for the words containing the linking addresses when proceeding in a search from a data string containing the linking address to the data string to which the link is made.

36. A search system for use with a variable field length hierarchically organized data handling system containing linked non-contiguous data strings of the type set forth in claim 35 wherein the means for concurrently searching a portion of the auxiliary memory containing hierarchical level identifier symbol occurrence marks and the portion of the auxiliary memory containing the discontinuity occurrence marks comprises

- a special search ring containing two parallel registers, each register being provided respectively with the contents of similar portions of a desired portion of said auxiliary memory containing the level identifier occurrence marks and the portion of the auxiliary memory containing said discontinuity occurrence marks wherein each of said parallel registers has a corresponding location in the other register so that an occurrence mark in the same location in both of said registers would indicate that a level identifier symbol existed in the machine word whose address was relatable to this special memory portion occurrence mark and similarly that a linking address was contained in the same word,
- means for proceeding with a search of said two registers in either direction,
- means for producing a signal when an occurrence mark is detected in either of said registers and for stopping the search at this point,
- separate means for indicating whether the occurrence mark detected occurred in the register associated with the discontinuity plane or the level plane or both,
- means conected to the output line of said ring indicating an occurrence mark in either register for determining the address in said auxiliary memory of the detected occurrence mark,
- means for determining whether a detected occurrence mark is the one sought in the event that an occurrence mark was detected in the hierarchical level identifier portion of the auxiliary memory and for initiating a link retrieval cycle in the event that the occurrence mark was found in the discontinuity portion of the auxiliary memory.

37. A search system for use with a variable field length hierarchically organized data handling system as set forth in claim 36 wherein

- means are provided during a search sequence to store the addresses at which discontinuities in the data are detected while searching the first discontinuity occurrence mark portion of said auxiliary memory as the search is proceeding from a linking address to a linked portion of the data string, means actuable upon a reverse search subsequent to said prior search to search the second discontinuity occurrence mark portion of said auxiliary memory concurrently with the special level identifier occurrence mark portions and for accessing the previously stored addresses each time a discontinuity occurrence mark is detected in said second discontinuity occurrence mark plane.

38. A search system for use with a variable field length hierarchically organized data system as set forth in claim 37 above wherein said means for storing the actual addresses at which occurrence marks were detected in said first discontinuity occurrence mark portion of memory comprises a reverse push-down store memory wherein the addresses associated with each discontinuity occurrence mark detected when searching the first discontinuity portion of said auxiliary memory are placed in said reverse push-down store in a first storage sequence and read out on demand in the reverse sequence, whereby these addresses comprise the linking addresses for a search in the reverse direction through such a memory system.

39. A search system for use with a variable field length hierarchically organized data handling system as set forth in claim 38 wherein the control circuitry for providing the proper timing sequence for said operations comprises a series of single shot multivibrators whose respective inputs and outputs are interconnected through suitable logical control circuitry, said control circuitry being provided with an indication of when discontinuities are detected in a data string and of the direction in which a particular search sequence is progressing in memory so that a push-down store cycle may be initiated.

40. A search system for use with a variable field length hierarchically organized data handling system as set forth in claim 39 above wherein said auxiliary memory comprises a series of two dimensional memory planes wherein each plane of said memory comprises one of said memory portions, a separate plane being provided for each of said hierarchical level identifier symbols and for the first and second discontinuity planes, wherein said planes are substantially identical and a particular word address of a storage location in main memory results in an equivalent storage location in each of said planes being made available, means being provided for writing a bit of data into each of said planes a bit at a time and means are provided for reading data out of said planes a line at a time and wherein an address of a word in main memory may be utilized to access an equivalent bit storage position in any of said planes.

41. In a data handling system for automatically storing and searching a variable field length hierarchically organized data having hierarchical level identifier symbols included as an integral part of the incoming data string to set off individual level segments of the data including means for comparing each data character being input to the system to determine whether or not it is one of said level identifier symbols, a main word organized randomly addressable memory having suitable read, write controls for accessing any word location therein and including a memory buffer register means associated with said main memory means for accumulating characters input to the system subsequent to the comparison step and for accumulating up to a machine word of such characters at a time and automatically storing same in said main memory means, means to store any such level identifier in only the lowest or first character position of any machine word and for ascertaining that only one such level identifier appears in any one machine word, auxiliary memory means for storing occurrence marks for said hierarchical level identifier symbols in response to said comparison means said auxiliary memory means having a plurality of substantially identical portions, the location of an occurrence mark in any portion of said auxiliary memory means being relatable to the address location in the main memory where such level identifier symbol is actually stored, said auxiliary memory having a separate storage portion for each hierarchical level identifier mark to be encountered in the data string, and means for searching a desired portion of said auxiliary memory beginning at a fixed determinable address therein for such occurrence marks, means for determining whether a detected occurrence mark is the one sought and means provided for determining the address of a desired and located occurrence mark in said auxiliary memory the improvement which comprises a data linking and searching system for a variable field length hierarchically organized data storage system including means for linking together non-contiguous portions of data, means for searching through such a linked data string, said linking system comprising storage location register means comprising two registers into which the beginning and end addresses of a first available storage location sequence in memory is stored and wherein the register containing the beginning address of such sequence is incremented each time an address is transferred from this register to the main memory address register when performing a write cycle in said memory, an insert data register means into which the beginning and end extent addresses in memory of a portion of data to be inserted in an existing data string are supplied, means for incrementing the beginning address register of this register means one count each time a portion of said data to be inserted is transferred to another location during an inserting operation, means associated with each of said last two register means to indicate when an available storage location sequence has been filled and when an insert data string has been completely transferred respectively, insert register means comprising at least one register for indicating where an existing data string is to be altered, means for inserting a special link character and a linking address from a first portion of data stored in said memory to another portion of data stored in a non-contiguous memory location, the linking addresses and new storage location sequences being obtained from said above registers, means for inserting a discontinuity occurrence mark in a first portion of said auxiliary memory the address of said occurrence mark being directly relatable to the address of a machine word in main memory wherein the linking address is stored, means for inserting a similar discontinuity occurrence mark in a second portion of said auxiliary memory at an address directly relatable in main memory to the linking address itself, wherein the first and second discontinuity occurrence mark portions of said auxiliary memory are substantially identical to the hierarchical level symbol occurrence mark portions of said auxiliary memory, means for searching said variable field length hierarchically organized storage system provided with such linking addresses comprising means for concurrently searching the first of said discontinuity occurrence mark portions of said auxiliary memory while searching a portion of said auxiliary memory containing said level identifier symbol occurrence marks, means for stopping the search whenever a discontinuity occurrence mark is detected in said first portion of memory, means for accessing the machine word stored at the address indicated by the discontinuity occurrence mark, means for reading out the linking address from the special storage location provided therefore and for continuing the search for the desired level occurrence mark at said linking address, separate timing control circuitry means for said system provided with appropriate input instructions for performing simple input operations into discontinuous storage locations in memory, for altering existing data strings in accordance with the specified address in data instructions, and searching such a data organization containing hierarchical level identifier symbols, occurrence marks and discontinuity occurrence marks, wherein each of said timing control circuits comprises a series of single shot multivibrators whose respective inputs and outputs are interconnected through suitable logical control circuitry and are provided with suitable system instruction signals and system condition signals to perform the above indicated operations.

No references cited.

ROBERT C. BAILEY, *Primary Examiner.*

G. D. SHAW, *Assistant Examiner.*